US 11,766,811 B1

(12) United States Patent
Larsen et al.

(10) Patent No.: US 11,766,811 B1
(45) Date of Patent: Sep. 26, 2023

(54) GEL-FOAM BODY AMALGAMATION SYSTEM AND METHOD

(71) Applicants: John Robert Larsen, Gig Harbor, WA (US); James Van Lear, Shady Shores, TX (US)

(72) Inventors: John Robert Larsen, Gig Harbor, WA (US); James Van Lear, Shady Shores, TX (US)

(*) Notice: Subject to any disclaimer, the term of this patent is extended or adjusted under 35 U.S.C. 154(b) by 0 days.

(21) Appl. No.: 18/107,796

(22) Filed: Feb. 9, 2023

Related U.S. Application Data

(60) Provisional application No. 63/342,818, filed on May 17, 2022.

(51) Int. Cl.
| | | |
|---|---|---|
| B29C 44/34 | (2006.01) |
| A47C 27/15 | (2006.01) |
| A47C 27/08 | (2006.01) |
| A47C 27/14 | (2006.01) |
| B29L 31/00 | (2006.01) |

(52) U.S. Cl.
CPC ........ *B29C 44/3403* (2013.01); *A47C 27/085* (2013.01); *A47C 27/148* (2013.01); *A47C 27/15* (2013.01); *B29L 2031/751* (2013.01)

(58) Field of Classification Search
CPC ..... B29C 44/3403; B29C 44/28; B29C 44/30; B29C 44/285; B29C 44/353; B29C 44/461; B29C 44/467; A47C 7/20; A47C 7/18; A47C 27/15; A47C 27/148; A47C 27/085
See application file for complete search history.

(56) References Cited

U.S. PATENT DOCUMENTS

| | | | |
|---|---|---|---|
| 2,604,642 A | 7/1952 | Marco |
| 5,167,401 A | 12/1992 | James et al. |
| 6,848,136 B2 | 2/2005 | Sonobe |
| 8,231,756 B2 | 7/2012 | Kim |
| 8,434,748 B1 | 5/2013 | Pearce et al. |

(Continued)

FOREIGN PATENT DOCUMENTS

EP 3441327 A1 2/2019

OTHER PUBLICATIONS

Rahman, MXenes as Emerging Materials: Synthesis, Properties and Applications, Molecules (2022) 27, 4909. https://doi.org/10.3390/molecules275154909.

(Continued)

*Primary Examiner* — Stella K Yi
(74) *Attorney, Agent, or Firm* — Elizabeth Reilly; Patentpending, PLLC

(57) ABSTRACT

A gel-foam body amalgamation system including a vacuum lift-table; a gel heating metal lift-table; a gel foam fusion lift-table; an overhead double-beam bridge crane; a hood conveyor apparatus; a hood; a foam core body; an intermediary foam core body; a vacuum lift-table cover; a gel heating metal lift-table cover; and a gel foam fusion lift-table. A method of operating the gel-foam body amalgamation system for producing a dual-core foam body amalgamate including a foam core body and an intermediate foam core body. In another embodiment, a gel body amalgamation system including a vacuum table; a heating metal table, a fusion table; and overhead double-beam bridge crane; a hood conveyor apparatus; a hood; a core body; an intermediary core body. A method including a core body and an intermediate core body for producing a dual-core body amalgamate.

11 Claims, 23 Drawing Sheets

(56) References Cited

U.S. PATENT DOCUMENTS

| | | |
|---|---|---|
| 9,259,099 B1 | 2/2016 | Larsen et al. |
| 9,914,601 B2 | 3/2018 | Morency et al. |
| 10,913,432 B1 | 2/2021 | Goldsmith |
| 11,330,851 B2 | 5/2022 | Bailey et al. |
| 2002/0013407 A1 | 1/2002 | Pearce et al. |
| 2004/0098806 A1 | 5/2004 | Stender et al. |
| 2008/0095983 A1 | 4/2008 | Calsen et al. |
| 2010/0229308 A1 | 9/2010 | Pearce et al. |
| 2010/0237082 A1 | 9/2010 | Fernandez |
| 2012/0167308 A1 | 7/2012 | Van Lear |
| 2021/0179241 A1 | 6/2021 | Cecchin |

OTHER PUBLICATIONS

General Graphene Corportation, Graphene Manufacturing FAQs, pp. 1-13, https://generalgraphenecorp.com; https://generalgraphenecorp/recources/faqs, captured Jan. 5, 2023.

Wang, et al., MXene Materials for Advanced Thermal Management and Thermal Energy Utilizaition, Science Direct, Nano Energy, vol. 97, Jun. 15, 2022, 107177, pp. 1-8. https://doi.org/10.1016/jnanoen.2022.107177.

Li, et al., Advances in MXene Films:Synthesis, Assembly and Applications, Transactions of Tianjin University, (2021) Mar. 7, 2021, https://doi.org/10.1007/s12209-021-00282-y.

Li, et al., Adhesion of Two-dimensional Titanium Carbides (MXenes) and Graphene to Silicon, Nature Communications, (2019)10:3014, https://doi.org/10.1038/s41467-019-10982-8, www.nature.com/nature communications.

Emerenciano, et al., Ti3C2MXene Membranes for Gas Separation: Influence of Heat Treatment Conditions on D-spacing and Surface Funtionalization, Membranes (2022) 12(10), 1025, https:/doi.org./10.3390/membranes12101025.

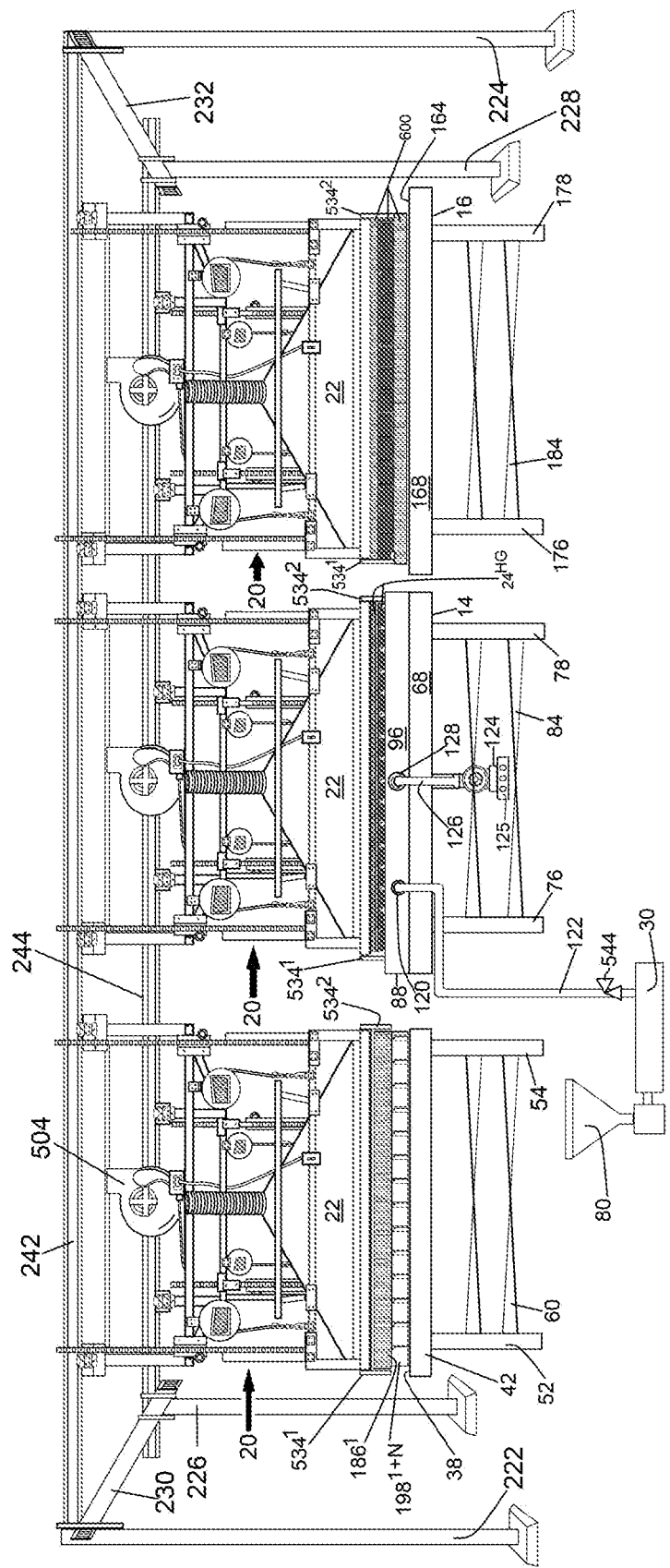

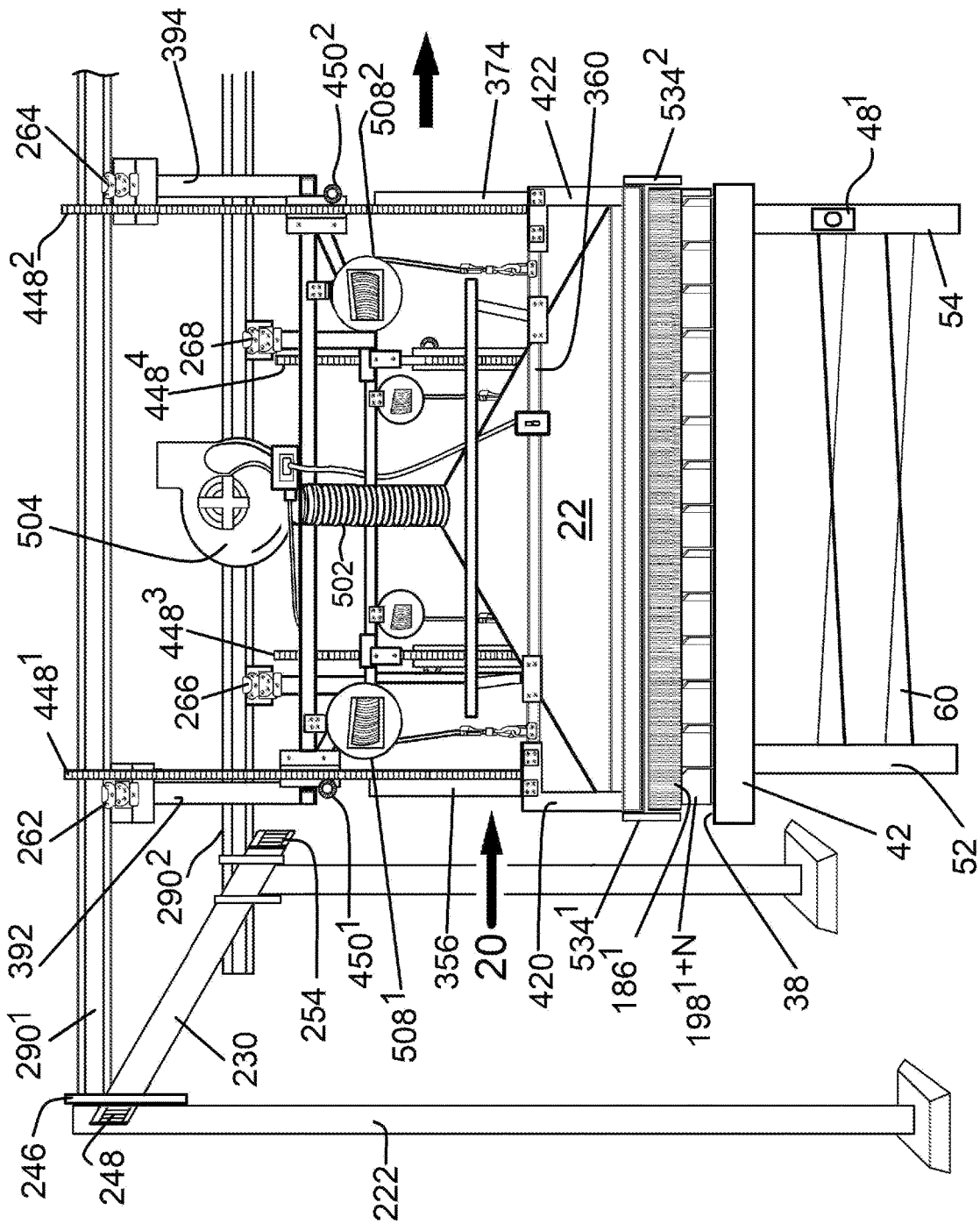

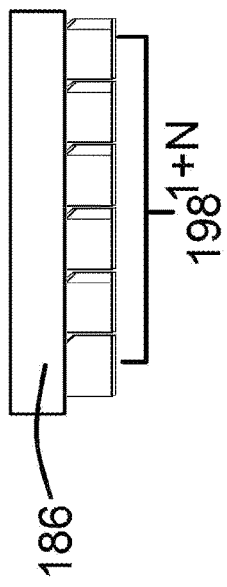
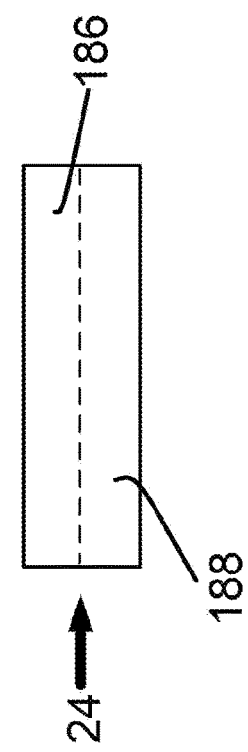
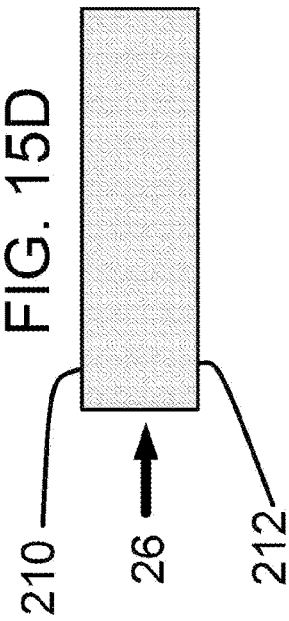
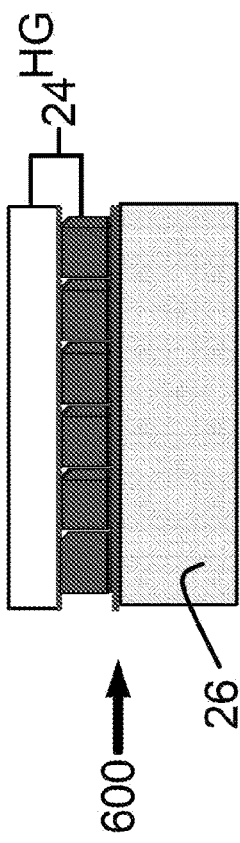
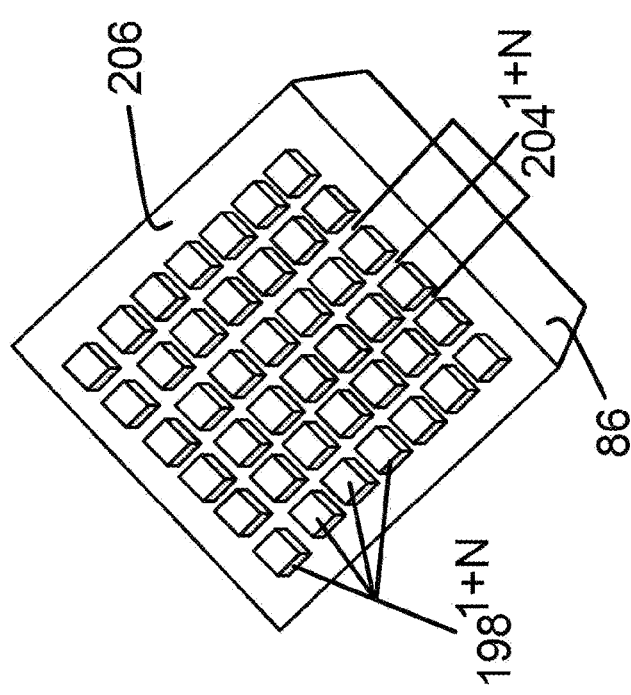

FIG. 18

KIT 900

Gel Foam Body Amalgamation System 10

A Vacuum lift – table 12

A Gel heating metal lift – table 14

A Gel foam fusion lift – table 16

A Overhead double – beam bridge crane 18

A variety of metal bolted connectors 908

A variety of bolted face plates 910

A variety of bolted column end plates 912

A variety of joist hanger brackets 916

A variety of iron face plates 918

A variety of post mount brackets 915

A Hood conveyor apparatus 20

A Gel extruder 28

A Gel supply well 30

A Vacuum lift – table cover 32

A Gel heating metal lift – table cover 34

A gel foam fusion lift – table cover 36

A Subscription for gel delivery 902

A foam core body subscription for recurring deliver service 920

Gel Foam Body Amalgamation System Instruction Manual 904

OSHA Guidelines to planar heater device 906

GEL-FOAM BODY AMALGAMATION SYSTEM AND METHOD

PRIORITY CLAIM

This application of a non-provisional and claims the benefit of U.S. Provisional Application No. 63/342,818, filed May 17, 2022, titled, GEL WALL FOAM FUSION, the contents of which are incorporated herein by reference in its entirety.

FIELD OF THE DISCLOSURE

The disclosure of the present invention relates to a gel-foam body amalgamation system and method of using the gel-substrate amalgamation system to form a dual-core foam body amalgamate. The dual-core foam body amalgamate can be implemented for use in mattresses, cushions, seats, pads, pillows, stuffed toys, and a variety of types of supportive items. The disclosure of the present invention, also, relates to a core body amalgamation system and method of using the core body amalgamation system to produce a dual-core body amalgamate implemented in producing mattresses, cushions, seats, pillows, stuffed animals, and a variety of supportive items. The disclosure of the present invention, also, relates to methods for manufacturing the dual-core foam body amalgamate and the dual-core body amalgamate without requiring the use of a traditional metal mold.

DESCRIPTION OF THE RELATED ART

Healthcare and household mattresses, as well as seat cushions, pads, and other varieties of cushioned supports have increasingly utilized gel to achieve desired levels of comfort and support. Some known products have integrated such gel with a supportive foam of the type conventionally employed in mattresses and other products for supporting humans and pets.

Known methods for manufacturing supports employing both gel and foam exhibit a variety of shortcomings. Typically, the gel must first be extruded, injected, or poured into and shaped by large and expensive metal molds. These molds are usually large and quite heavy. As a result, they are difficult to maneuver into position and properly secure during the molding operation. Extracting the cooled and formed gel from the mold can also be difficult and time consuming. Moreover, the size of the molded gel support is strictly limited by the size of the available metal mold. After the gel is molded, further problems are encountered securing the gel to one or more layers of foam. Cured gel is unable to adhere directly to the foam. As a result, the gel usually must first be heat bonded to a thin textile layer of scrim. This requires the purchase and maintenance of additional manufacturing material which results in additional manufacturing steps and resultant expenses. Conventional gel support products also tend to be vertically unstable and are apt to buckle outwardly when a large load is applied. This is undesirable and can significantly reduce the usefulness, support, and lifespan of the product.

SUMMARY

The disclosure and claims herein are directed to a gel-foam body amalgamation system and method producing a dual-core foam body amalgamate. The gel-foam body amalgamation system, comprises a vacuum lift-table; a gel heating metal lift-table; a gel foam fusion lift-table; an overhead double-beam bridge crane; a hood conveyor apparatus; a hood; a foam core body; an intermediary foam core body; a vacuum lift-table cover; a gel heating metal lift-table cover; and a gel foam fusion lift-table cover. The foam core body is manipulated whereby a series of a plurality of extended cubes are carved within the bottom core body portion of the foam core body by way of a contour saw, wherein each of the extended cubes of the series of the plurality of extended cubes are configured in symmetrical alignment a first distance from each other aligned in a plurality of rows and a plurality of columns interconnected by a plurality recessed channels bordered by an adjourned peripheral rim, wherein each of the plurality of extended cubes is configured with a cube thickness which is less than the thickness of the foam core body. The gel heated foam core body is pressed against the intermediary foam body having the gel cure to form the dual-core foam body amalgamate.

The gel-foam body amalgamation system includes a hood including a lift and place framework with a plurality of perforations allowing for a vacuum generated flow of air to suction the foam core body enabling movement and placement of the foam core body during the operation of the gel-foam body amalgamation system for producing the gel-foam body amalgamation system.

The gel-foam body amalgamation system includes a heater device into the gel-heating metal lift-table and integrated with a high strength MXene layers to provide increased thermal conductivity and metal conductivity. MXenes, a class of transition metal carbon/nitride two-dimensional (2D) materials, have attracted significant attention due to theft excellent mechanical properties, metallic conductivity, and rich chemical properties.

In one exemplary embodiment the foam core body is comprised of polyurethane, viscoelastic, or latex foam, or blends thereof. The foam core body can be any type of foam known in the art having a porous characteristic. In another exemplary embodiment, the foam core body is comprised of a plurality of layers of foam materials.

In one exemplary embodiment the gel is an elastomeric non-soy gel but could be any type of gel known known in the art. In one exemplary embodiment, the process of the method of manufacturing the dual-core foam body amalgamate described herein also represents a significant improvement over conventional techniques for manufacturing gel and foam support cushions because adhesive interconnection is not required between the foam and gel components. Rather, the extended cubes and its recessed channels carved into the foam core body are dipped into a heated gel bath and, in a next step positioned atop an intermediary foam core body to form a dual-core foam body amalgamate. This allows the gel to effectively bond directly between the plurality of heated gel extended cubes and a borderline top surface of the intermediary foam core body as the gel cures. This eliminates the need to use scrim and adhesives in order to bond the foam to the gel. Considerable time and expense are thereby saved. Moreover, an improved, more stable and comfortable dual-core foam body amalgamate is achieved. Nonetheless, it should be understood that scrim may still be applied to the composite above the gel component for use in different applications.

In another embodiment of the disclosure and claims herein are directed to a core body amalgamation system and method producing a core body amalgamate. The core body amalgamation system includes a vacuum table; a heating metal table, a fusion table; and overhead double-beam bridge crane; a hood conveyor apparatus; a hood; a core body; an intermediary core body.

The core body amalgamate is manipulated whereby a series of a plurality of extended protuberates are carved within the bottom core body portion of the core body by way of a contour saw, wherein each of the extended protuberant of the series of the plurality of extended protuberates are configured in symmetrical alignment a first distance from each other aligned in a plurality of rows and a plurality of columns interconnected by a plurality recessed channels bordered by an adjourned peripheral rim, wherein each of the plurality of extended protuberant is configured with a thickness which is less than the thickness of the core body. The extended protuberates are coated with a colloidal material and fused with an intermediary core body to form the core body amalgamate. The extended protuberates can be contoured in any one of a geometric shape, coils, helix, double helix, arcuate shape customized for a particular dual-core body amalgamate.

In this exemplary embodiment, the core body achieves improved effective support and comfort. The receptacles may be formed in the foam base portion in different number, size, depth, and layout in order to achieve various comfort and support levels and characteristics. The extended protuberates can be contoured in any one of a geometric shape, coils, helix, double helix, arcuate shape customized for a particular dual-core body amalgamate.

In an exemplary embodiment of the disclosure the colloidal matter is selected from any one of the colloidal matter comprising any one of a gelatinous matter that is characterized to consist of two phases that are intertwined with one another having a solid particle network and a liquid solvent.

The core body and the intermediate core body can be manufactured with a material selected from anyone of the group comprising, foam, silicone, vinyl foam, rubber, polyethylene, polyethylene terephthalate, polyvinyl alcohol, polypropylene, polystyrene, polycarbonate, polyamide, and resins based on any combinations thereof.

Additional aspects of the invention, together with the advantages and novel features appurtenant thereto, will be set forth in part in the description which follows, and in part will become apparent to those skilled in the art upon examination of the following, or may be learned from the practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and constitute a part of this specification, illustrate various features, embodiments and aspects of the invention, and together with the description, serve to describe features and terms of the embodiments of the invention. The accompanying drawings are not drawn to scale. In the drawings:

FIG. 5A is a front perspective view of the gel-foam body amalgamation system of FIG. 1 showing the movement of the hood conveyor apparatus moving from the vacuum-lift table, to the gel heating metal lift-table, and to the gel foam fusion lift-table, according to an embodiment of the present invention.

FIG. 6 is a partial front perspective view of the gel-foam body amalgamation system of FIG. 5 showing a foam core body having a plurality of extended cubes positioned on the vacuum-lift table, according to an embodiment of the present invention.

FIG. 15A is planar front view of the foam core body of the gel-foam body amalgamation system, according to an embodiment of the present invention.

FIG. 15B is a top perspective view of the foam core body of FIG. 15A including a plurality of extended cubes, according to an embodiment of the present invention.

FIG. 15C is a side perspective view of the foam core body of FIG. 15B, according to an embodiment to the present invention.

FIG. 15D is side perspective view of an intermediary foam core of the gel-foam body amalgamation system, according to the present invention.

FIG. 15E is a side perspective view of a dual-core foam body amalgamate, according to an embodiment of the present invention.

FIG. 18 is a flow chart of a kit of a gel-foam body amalgamation system, according to an embodiment of the present invention.

DETAILED DESCRIPTION

Figure 1:
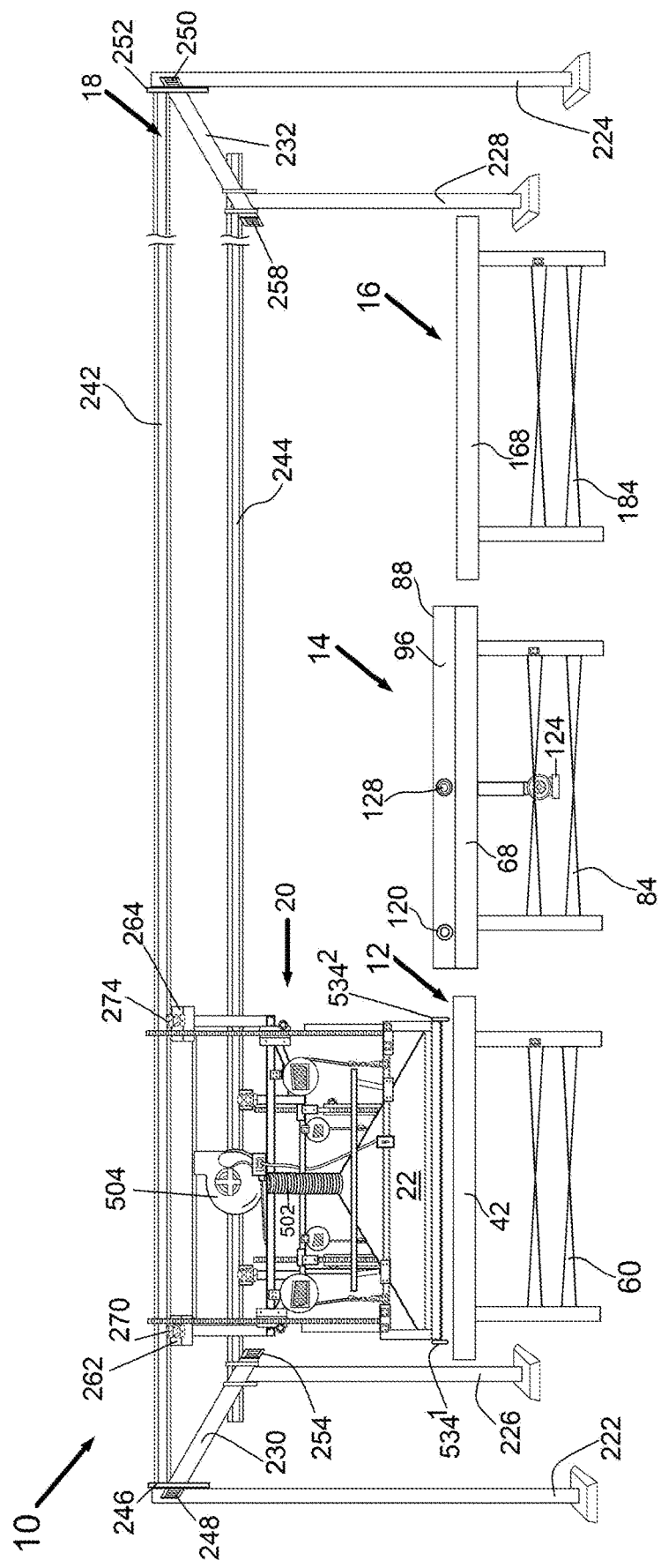
FIG. 1 is a front perspective view of a gel-foam body amalgamation system including an overhead double-beam bridge crane, a conveyor apparatus shown with a vacuum lift-table, a gel heating metal lift-table, a gel foam fusion lift-table, according to an embodiment of the present invention.
Figure 2:
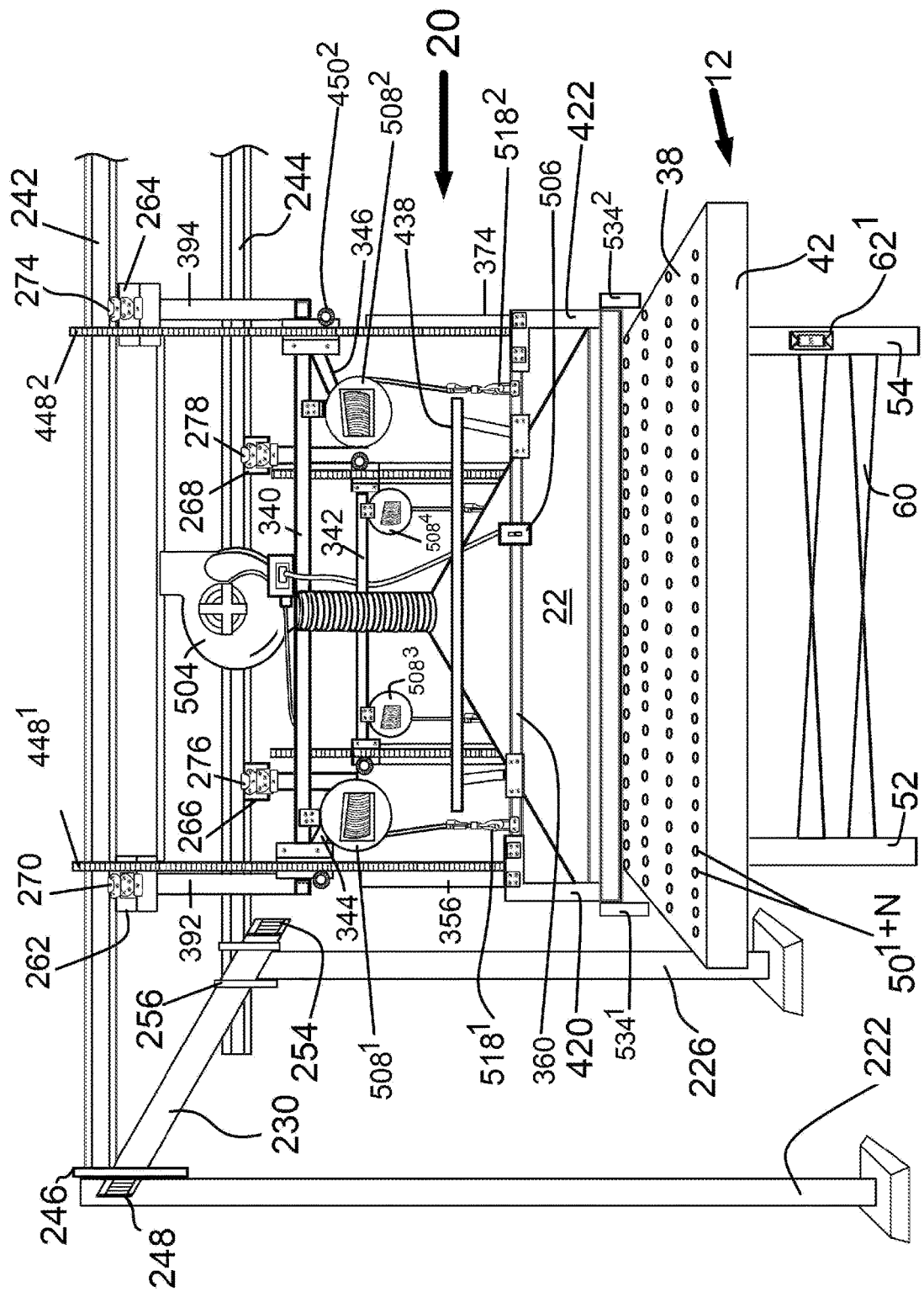
FIG. 2 is a partial front perspective view of the gel-foam body amalgamation system of FIG. 1 integrated with the hood conveyor apparatus shown with the vacuum lift-table, according to an embodiment of the present invention.

While the invention is amenable to various modifications and alternative forms, specifics thereof have been depicted by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

Reference will now be made in detail to exemplary embodiments of the invention, examples of which are illustrated in the accompanying drawings. Wherever convenient, similar reference numbers will be used throughout the drawings to refer to the same or like parts. The implementations set forth in the following description do not represent all implementations consistent with the claimed invention. Instead, they are merely some examples of systems and methods consistent with the invention.

Embodiments of a gel-foam body amalgamation system, a method of making a dual-core foam body amalgamate implementing the gel foam body amalgamation system in accordance with embodiments of the present disclosure are described with reference to the accompanying drawings, including FIGS. 1-2, 4-18.

Embodiments of a core body amalgamation system for producing a dual-core body amalgamate implementing the core body amalgamation system in accordance with embodiments of the present disclosure are described with reference to the accompanying drawings, including FIGS. 3 and 17.

Embodiments of a Kit of a gel-foam body amalgamation system kit in accordance with embodiments of the present disclosure are described with reference to the accompanying drawings, including FIG. 18.

FIG. 1 is a front perspective view of a gel-foam body amalgamation system including an overhead double-beam bridge crane, a conveyor apparatus shown with a vacuum lift-table, a gel heating metal lift-table, a gel foam fusion lift-table, according to an embodiment of the present invention.

FIGS. 1-2, 4-16E illustrates a gel-foam body amalgamation system and method according to an embodiment of the present invention. FIG. 1 is a front perspective view of a gel-foam body amalgamation system 10 including an overhead double-beam bridge crane 18 integrated with a hood conveyor apparatus 20 with a hood 22, a vacuum lift-table 12, a gel heating metal lift-table 14, a gel foam fusion lift-table 16, according to an embodiment of the present invention.

Figure 8:
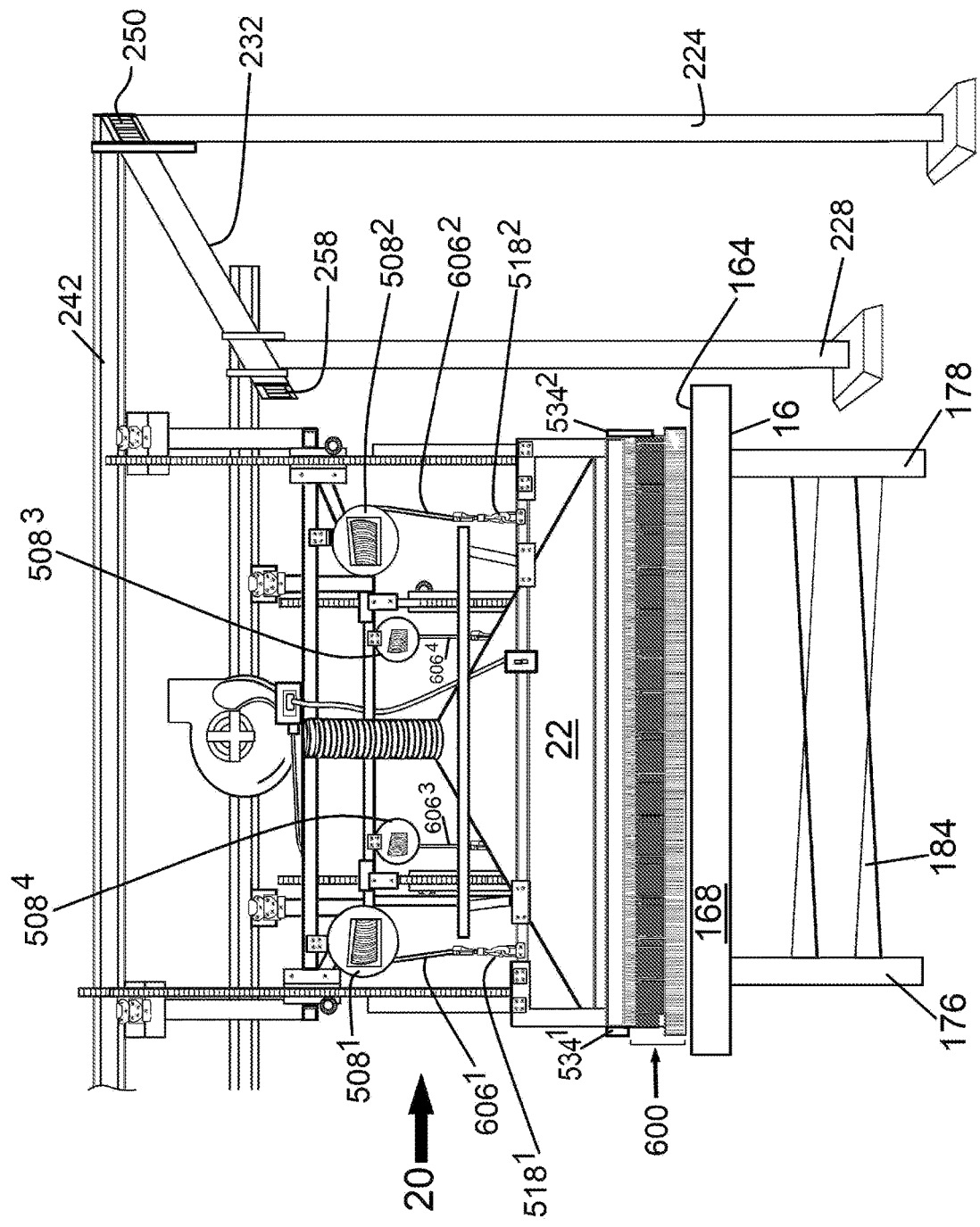
FIG. 8 is partial front perspective view of the gel foam body amalgamation system of FIG. 5 showing a dual-core foam body amalgamate positioned on the gel foam fusion lift-table, according to an embodiment of the present invention.

The gel-foam body amalgamation system 10 is implemented by an operator to form a dual-core foam body amalgamate 600 as shown in FIGS. 5A, 8 and 15E. Implementation of the gel-foam body amalgamation system 10 can be operated manually by an operator, directed by manual operations performed by the operator. In another embodiment of the gel-foam body amalgamation system 10, the implementation of the gel-foam body amalgamation system 10 can be automated by an automated operation system. In another embodiment of the gel-foam body amalgamation system 10 the implementation of the gel-foam body amalgamation system 10 can be directed by a smart system including a surveillance system including a wireless fidelity and short range wireless fidelity (bluetooth) and a computer device system, as discussed, below.

With reference to FIGS. 1, 2, 4-5A, 6-8, 15A-15E, the gel-foam body amalgamation system 10 comprises a vacuum lift-table 12; a gel heating metal lift-table 14; a gel foam fusion lift-table 16; an overhead double-beam bridge crane 18; a hood conveyor apparatus 20; a hood 22; a foam core body 24; an intermediary foam core body 26; gel 87; three table covers 32, 34, 36, including a vacuum lift-table cover 32, a gel heating metal lift-table cover 34, and a gel foam fusion lift-table cover 36. The gel-foam body amalgamation system 10 is implemented with a gel extruder 28; and a gel supply well 30, as illustrated in FIG. 5A.

As used herein, the term "foam" encompasses, but is not limited to, solid porous foams, reticulated foams, water-disengradeable foams, open-cell foams, closed-cell foams, foamed synthetic resins, cellulosic foams, natural foams, polyurethane foams, viscoelastic foams, high density foam, memory foam, and latex foams. In one embodiment the foam used for foam base portion 12 has an Indentation Force Deflection ("IFD") of from about 3 to about 70.

As used herein, the term "gel" encompasses, but is not limited to, a viscoelastic or Semi-solid, jelly-like state assumed by a colloidal dispersion or a substantially dilute cross-linked system. The term "gel" encompasses a three-dimensional polymeric structure that itself is insoluble in a particular liquid but which is capable of absorbing and retaining large quantities of the liquid to form a stable, often soft and pliable, but to one degree or another a high density shape-retentive structure. When the liquid is water, the gel is typically referred to as a hydrogel. The gel may also contain additives that affect the properties of the gel. Examples of suitable additive that increase the heat absorbing properties of the gel include boron, talc, quartz, aluminum sulfate, diamond dust.

FIGS. 1-2, 4-5A, 6 depicts embodiments of the vacuum lift-table 12. The vacuum-lift table 12 comprises a silicone table structure including a rigid silicone table top 38, a rigid silicone table bottom 40, a rigid front facing silicone wall 42, a rigid rear facing silicone wall 44, a rigid first silicone side wall 46, an opposing rigid second silicone side wall 48, the rigid silicone table top 38 is integrated with a plurality of table perforations $50^{1+N}$ extending therethrough the rigid silicone table bottom 40.

The rigid silicone table top 38 is dimensioned with a surface area of at least 84×76 inches. In this manner, the vacuum lift-table can receive a variety of sizes of foam core bodies ranging to equivalent sizes of a King mattress (80×76 inches); a Queen size mattress (80×60 inches); a Double size mattress (75×73 inches); and a Twin size mattress (75×38); and for pillows, cushions, stuffed toys, and a variety of support devices.

With reference to FIGS. 1-2, 4-5A, the vacuum lift-table 12 is depicted illustrating the rigid silicone table top 38 of the vacuum lift-table 12 integrated with a plurality of table perforations $50^{1+N}$ extending from the rigid silicone table top 38 therethrough the rigid silicone table bottom 40. The plurality of table perforations $50^{1+N}$ are symmetrically aligned a distance apart from each other in rows and columns extending the entirety of the rigid silicone table top 38 and therethrough to the rigid silicone bottom 40.

As shown in FIGS. 1-2, 4-6, the vacuum lift-table 12 is supported by four insulated table support columns 52, 54, 56, 58, disposed beneath the rigid silicone table top 38 including a first front insulated table support column 52, a second front insulated table support column 54, a first back insulated table support column 56, a second back insulated table support column 58. The four insulated table support columns 52, 54, 56, 58 of the vacuum-lift table 12 are integrated with a vacuum table hydraulic lift device 60 whereby the vacuum lift-table 12 is lowered and raised being actuated by a vacuum lift-table controller 621 disposed on the second front insulated table support column 54. An operator can select a customized operator height position of the vacuum lift-table. In this manner the operator can work at a comfortable position and has easy access to the vacuum lift-table 12 and the hood 22 taking in consideration the height of the operator, the length of the operator's arms, whether the operator is seated in a chair, or a wheelchair. The vacuum-lift table 12, the gel heating metal lift-table 14, and the gel foam fusion-lift-table meet ANSI/ASME standards (American National Standards/American Society of Mechanical Engineers) standards. The vacuum table hydraulic lift device 60, a gel heating table hydraulic lift device 84 (discussed, below), and a gel foam fusion hydraulic lift device 184 (discussed below) can be acquired from a commercial vendor (BALEIGH Industrial Holdings, https://baleigh.com; GRAINGER, https://grainger.com; and other mechanical engineering product companies.

The vacuum lift-table is manufactured with a rigid silicone material, and each of the four insulated table support columns 52, 54, 56, 58 can be insulated with a rubber material, or a silicone material. In this exemplary embodiment the vacuum lift-table is insulated and protected against any probability of sparks of electricity emanating from the gel heating metal lift-table 14.

The vacuum lift-table controller 621 can include a microcontroller having wireless fidelity chip and/or a microcontroller having short range wireless (bluetooth) capabilities so that the operator can maneuver the raising and lowering of the vacuum lift-table by way of a smart device in communication with a computing device. The smart device can include a smart phone, a mobile computer device, or a computer device system with a controller, a tablet personal computer, a laptop computer, smart watch, and the like, with which embodiments may be practiced. The mobile computing device is illustrative of any suitable device operative to send, receive and process wireless communications by way of wireless fidelity or short range wireless fidelity (bluetooth). A display screen can be provided for operative displaying information and images of the gel-foam body amalgamation system 10 computer-executable instructions readable by a computing device. Data input to the device can be performed via a variety of suitable means, such as, touch screen input via the display screen, keyboard or keypad input via a data entry area, key input via one or more selectable controls or icons. Data may be output via the device by way of any suitable output means, including but not limited to, display on the display screen. Each of the mobile smart device and the computing device can include a processor of a general purpose computer processor for processing incoming and outgoing data, communications and operation instructions, manufacturer software applications which can be uploaded on the operator's smart device to manage each of the method steps of the method of the gel-foam body amalgamation system 10 where feasible.

Figure 7:
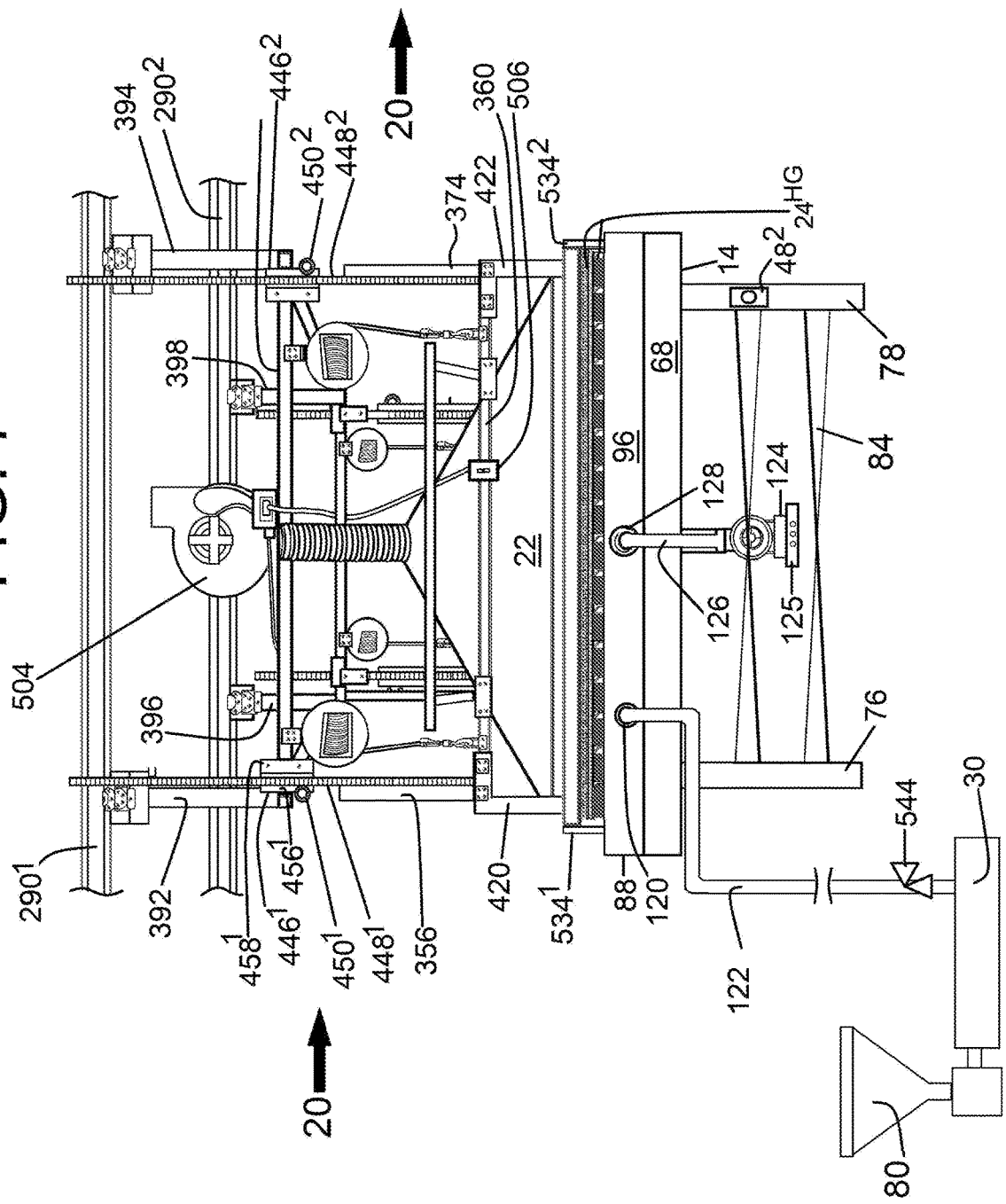
FIG. 7 is a partial front perspective view of the gel-foam body amalgamation system of FIG. 5 showing the foam core body having the plurality of extended cubes in the metal gel basin of the gel heating-lift table, according to an embodiment of the present invention.

With reference to FIGS. 1, 5A, and 7, the gel heating metal lift-table 14 of the gel-foam body amalgamation system 10 includes a metal table structure including a flat metal table top 64, a flat metal table bottom 66, a front facing flat metal wall 68, a rear facing flat metal wall 70, a first lateral flat metal side wall 72, an opposing second flat metal lateral side wall 74.

The gel heating metal lift-table 14 of the gel-foam body amalgamation system 10 is supported by four insulated metal columns 76, 78, 80, 82 supporting the metal table structure including a first front insulated table metal column 76, a second front insulated table metal column 78, a first back insulated table metal column 80, a second back insulated table metal column 82 integrated with a gel heating table hydraulic lift device 84 whereby the gel heating metal lift-table 14 is lowered and raised being actuated by a gel heating metal lift-table controller 622 wherein an operator can select the customized operator height position of the gel heating metal lift-table 14. In this manner the operator can work at a comfortable position and has easy access to the gel heating metal lift-table 14 and the hood 22 taking in consideration the height of the operator, the length of the operator's arms, whether the operator is seated in a chair, or a wheelchair.

In another, embodiment, the vacuum lift-table controller 621, gel heating metal lift-table controller 622 and the gel foam fusion lift-table controller 623 can include a user input device, such as a remote controller for adjusting the height of the vacuum lift-table 12, the gel heating metal lift-table 14 and the gel foam fusion lift-table 16. The remote controller may include one or more icons operable to set the height of each of the three tables 12, 14, 16. For example, the remote controller may include a raise button operable to raise the height of each of the three tables 12, 14, 16, and a lower icon operable to lower the height of each of the three tables 12, 14, 16. The remote controller may be in operational electrical communication with the vacuum lift-table controller 621, gel heating metal lift-table controller 622, and the gel foam fusion lift-table controller 623 such as the remote controller to control the height of the vacuum lift-table 12.

The remote controller can be configured to operationally communicate with the vacuum lift-table controller 621 wirelessly with a smart device. The smart device can include a computer network or a smart phone connected to the user's wireless fidelity (WiFI) or short range wireless fidelity network (bluetooth).

Each of the four insulated table support columns 52, 54, 56, 58 can be insulated with any of the materials selected from the group comprising, rubber, silicone, thermoplastic, thermoset polyester composite. In this exemplary embodiment the gel heating metal lift-table 14 is insulated and protected against any probability of sparks of electricity emanating from the gel heating metal lift-table 14.

The gel heating metal lift-table controller 622 can include a microcontroller having wireless fidelity chip and/or a microcontroller having bluetooth look up generic name of bluetooth capabilities so that the operator can maneuver the raising and lowering of the gel heating metal lift-table 14 by way of a smart device in communication with the microcontroller. With reference to FIGS. 1, 5A, 7, 12-14 the gel heating metal lift-table 14 of the gel-foam body amalgamation system 10 includes a metal gel basin 88 to provide a vessel to contain a predetermined volume of the gel 87 and to provide a vessel in which to heat the gel 87 to be implemented in the formation of the dual-core foam body amalgamate 600 as depicted in FIGS. 5A, 8, and FIG. 15E. The metal gel basin 88 is permanently attached on an upside of the flat metal table top 64 of the gel heating metal lift-table 14 by way of welding wherein the metal gel basin 88 is co-planar with the metal flat metal table top 64 of the gel heating metal lift-table 14.

The metal gel basin 88 includes a cavity 104 to contain a predetermined volume of gel incorporated in a gel bath 90. The predetermined volume of gel is dependent upon the size of the foam core body 24. The metal gel basin 88 the gel heating metal lift-table 14 is configured with a metal floor 92 bound by four upright perimetric metal walls wherein the top flat surfaces of each of the four upright perimetric metal walls 96, 98, 100, 102 provides a peripheral rectangular top metal rim 94 to the metal gel basin 88. The four perimetric metal walls including a front facing metal wall 96, a rear facing metal wall 98, and two lateral facing metal walls 100, 102, a first lateral metal side wall 100 and a second lateral metal side wall 102 enclosing the gel bath 90.

The cavity 104 of the metal gel basin 88 is configured with a cavity opening dimensioned to receive the foam core body 24. The metal floor 92 is dimensioned with a surface area of at least 84×76 inches to accommodate a variety of sizes of the foam core body 24. 84×76 inches. In this manner, the metal floor 92 can receive a variety of sizes of foam core bodies ranging to equivalent sizes of a King mattress (80×76 inches); a Queen size mattress (80×60 inches); a Double size mattress (75×73 inches); and a Twin size mattress (75×38); and for pillows, cushions, stuffed toys, and a variety of support devices.

Figure 12:
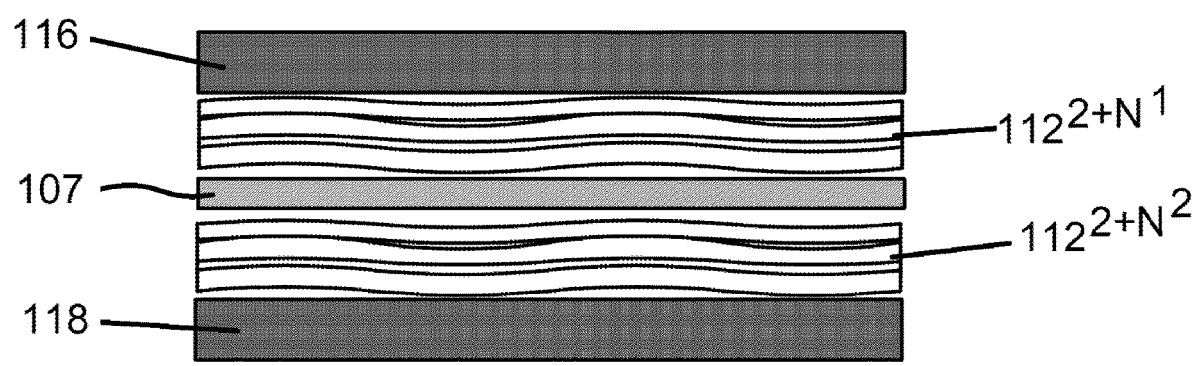
FIG. 12 is a planar perspective view of a cross-section of the gel heating metal lift-table of the gel-foam body amalgamation system, according to an embodiment of the present invention.

FIG. 12, with reference to FIGS. 1, 5A and 7, the metal gel basin 88 of the gel heating metal lift-table 14 includes a thermally conductive layered core having a copper plate 107, wherein the copper plate 107 includes a superior side 108 and an inferior side 110 wherein each of the superior side 108 and the inferior side 110 is adhered to at least two layers of MXene 112$^{2+N}$ such that a copper plate MXene layered core 114 is formed wherein the copper plate MXene layered core 114 is integrally metallurgically bonded intermediate with a first stainless steel plate layer 116 and a second stainless steel plate layer 118 by way of a bonding application to form a multilayered steel copper MXene composite 142 wherein the thermal conductivity is increased by the multilayered steel copper MXene composite 142. The MXene comprises a MXene material sheet of $T_{i3}$ $C_2$ $T_x$ wherein T is a titanium atom, C is a Carbon atom and T is terminal functional atom selected from the group comprising an oxygen atom "O", a hydroxy group "OH", and a fluorine atom "F". MXene films and MXene sheets are commercially available through:

Nano Chemazone Catalog.cdr at Nanochemazone®| Premium Nanomaterials Manufacturer and Supplier, Alberta, Canada. https://nanochemazone.com.

In recent years, MXene has caught much attention as a novel material that has a high electrical conductivity and a high thermal conductivity. Global attention is currently focused on energy and environmental challenges. Electric vehicles and stationary batteries both require high-capacity energy conversion/storage systems, while the present energy conversion and storage techniques such as batteries, water splitting, and supercapacitors are being advanced. MXenes are also very interesting in this context as they are relatively safe, have broad interlayer spacing, are environmentally flexible, and have excellent biocompatibility.

MXenes, a broad family of the 2D transition-metal carbides or nitrides, was recently developed by Drexel University researchers. The generic formula for MXenes is $M_{n+1}X_nT_x$(n=1-3), where M stands for the transition metals (i.e., Ti, Zr, Ta, Nb, V, Mo, etc.) and X represents the carbon or nitrogen elements. Typically, MXenes are synthesized from the layered-structure MAX-phase bulk ceramic using fluoride-based chemicals to selectively etch (usually groups IIIA and IVA) layers, and their basal faces are frequently terminated with special surface functionalities ($T_x$), such as O, OH, and F. Due to their exceptional conductivity and the presence of abundant surface functionalities, MXenes with highly adjustable structural and chemical forms can perform both as fundamental active materials and carriers of additional functional materials for a variety of applications, such as photodetectors, flame-retardant polymer materials, water purification, energy conversion and storage, sensors, electromagnetic interference shielding, gas separation, biomedical imaging and therapy, and catalysis.

As a result of their wide range of potential in the realms of energy conversion and storage, MXenes have astonished the scientific community. 2D materials MXenes exhibit good hydrophilicity, film-forming performance, and electrical conductivity. They are commonly used in supercapacitors, electro-magnetic radiation shielding, and lithium-ion batteries. MXenes refers to $M_nX_{n-1}$(n=2, 3, and 4) layers formed by removing interlayer "A" atoms from the metal-ceramic MAX phase (where M stands for the transition metals, A is the group IIIA or IVA elements, and X represents the C and N elements). The M and X atoms stack to form a hexagonal lattice in the MAX phase, with the atoms of X occupying the M octahedral cage center shared by its edges. When the atoms of A are removed from the layer of $M_nX_{n-1}$, the hexagonal-lattice of MX, rather than the cubic lattice, is preserved. Hence, the layer of $M_nX_{n-1}$ can be produced by removing the A– atoms. As with its predecessor MAX, MXenes thin sheets are frequently oriented horizontally. The bulk of MXenes have good mechanical features and are likely to be quite durable.

Very recently, Chen et al. reported the fabrication of a fluoride-free and chloride-containing $Ti_3C_2T_x$ MXene film via electrochemical etching. In the synthesis process, $Ti_3C_2T_x$ was delaminated via sonication in the absence of any toxic organic intercalant. The thickness of the resultant $Ti_3C_2T_x$ nanoflakes was −3.9 nm and their dispersion in an aqueous medium was very highly stable. The pattern of the $Ti_3C_2T_x$ displays hexagonal symmetry as a result of the hexagonal arrangement of the Ti-atoms at the 002 surface of $Ti_3C_2T_x$ MXene. The lattice fringe, with d-spacing of 0.27 nm, can be accredited to 100 planes of the $Ti_3C_2T_x$ MXene. See, Chen et.al., *High-strength MXene sheets through interlayer hydrogen bonding for self-healing flexible pressure sensor.* Chemical Engineering Journal, Volume 453, Part 1, 1 Feb. 2023. Chen et.al., incorporated by reference in its entirety.

MXene is one of a two-dimensional materials and is a layered material (n) comprising a plurality of layers, each layer having a crystal lattice which is represented by $M_{n+1}X_n$ (wherein M is at least one metal of Group 3, 4, 5, 6, or 7 Metal, (X) is a carbon atom and/or a nitrogen atom, and (n) is 1, 2, or 3), and in which each (X) is positioned within an octahedral array of (M), and having a terminal (or modifier) (T) such as a hydroxy group, a fluorine atom, an oxygen atom, or a hydrogen atom on the surface of each layer.

MXene coatings have been shown to be prepared on steel by simple spin coating with a colloidal suspension yielding a corrosion resistance by way of the MXene coatings. In particular, MXene ($Ti_3C_2T_x$) nanosheets prepared by the spin coating and etching form a 2D single-layer structure. The MXene coatings provides an anticorrosion physical barrier. Increasing the number of spin coatings, also, increases the coating thickness and anticorrosion properties of the steel. MXene can include a layered material wherein each layer includes a crystal lattice.

With reference to FIGS. 1, 5A, and 7, the metal gel basin 88 includes a gel supply pipe inlet port 120. The gel supply pipe inlet port 120 is disposed at a corner portion of the front facing wall 96 of the metal gel basin 88. As depicted in FIG. 7, the gel supply pipe inlet port 120 is capable of receiving a gel supply pipe 122 fluidly connected to a gel supply well 30 in cooperation with a gel extruder 28 to enable a stream of gel $87^1$ entering the metal gel basin 88. The gel supply pipe 122 facilitates passing of the stream of gel $87^1$ from a front interior facing wall to a rear interior facing wall of the metal gel basin 88 to reach the predetermined volume of gel $87^1$.

The predetermined volume of gel $87^1$ is indicated by a measurement bar 148 etched on a surface of the front interior facing wall of the metal gel basin 88. The operator, also, views the measurement bar 148 to replenish a reduced gel volume to the predetermined volume of gel $87^1$ after completion of the operation of making the dual-core foam body amalgamate 600 as depicted in FIGS. 5A, 8 and FIG. 15E.

The control of the flow of the stream of gel $87^1$ therethrough the gel supply pipe 122 is controlled by a valve 544, as shown in FIGS. 5A and 7. The valve 544 is operationally configured on the gel supply pipe 122 proximate to the gel supply well 30. The valve 544 is open by maneuvering the valve 544 to be parallel to the gel supply pipe 122 and wherein the valve 544 is closed by maneuvering the valve 544 to be perpendicular to the valve 544.

Opening the valve 544 of the gel supply pipe 122 causes the stream of gel $87^1$ to flow into the metal gel basin 88 of the gel heating metal lift-table 14, and closing the valve 544 causes the stream of gel $87^1$ to cease flowing into the metal gel basin 88 of the gel heating metal lift-table 14.

As shown in FIGS. 1, 5A and 7, the gel heating metal lift-table 14 includes at least one variable frequency drive pump 124. The at least one variable frequency drive pump 124 is configured to deliver a pressure of 300 horse power. The at least one variable frequency drive panel 125 is disposed proximate to the flat metal table bottom 66 of the gel heating metal lift-table 14, the at least one variable frequency drive pump 124 including at least one in-line pipe 126 running parallel to the flat metal bottom of the gel heating metal lift-table 14.

The at least one variable frequency drive pump 124 of the gel heating metal lift-table 14 includes a front end $126^1$ and a rear end $126^2$ wherein the front end $126^1$ of the at least one-inlet pipe 126 is connected to an at least one in-line pipe inlet port 128 centrally disposed within the front facing metal wall of the metal gel basin 88, as shown in FIGS. 5A and 7. The at least one in-line pipe inlet port 128 is fluidly cooperative with the cavity 104 of the metal gel basin 88. The rear end $126^2$ of the at least one-outlet pipe 126 is connected to an at least one in-line pipe outlet port 130 centrally disposed within the rear facing flat metal wall of the metal gel basin 88 such that a variable frequency pressure is pumped therethrough the at least one in-line pump pipe 126 into the gel bath 90 by way of the at least one variable frequency drive pump 124 whereby the predetermined volume of gel 87 is mixed and circulated and recirculated from the front interior facing wall to the rear interior facing wall of the metal gel basin 88 and therethrough the at least one in-line pipe 126.

The at least one variable frequency drive pump 124 is controlled by a variable speed drive controller 125 of the at least one variable frequency drive pump 124 to regulate the speed of the variable pressure forced into the gel 87 within the gel bath 90. The variable speed drive controller 125 of the at least one variable frequency drive pump 124 includes a control panel with an "ON" operating mode switch 127 and an "OFF" operating mode switch 129, a pressure switch 133, a flow switch 135, and a level switch 139.

Figure 13:
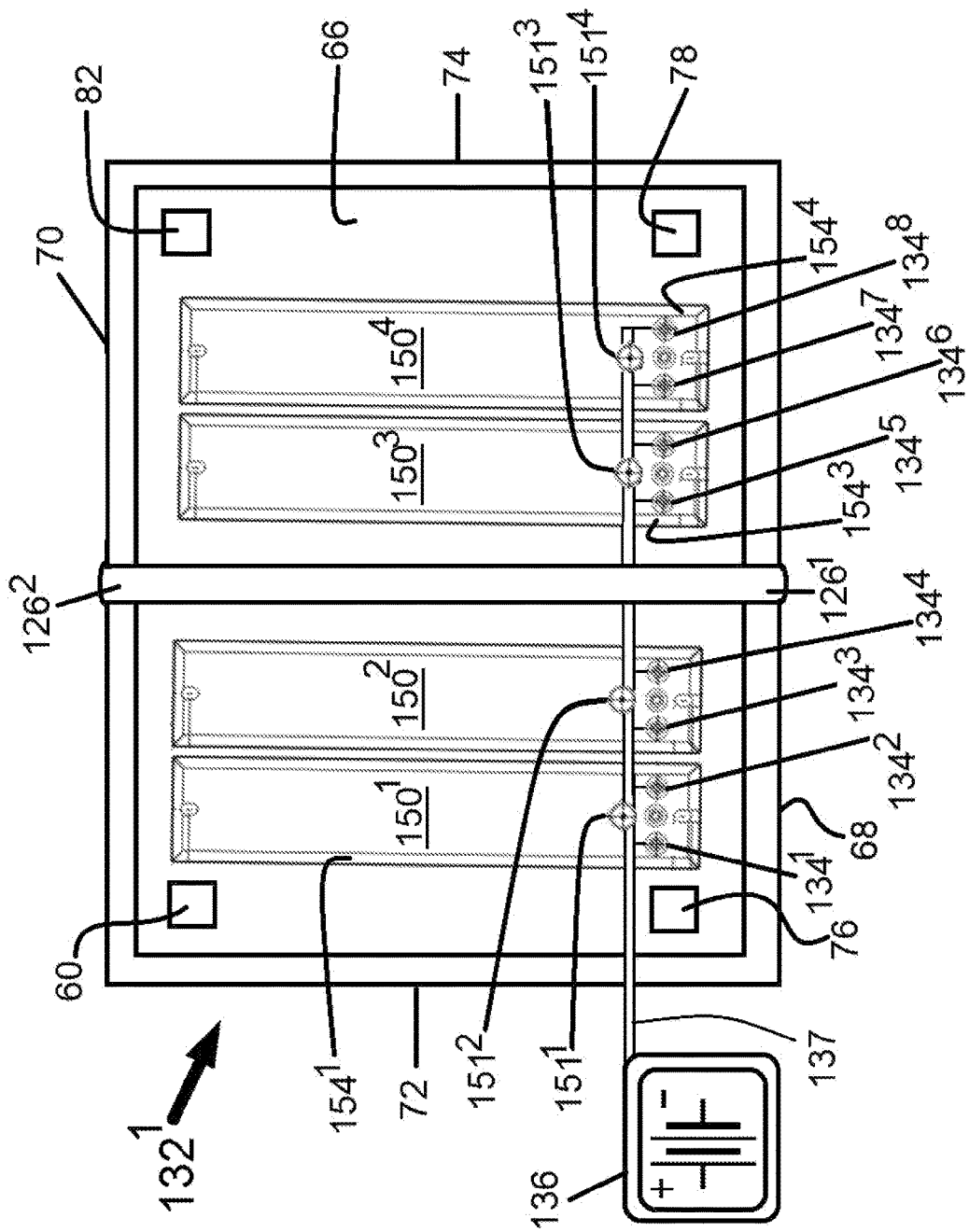
FIG. 13 is a perspective planar view of a planar heater device of the gel-foam body amalgamation system, according to an embodiment of the present invention.
Figure 14:
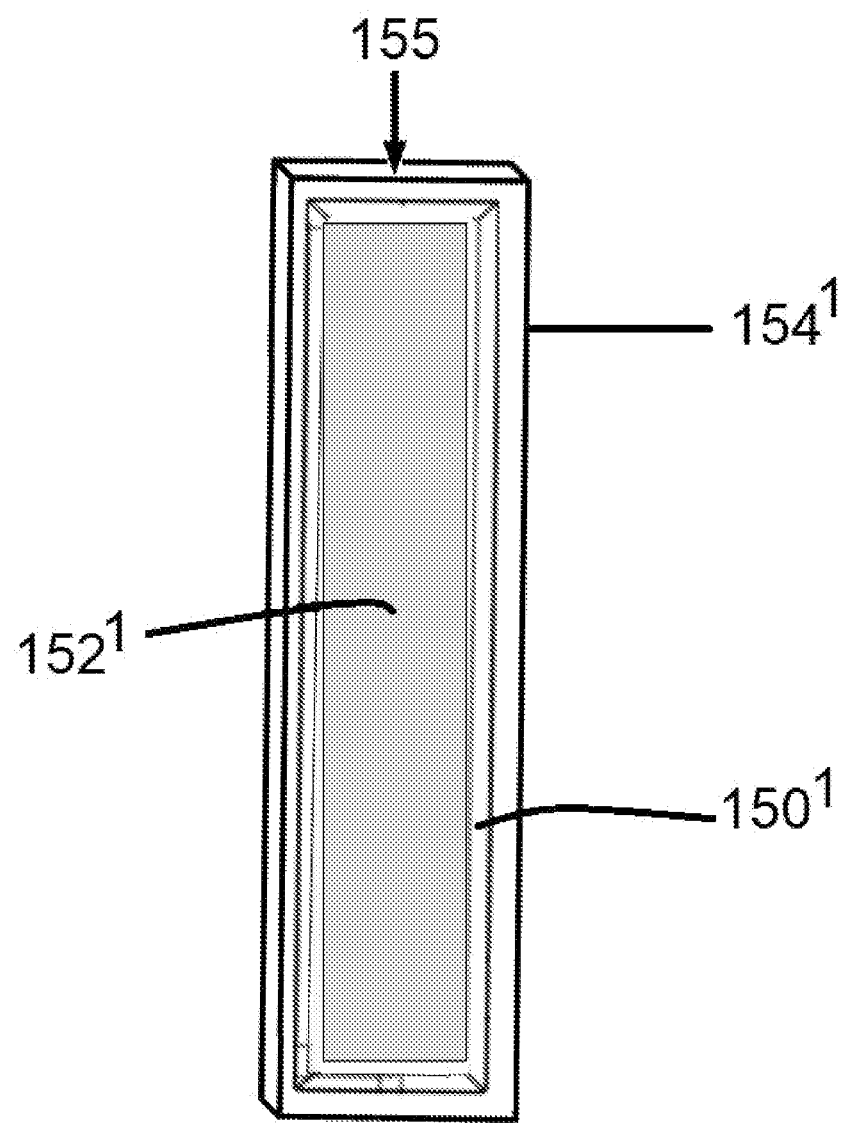
FIG. 14 is a perspective view of an electric conductive metal plate provided with a coating wherein the electric conductive metal plate is encased in a sheathing of the planar heater device of FIG. 13 according to an embodiment of the present invention.
Figure 16A:
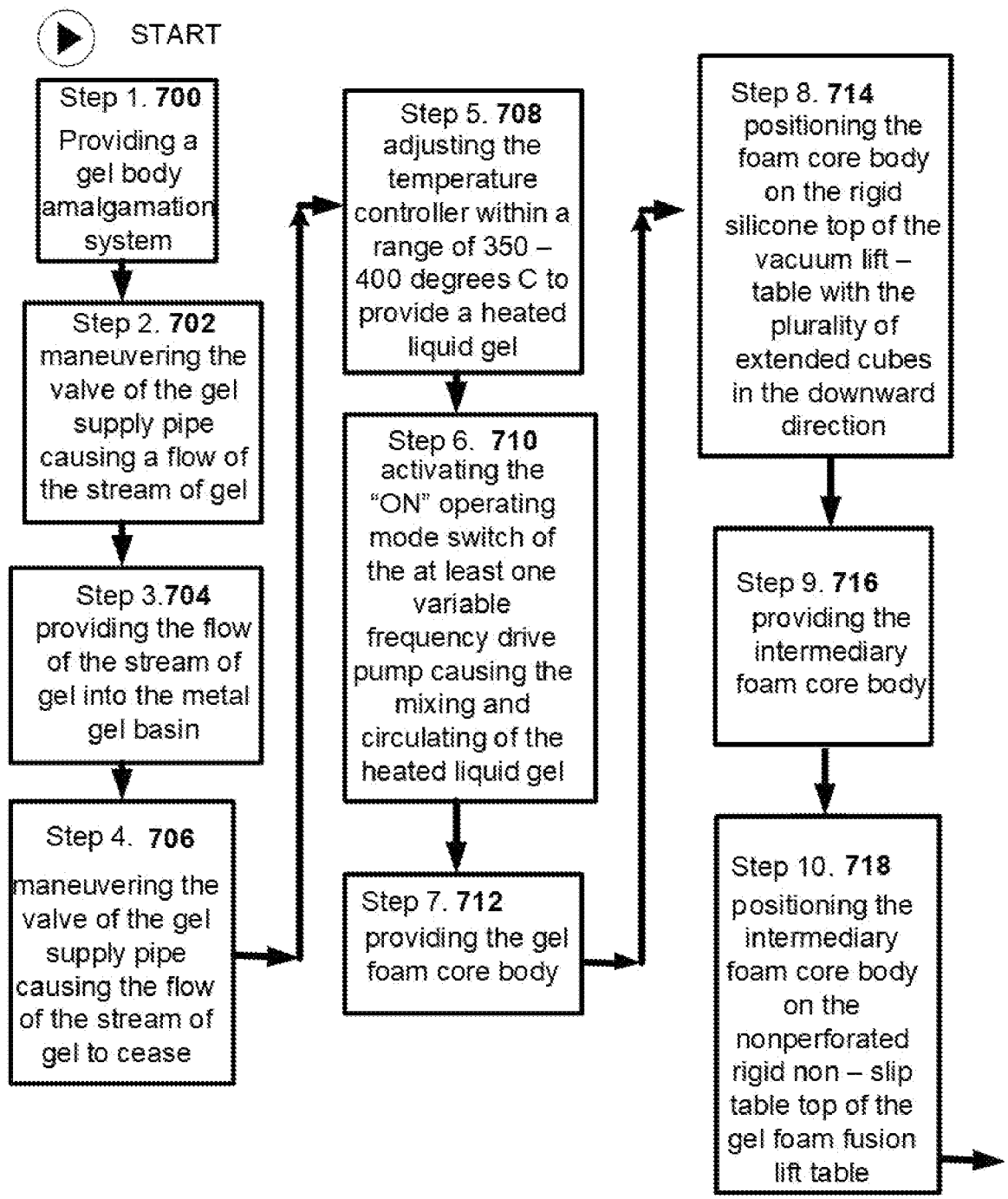
FIG. 16A is a process flow diagram for operation of the gel-foam body amalgamation system producing a dual-core foam body amalgamate including Steps 1-Step 10, according to an embodiment of the present invention.
Figure 16B:
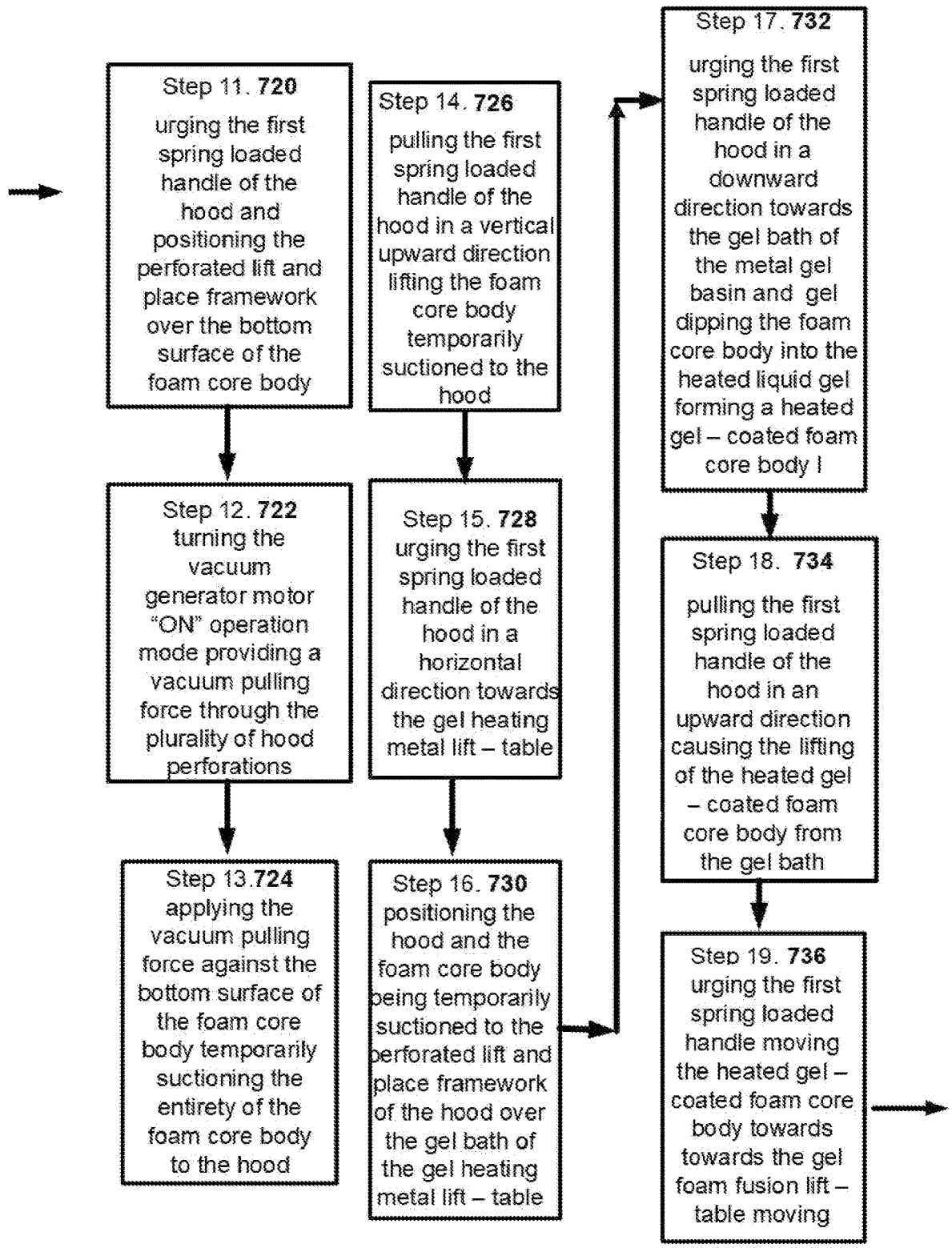
FIG. 16B is a continuation of the process flow diagram of FIG. 16A for operation of the gel-foam body amalgamation system producing the dual-core foam body amalgamate including Steps 11-Step 19, according to an embodiment of the present invention.
Figure 16C:
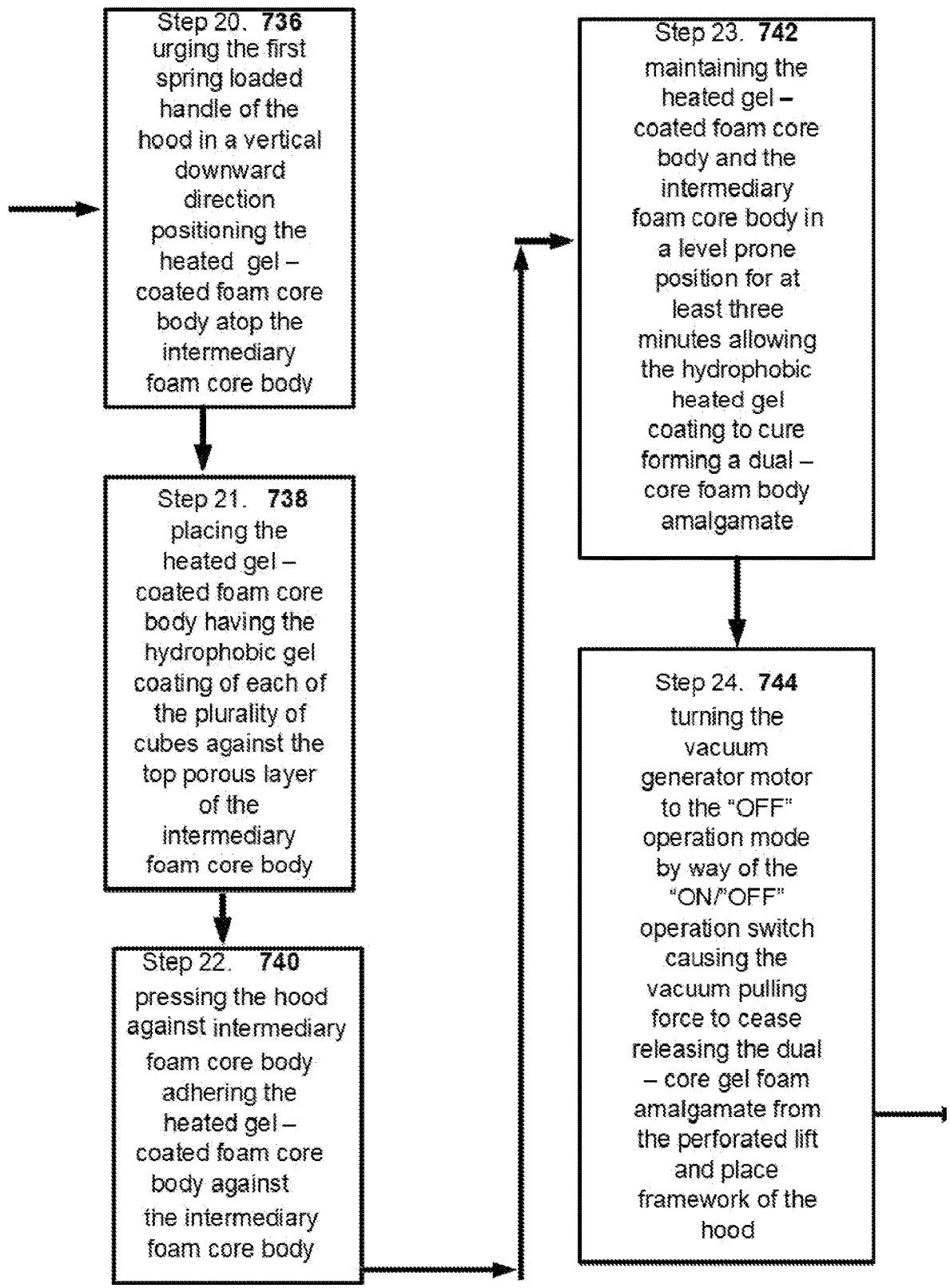
FIG. 16C is a continuation of the process flow diagram of FIG. 16B for operation of the gel-foam body amalgamation system producing the dual-core foam body amalgamate including Steps 20-Step 24, according to an embodiment of the present invention.
Figure 16D:
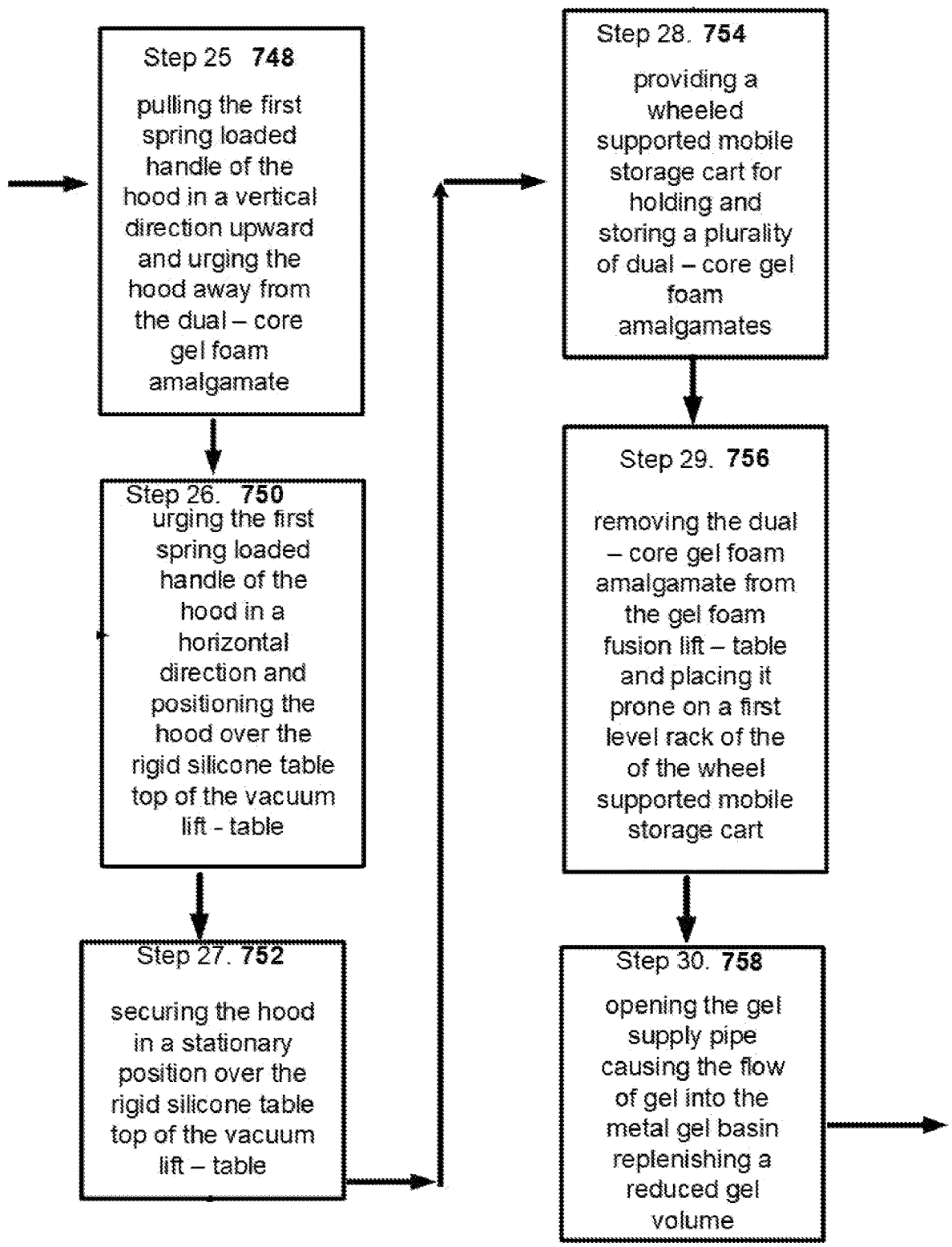
FIG. 16D is a continuation of the process flow diagram of FIG. 16C for operation of the gel-foam body amalgamation system producing the dual-core foam body amalgamate including Steps 25-Step 30, according to an embodiment of the present invention.
Figure 16E:
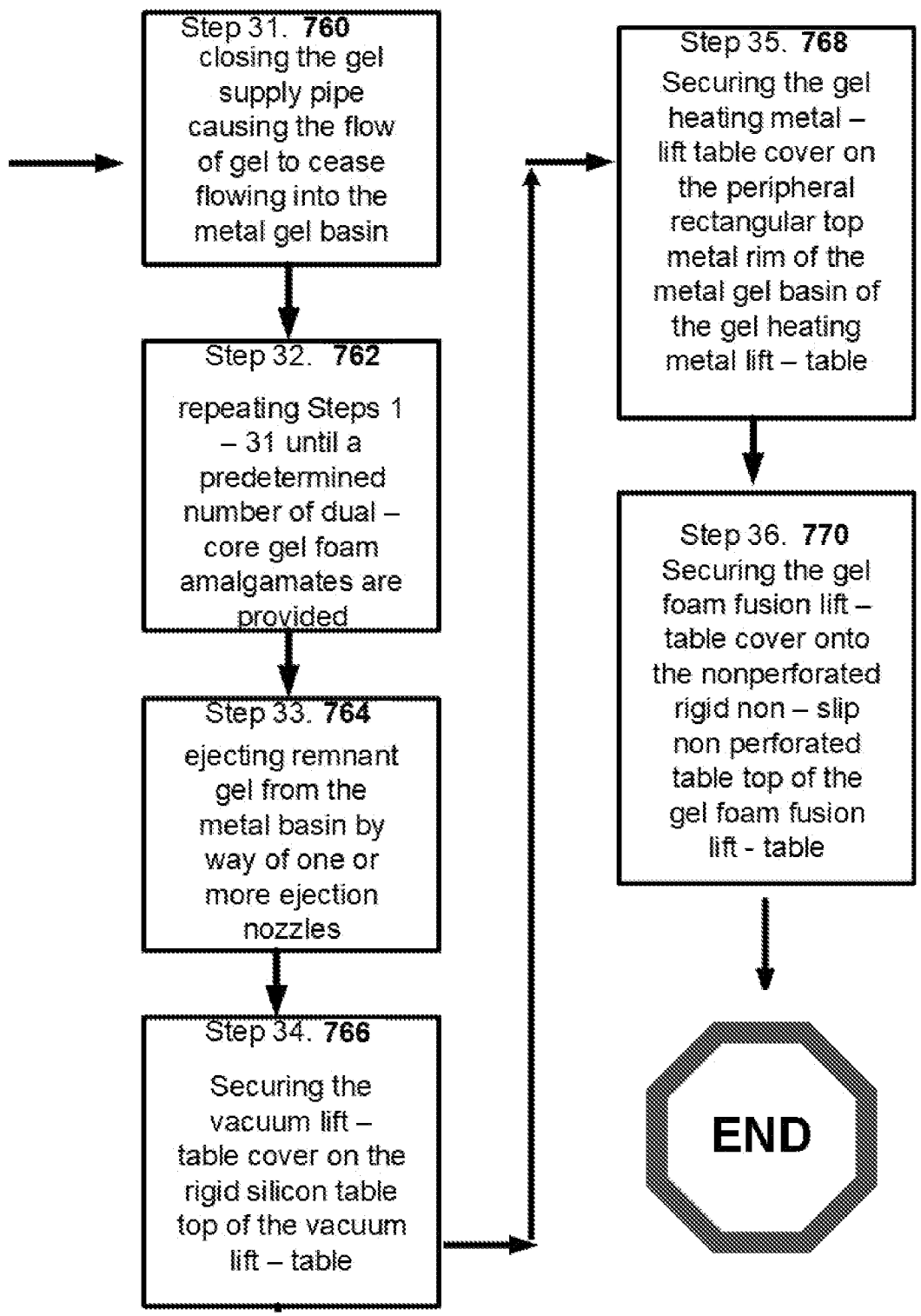
FIG. 16E is a continuation of the process flow diagram of FIG. 16D for operation of the gel-foam body amalgamation system producing the dual-core foam body amalgamate including Steps 31-Step 36, according to an embodiment of the present invention.

As depicted in FIGS. 13 and 14, the gel heating metal lift-table 14 includes at least one planar heater device $132^{1+N}$. FIG. 13 illustrates four planar heater devices $132^1$, $132^2$, $132^3$, $132^4$ fixedly attached to the flat metal table bottom 66 of the gel heating metal lift-table 14 by way of metal bolted connectors $137^{1+N}$. Each of the at least one planar heater device $132^{1+N}$ includes an electric conductive metal plate $150^{1-4}$ including a first electric conductive metal plate $150^1$, a second electric conductive metal plate $150^2$, a third electric conductive metal plate $150^3$ and a fourth electric conductive metal plate $150^{14}$. Each of the four electric conductive metal plates $150^1$, $150^2$, $150^3$, $150^4$ includes two electrodes $134^{1-8}$ being electrically conductive and operationally electrically connected to an electrical connector which is connected to a power source 136.

As shown in FIG. 13, the first electric conductive metal plate $150^1$ includes a first electrode $134^1$ and a second electrode $134^2$; the second electric conductive metal plate $150^2$ includes a third electrode $134^3$ and a fourth electrode $134^4$; the third electric conductive metal plate $150^3$ includes a fifth electrode $134^5$ and a sixth electrode $134^6$; the fourth electric conductive metal plate $150^4$ includes a seventh electrode $134^7$ and an eighth electrode $134^8$. Each of the eight electrodes $134^{1-8}$ is connected to an electric connector $151^{1+N}$ wherein each of the electric connectors is operationally electrically connected to the power source 136 by way of an electrical conduit wherein the electrical conduit 137 is insulated in a non-electric conductive ultrahigh molecular weight polyethylene tube 138. The at least one planar heater device $132^{1+N}$ being mounted and fixedly attached externally to an exterior surface the flat metal table bottom 66 of the gel heating metal lift-table 14 provides a controlled temperature which is generated to enable by way of thermal conduction of the copper plate MXene composite layer of the metal gel basin 88 to heat the gel 87 to a heated liquid gel 87$^1$ or to cool the heated liquid gel 87$^1$ of the gel bath 90 contained in the metal gel basin 88. The controlled temperature of the is regulated by a temperature controller 131 operatively electrically connected to the at least one planar heater device 132$^{1+N}$.

In one exemplary embodiment the gel 87 is heated to a temperature within a range to include 225° F. to about 400° F.

As illustrated in FIG. 14, with reference to FIG. 13, each of the electric conductive metal plates 150$^1$, 150$^2$, 150$^3$, 150$^4$, of each of the at least one planar heater device 132$^{1+N}$ including the first planar heater device132$^1$, the second planar heater device 132$^2$, the third planar heater device 132$^3$, and the fourth heater planar device 132$^4$ is layered in a film 152$^{1+4}$ encased in a sheathing 154$^{1-4}$.

The film 152$^{1+4}$ is selected from MXene coating 156 includes a MXene film EE $T_{i3}$ $C_2T_x$ wherein the MXene Film film including a MXene film $T_{i3}$ $C_2T_x$ wherein Tis a titanium atom, C is a Carbon atom and T is terminal functional atom selected from the group comprising an oxygen atom "O", a hydroxy group "OH", and a fluorine atom "F". The MXene film is provided in a multilayered high-strength film or sheets. The MXene provides high electrical conductivity and a high thermal conductivity. MXene films and MXene sheets are commercially available through Nano Chemazone Catalog.cdr at Nanochemazone®| Premium Nanomaterials Manufacturer and Supplier, Alberta, Canada. https://nanochemazone.com.

As discussed above, see, Rahman, et.al., *MXenes as Emerging Materials: Synthesis, Properties and Applications, Molecules* 2023, 27, 4909. https://doi.org/10.3390/molecules27154909; and Chen et.al., High-strength MXene sheets through interlayer hydrogen bonding for self-healing flexible pressure sensor. Chemical Engineering Journal, Volume 453, Part 1, 1 Feb. 2023. Rahman, et.al., and Chen et.al., incorporated by reference in its entirety.

Each of the sheathings 154$^{1-4}$ includes a framework configured with a sheathing opening 155 to slidably receive each of the electric conductive metal plates 150$^1$, 150$^2$, 150$^3$, 150$^4$. Each of the sheathings 154$^{1-4}$ provides protection for the electric conductive metal plates 150$^1$, 150$^2$, 150$^3$, 150$^4$ and each coating 154$^{1-8}$ provided on each of the electric conductive metal plates 150$^1$, 150$^2$, 150, 150$^4$.

Each of the sheathings 154$^{1-4}$ can be made from any one of the materials selected from the group comprising: polyethylene, terephthalate, polyvinyl alcohol, polypropylene, polystyrene, polycarbonate, polyethylene, polyamide, resins and combinations thereof.

With reference to FIGS. 1, 5A and 8, the gel foam fusion lift-table 16 includes a table structure including a rigid non-slip non-perforated table top 164 and a rigid non-slip non-perforated table bottom 166 joined by four rigid walls including a rigid front facing non-slip wall front facing rigid non-slip wall 168, a rigid rear facing non-slip wall 170, a first rigid non-slip side wall 172 and an opposing second rigid non-slip side wall 174 joined at four corners. The rigid non-slip table top 164 and the rigid non-slip table bottom 166 is non-perforated. The rigid non-slip table top 164 is dimensioned with a surface area of at least 84×76 inches. In this manner, the gel foam fusion lift-table 16 can receive a variety of sizes of foam core bodies ranging to equivalent sizes of a King mattress (80×76 inches); a Queen size mattress (80×60 inches); a Double size mattress (75×73 inches); and a Twin size mattress (75×38); and for pillows, cushions, stuffed toys, and a variety of support devices.

The gel foam fusion lift-table 16 is supported by four insulated table support columns 176, 178, 180, 182 including a first front insulated table support column 176, a second front insulated table support column 178, a first back insulated table support column 180 and a second back insulated table support column 182 wherein the four insulated table support columns 176, 178, 180, 182 are integrated with a gel foam fusion hydraulic lift device 184 whereby the gel foam fusion lift-table 16 is lowered and raised being actuated by a gel foam fusion lift-table controller 623. With this exemplary embodiment, the operator can select the customized operator height position of the gel foam fusion lift-table 16. In this manner the operator can work at a comfortable position and has easy access to the gel foam fusion lift-table 16 and the hood 22 taking in consideration the height of the operator, the length of the operator's arms, whether the operator is seated in a chair, or a wheelchair.

The rigid non-slip table top 164 of the gel foam fusion lift-table 16 is dimensioned with a surface area of at least 84×76 inches. In this manner, the vacuum lift-table can receive a variety of sizes of foam core bodies ranging to equivalent sizes of a King mattress (80×76 inches); a Queen size mattress (80×60 inches); a Double size mattress (75×73 inches); and a Twin size mattress (75×38); and for pillows, cushions, stuffed toys, and a variety of support devices.

The operations of the gel-foam body amalgamation system 10 is implemented with the foam core body 24 and intermediary foam core body 26. As depicted in FIGS. 5A-7 and 15A, the foam core body 24 is configured with a thickness, a length, and a width, a top core body portion 186 and a bottom core body portion 188 wherein the top core body portion 186 includes a top side 186$^1$ having a flat top porous surface and the bottom core body portion 188 having a bottom side 188$^1$ having a flat bottom porous surface.

As know by a person having ordinary skill in the art, the gel-foam body amalgamation system 10 alternative core bodies can be implemented in an alternative to the foam core body 24. The gel-foam body amalgamation system 10 can be implemented with core bodies including, silicone, foam, silicone, vinyl foam, rubber, polyethylene, polyethylene terephthalate, polyvinyl alcohol, polypropylene, polystyrene, polycarbonate, polyamide, and resins and any combinations thereof.

The top core body portion 186 and the bottom body core portion 188 are joined by two lateral porous side walls 190, 192 a first lateral porous side wall 190 and a second opposing lateral side wall 192 and two longitudinal porous side walls 194, 196 a front longitudinal porous side wall 194, and a rear longitudinal porous side wall 196. The foam core body 24 is dimensioned wherein the top core body portion 186 includes a square footage equal to the square footage of the bottom core body portion 188.

The foam core body 24 is manipulated to include a series of a plurality of extended cubes 198$^{1+N}$, as shown in FIGS. 5A-8, and more particularly, in FIGS. 15B-15C, and 15E, which are carved within the bottom core body portion 188 of the foam core body 24 by way of a contour saw (not shown). Each of the extended cubes 198$^{1+N}$ of the series of the plurality of extended cubes 198$^{1+N}$ are configured in symmetrical alignment a first distance from each other aligned in a plurality of rows 200$^{1+N}$ and a plurality of columns 202$^{1+N}$ interconnected by a plurality recessed channels 204$^{1+N}$ bordered by an adjourned peripheral rim 206, wherein each of the plurality of extended cubes 198$^{1+N}$ is configured with a cube thickness which is less than the thickness of the foam core body 24.

The foam core body 24 and manufacturing the dual-core foam body amalgamate 600 as described herein provide a number of benefits. The top core body portion 186 of the foam core body 24 itself acts as the mold for the gel 87. The cost and complexity of utilizing a conventional metal mold is thereby eliminated. The need for tooling a metal mold is also eliminated. The composite support is not limited in size and configuration by available mold length limitations. Significantly, the considerable effort normally required to remove the gel 87 from the mold is no longer needed. Moreover, no additional materials or steps are needed to adhere the gel 87 to the plurality of extended cubes $50^{1+N}$ and a border-line portion of the exterior surface of the recessed channels of the bottom core body portion 188 of the foam core body 24. The heated gel is cured and bonded to and ready for virtually immediate use with the foam core body 24 providing the mold.

As depicted in FIGS. 5A, 8, and more particularly, FIGS. 15A-15E, the intermediary foam core body 26, is configured to be fused with the foam core body 24 to form a dual-core foam body amalgamate 600 as depicted in FIGS. 5A, 8 and FIG. 15E. The intermediary foam core body 26 is dimensioned with a square footage equal to the square footage of the foam core body 24. The intermediary foam core body 26 includes a flat top facing wall 210 and a flat bottom facing wall 212 joined by four side walls including a flat front wall 214, a flat rear wall 216, joined by two flat lateral side walls 218, 220, a first porous flat lateral side wall 218 and an opposing second flat lateral side wall 220 wherein the flat top facing wall 210 includes a top porous layer and the flat bottom facing wall 212 includes a bottom porous layer.

The intermediary foam core body 26 is dimensioned with a length, a width, a thickness, an intermediary foam core body square footage which is equal to the thickness, the length, the width, and the core body square footage of the foam core body 24. In this manner the intermediary foam core body 26 aligns symmetrically with the foam core body 24 to form the dual-core foam body amalgamate 600, as depicted in FIGS. 5A, 8 and FIG. 15E.

As know by a person having ordinary skill in the art, the gel-foam body amalgamation system 10 alternative intermediary core bodies can be implemented in an alternative to the intermediary foam core body 26. The gel-foam body amalgamation system 10 can be implemented with material which is selected from anyone of the group comprising, foam, silicone, vinyl foam, rubber, polyethylene, polyethylene terephthalate, polyvinyl alcohol, polypropylene, polystyrene, polycarbonate, polyamide, and resins based on any one of them. and any combinations thereof.

The gel-foam body amalgamation system 10 includes the overhead double-beam bridge crane 18, as depicted in FIGS. 1-8, is configured to support the hood conveyor apparatus 20 allowing the hood 22 to steadily travel along a front I-beam bridge 242 and a rear I-beam bridge 244 to each of the vacuum lift-table 12, the gel heating metal lift-table 14, and the gel foam fusion lift-table 16 during the operation of producing the dual-core foam body amalgamate 600.

The overhead double-beam bridge crane 18 is fortified by four upright metal box columns 222, 224, 226, 228, a first upright metal box column 222, a second upright metal box column 224, a third upright metal box column 226, a fourth upright metal box column 228, and a first metal link beam 230, a second metal link beam 232. A front end $230^1$ of the first metal link beam 230 is fixedly attached to a top end $222^1$ of the first upright metal box column 222 by way of a first bolted column end plate 234 and a rear end $230^2$ of the first metal link beam 230 is fixedly attached to a top end $226^1$ of the third upright metal box column 226 by way of a second bolted column end plate 236. A front end $232^1$ of the second metal link beam 232 is fixedly attached to a top end $224^1$ of the second upright metal box column 224 by way of a third bolted column end plate 238 and a rear end $232^2$ of the second metal link beam 232 is fixedly attached to a top end $228^1$ of the fourth upright metal box column 228 by way of a fourth bolted column end plate 240.

With reference to FIGS. 1-5A, the two I-beam bridges 242, 244 of the overhead double-beam bridge crane 18 include the front I-beam bridge 242 and the rear I-beam bridge 244. The front I-beam bridge 242 and the rear I-beam bridge 244 are fixedly attached a predetermined distance apart and parallel to each other oriented oligomeric to the first metal link beam 230 and the second metal link beam 232. A first end 2421 of the front I-beam bridge 242 is fixedly attached by way of a first bolted I-beam end plate 246 to a first trolley end stop 248 disposed at the front end $230^1$ of the first metal link beam 230 and an opposing second end $242^2$ of the front I-beam bridge 242 is fixedly attached to a second trolley end stop 250 disposed at the front end $232^1$ of the second metal link beam 232 by way of a second bolted I-beam end plate 252. A first end $244^1$ of the rear I-beam bridge 244 is fixedly attached to a third trolley end stop 254 disposed at the rear end $230^2$ of the first metal link beam 230 by way of a third bolted I-beam end plate 256 and an opposing second end $244^2$ of the rear I-beam bridge 244 is fixedly connected to a fourth trolley end stop 258 disposed at the rear end $232^2$ of the second metal link beam 232 by way of a fourth I-beam end plate 260. By way of this construction of the front I-beam bridge 242 and the rear I-beam bridge 244 fixedly attached to the first metal link beam 230 and the second metal link beam 232 a major framed open space is circumscribed to abide the vacuum lift-table 12, the gel heating metal lift-table 14, the gel foam fusion lift-table 16 and the hood 22 being supported by the hood conveyor apparatus 20, as depicted in FIGS. 1 and 5A.

To facilitate the movement of the hood conveyor apparatus 20, as depicted in FIGS. 1-5A, the two I-beam bridges 242, 244 of the overhead double-beam bridge crane 18 are in working operation with four trolleys 262, 264, 266, 268, a first trolley 262, a second trolley 264, a third trolley 266, a fourth trolley 268, wherein the first trolley 262 is operationally coupled to the front I-beam bridge 242 by way of a first trolley carriage 270 and the second trolley 264 is operationally coupled to the front I-beam bridge 242 by way of a second trolley carriage 274, the third trolley 266 operationally coupled to the rear I-beam bridge 244 by way of a third trolley carriage 276 and the fourth trolley 268 operationally coupled to the rear I-beam bridge 244 by way of a fourth trolley carriage 278.

Figure 5B:
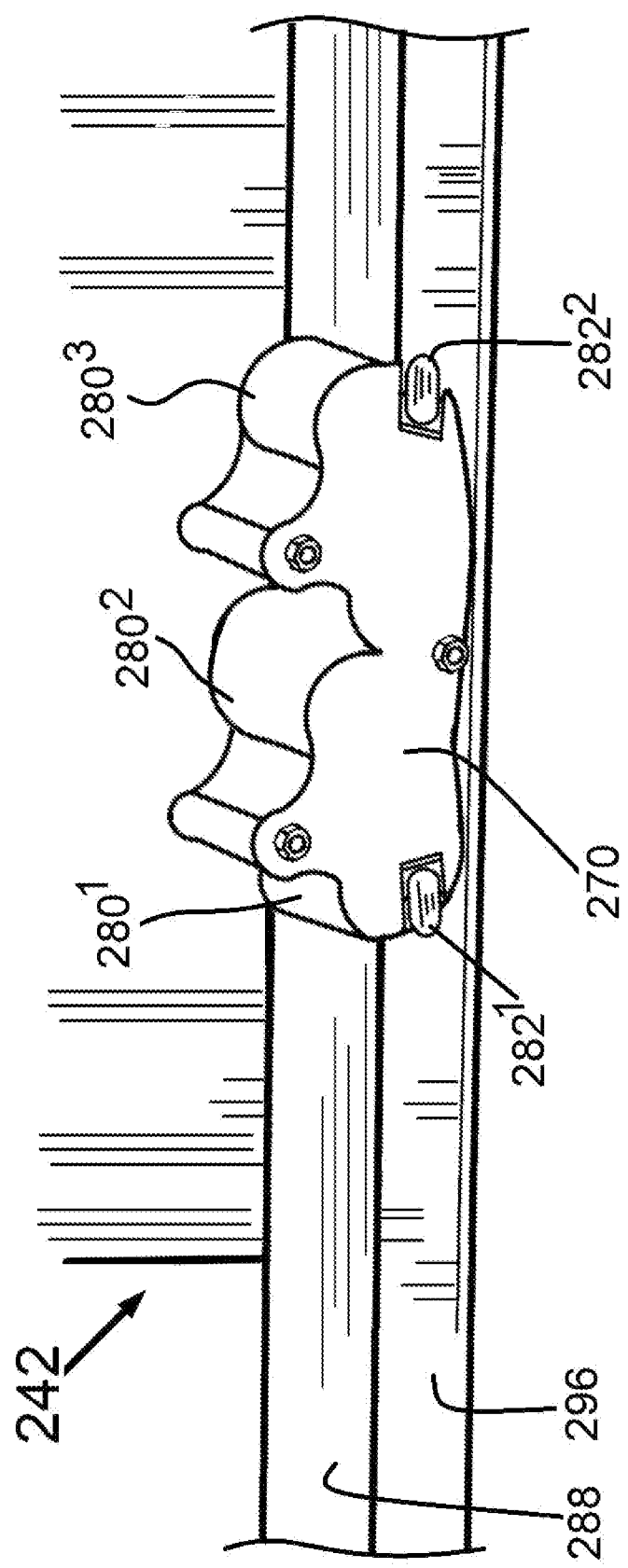
FIG. 5B is a perspective view of a trolley carriage of a trolley in working operation with the overhead double-beam bridge crane of the gel-foam body amalgamation system, according to an embodiment of the present invention.

As depicted in FIG. 5B, as applied to FIGS. 1-5A, 6-8, each of the first trolley carriage 270 of the first trolley 262 and the second trolley carriage 274 of the second trolley 264 is configured with a first set of at least six radial rollers $280^{1-6}$, a first set of at least four side rollers $282^{1-4}$ and a second set of at least six radial rollers $284^{1-6}$, a second set of at least four side rollers $286^{1-4}$ to operationally couple each of the first trolley 262 and the second trolley 264 to the front I-beam bridge 242, respectively, and whereby the first trolley 262 and the second trolley 264 are each moveably operational along a length of the front I-beam bridge 242 by way of each of the first set of at least six radial rollers $280^{1-6}$ and the first set of at least four side rollers $282^{1-4}$ of the first trolley carriage 270 of the first trolley 262 and the second set of at least six radial rollers $284^{1-6}$ and the second set of at least four side rollers $286^{1-4}$ of the second trolley carriage 274 of the second trolley 264.

The first trolley carriage 270 of the first trolley 262 is in working operation with the front I-beam bridge 242 of the overhead double-beam bridge crane 18. In particular, the first trolley carriage 270, the first set of the at least six radial rollers first set of at least six radial rollers $280^{1-6}$ of the first trolley carriage 270 of the first trolley 262 includes a series of three anterior radial rollers $280^{1-3}$ which is coplanar with a series of three posterior radial rollers $280^{3-6}$ wherein the set of three anterior radial rollers $280^{1-3}$ of the first trolley carriage 270 of the first trolley 262 are oriented to come in contact with an anterior side flat bearing surface 288 of a front I-beam track $290^1$ of the front I-beam bridge 242 and the three posterior radial rollers $280^{3-6}$ of the first trolley carriage 270 of the first trolley 262 are oriented to come in contact with a posterior side flat bearing surface 292 of a rear I-beam track $290^2$ of the front I-beam bridge 242.

In addition, the first set of the at least four side rollers $282^{1-4}$, as depicted in FIG. 5B, of the first trolley carriage 270 of the first trolley 262 includes two anterior side rollers $282^{1-2}$ which are coplanar with two posterior side rollers $282^{3-4}$. The two anterior side rollers $282^{1-2}$ includes a first anterior side roller colinear $282^1$ with a second anterior side roller $282^2$. The first anterior side roller $282^1$ is operationally attached at a first anterior cut-out lead portion $294^1$ of the first trolley carriage 270 of the first trolley 262 and the second anterior side roller $282^2$ is operationally attached at an opposing second anterior cut-out lead portion $294^2$ of the first trolley carriage 270 of the first trolley 262.

Continuing with the first trolley 262, the opposing second anterior cut-out lead portion $294^2$ of the first trolley carriage 270 of the first trolley 262 is configured at a first lateral distance from the first anterior cut-out lead portion $294^1$ of the first trolley carriage 270. The first anterior side roller $282^1$ and the second anterior roller $282^2$ is oriented to come in line contact with an anterior side perpendicular bearing wall 296 of the front I-beam bridge 242. The two posterior side rollers $282^{3-4}$ includes a first posterior side roller $282^3$ and a second posterior side roller $282^4$. The first posterior side roller $282^3$ is operationally attached at a first posterior cut-out lead portion $298^1$ of the first trolley carriage 270 and the second posterior side roller $282^4$ is operationally attached at an opposing second posterior cut-out lead portion $298^2$ of the first trolley carriage 270, the opposing second posterior cut-out lead portion $298^2$ is configured at a second lateral distance from the first posterior cut-out lead portion 298 of the first trolley carriage 270 of the first trolley 262. The first posterior side roller $282^3$ and the second posterior roller $284^2$ is oriented to come in line contact with an anterior side perpendicular bearing wall 296 of the front I-beam bridge 242.

The first lateral distance between the first anterior cut-out lead portion $294^1$ and the second anterior cut-out lead portion $294^2$ is equal to the second lateral distance between the first posterior cut-out lead portion $298^1$ and the second posterior cut-out lead portion $298^2$ of the first trolley carriage 270 to enable an equalizing balance of the two anterior side rollers $282^{1-2}$ and the two anterior side rollers and the two posterior side rollers $282^{3-4}$ against the anterior side perpendicular bearing wall 296 and a posterior side perpendicular bearing wall 302 of the front I-beam bridge 242 of the overhead double-beam bridge crane 18.

The first posterior side roller $282^3$ and the second posterior side roller $282^4$ of the first trolley carriage 270 of the first trolley 262 are each oriented to come in line contact with the posterior side perpendicular bearing wall 302 of the front I-beam bridge 242, wherein when the two anterior side rollers $282^{1-2}$ and the two posterior side rollers $282^{3-4}$ of the first trolley carriage 270 of the first trolley 262 concomitantly come in contact against the anterior side perpendicular bearing wall 296 and the posterior side perpendicular bearing wall 302 of the front I-beam bridge 242, respectively, the first trolley carriage 270 of the first trolley 262 is movably constrained to enable a steady horizontal movement of the first trolley carriage 270 of the first trolley 262 along the front I-beam bridge 242 moving in either direction towards the first trolley end stop 248 or towards the second trolley end stop 250.

The second trolley carriage 274 of the second trolley 264 are in working operation with the front I-beam bridge 242 of the overhead double-beam bridge crane 18. The second set of at least six radial rollers $284^{1-6}$ of the second trolley carriage 274 of the second trolley 264 includes a series of three anterior radial rollers $284^{1-3}$ of the second trolley carriage 274 of the second trolley 264 which is coplanar with a second series of the three posterior radial rollers $280^{3-6}$ of the second trolley carriage 274 of the second trolley 264 wherein the series of three anterior radial rollers $284^{1-3}$ of the second trolley carriage 274 of the second trolley 264 are oriented to come in contact with the anterior side flat bearing surface 288 of the front I-beam track 290 of the front I-beam bridge 242 and the three posterior radial rollers $280^{3-6}$ of the second trolley carriage 274 of the second trolley 264 are oriented to come in contact with the posterior side flat bearing surface 292 of the rear I-beam track $290^2$ of the front I-beam bridge 242 of the overhead double-beam bridge crane 18.

The second trolley carriage 274 of the second trolley 274 includes the second set of the at least four side rollers $286^{1-4}$ that is working operation with the front I-beam bridge 242 of the overhead double-beam bridge crane 18. The second set of the at least four side rollers $286^{1-4}$ of the second trolley carriage 274 of the second trolley 264 includes two anterior side rollers $286^{1-2}$ of the second trolley carriage 274 of the second trolley 264 which are coplanar with two posterior side rollers $286^{3-4}$ of the second trolley carriage 274 of the second trolley 264.

The two anterior side rollers $286^{1-2}$ of the second trolley carriage 274 of the second trolley 264 includes a first anterior side roller $286^1$ of the second trolley carriage 274 of the second trolley 264 colinear with a second anterior side roller $286^2$ of the second trolley carriage 274 of the second trolley 264. The first anterior side roller $286^1$ of the second trolley carriage 274 of the second trolley 264 is operationally attached at a first anterior cut-out lead portion $304^1$ of the second trolley carriage 274 of the second trolley 264 and the second anterior side roller $286^2$ of the second trolley carriage 274 is operationally attached at an opposing second anterior cut-out lead portion $304^2$ of the second trolley carriage 274 of the second trolley 264. The opposing second cut-out lead portion $304^2$ of the second trolley carriage 274 being configured at a lateral distance from the first anterior cut-out lead portion $304^1$ of the second trolley carriage 274 of the second trolley 264. The first anterior side roller $286^1$ and the second anterior side roller $286^2$ of the second trolley carriage 274 of the second trolley 264 is oriented to come in line contact with the anterior side perpendicular bearing wall 296 of the front I-beam bridge 242.

In addition, the two posterior side rollers $286^{3-4}$ of the second trolley carriage 274 of the second trolley 264 includes a first posterior side roller $286^3$ and a second posterior side roller $286^4$. The first posterior side roller $286^3$ of the second trolley carriage 274 of the second trolley 264 is operationally attached at a first posterior cut-out lead portion $306^1$ of the second trolley carriage 274 of the second trolley 264 and the second posterior side roller $286^4$ is operationally attached at an opposing second posterior cut-out lead portion $306^2$ of the second trolley carriage 274 of the second trolley 264.

The first posterior side roller $286^3$ and the second posterior side roller $286^4$ of the second trolley carriage 274 of the second trolley 264 are each oriented to come in line contact with the posterior side perpendicular bearing wall 302 of the front I-beam bridge 242, wherein when the two anterior side rollers $286^{3-4}$ of the second trolley carriage 274 of the second trolley 264 and the two posterior side rollers $286^{3-4}$ of the second trolley carriage 274 of the second trolley 264 concomitantly come in contact against the anterior side perpendicular bearing wall 296 and the posterior side perpendicular bearing wall 302 of the front I-beam bridge 242, respectively, the second trolley carriage 274 of the second trolley 264 is movably constrained to enable a steady horizontal movement of the second trolley carriage 274 of the second trolley 264 along the front I-beam bridge 242 moving in either direction towards the first trolley end stop 248 or towards the second trolley end stop 250.

Similarly, the third trolley 266 includes the third trolley carriage 276 and the fourth trolley 268 includes the fourth trolley carriage 278 in working operation with the rear I-beam bridge 244 of the overhead double-beam bridge crane 18. The third trolley carriage 276 of the third trolley 266 and the fourth trolley carriage 278 of the fourth trolley 268 is configured with a third set of at least six radial rollers $308^{1-6}$, a third set of at least four side rollers $310^{1-4}$ and a fourth set of at least six radial rollers $312^{1-6}$, a fourth set of at least four side rollers $314^{1-4}$, to operationally couple each of the third trolley 266 and the fourth trolley 268 to the rear I-beam bridge 244, respectively. In this manner, the third trolley 266 and the fourth trolley 268 are each moveably operational along a length of the rear I-beam bridge 244 by way of the six radial rollers $308^{1-6}$ and the four side rollers $314^{1-4}$, fixedly attached to the third trolley carriage 276 and the fourth trolley carriage 278, respectively.

The third trolley carriage 276 of the third trolley 266 includes the third set of the at least six radial rollers $308^{1-6}$ band includes a series of three anterior radial rollers $308^{1-3}$ which is coplanar with a series of three posterior radial rollers $308^{3-6}$. The three anterior radial rollers $308^{1-3}$ of the third trolley carriage 276 are oriented to come in contact with an anterior side flat bearing surface 316 of a rear I-beam track 318 of the rear I-beam bridge 244 and the three posterior radial rollers $308^{3-6}$ are oriented to come in contact with a posterior side flat bearing surface 320 of the rear I-beam track 318 of the rear I-beam bridge 244.

The third set of the at least four side rollers $310^{1-4}$ of the third trolley carriage 276 of the third trolley 266 includes two anterior side rollers $310^{1-2}$ which are coplanar with two posterior side rollers $310^{3-4}$. The two anterior side rollers $310^{1-2}$ includes a first anterior side roller $310^1$ colinear with a second anterior side roller $310^2$ wherein the first anterior side roller $310^1$ is positioned at a first anterior cut-out lead portion $324^1$ of the third trolley carriage 276 of the third trolley 266. The second anterior side roller $310^2$ is positioned at an opposing second cut-out lead portion $324^2$ of the third trolley carriage 276 of the third trolley 266.

The first anterior side roller $310^1$ and the second anterior side roller $310^2$ of the third trolley carriage 276 of the third trolley 266 is oriented to come in line contact with an anterior side perpendicular bearing wall $326^1$ of the rear I-beam bridge 244. The second set of two posterior side rollers two posterior side rollers $310^{3-4}$ includes a first posterior side roller $310^3$ and a second posterior side roller $310^4$ of the third trolley carriage 276 of the third trolley 266. The first posterior side roller two posterior side rollers $310^3$ is positioned at a first posterior cut-out lead portion $328^1$ of the third trolley carriage 276 of the third trolley 266 and the second posterior side roller $310^4$ is positioned at an opposing second posterior cut-out lead portion $328^2$ of the third trolley carriage 276 of the third trolley 266. The first posterior side roller $310^3$ and the second posterior side roller $310^4$ are each oriented to come in line contact with a posterior side perpendicular bearing wall $326^1$ of the rear I-beam bridge 224, wherein when the two anterior side rollers $326^{1-2}$ and the two posterior side rollers $326^{3-4}$ of the third trolley carriage 276 of the third trolley 266 concomitantly come in contact against the anterior side perpendicular bearing wall $326^1$ and the posterior side perpendicular bearing wall $326^2$ of the rear I-beam bridge 244, respectively, the third trolley carriage 276 of the third trolley 266 is movably constrained to enable a steady horizontal movement of the third trolley carriage 276 of the third trolley 266 along the rear I-beam bridge 224 moving in either direction towards the third trolley end stop 254 or towards the fourth trolley end stop 258.

The fourth trolley carriage 278 of the fourth trolley 268 includes at least six radial rollers $312^{1-6}$ and the least of four side rollers $314^{1-4}$ in working operation with the rear I-beam bridge 224 of the overhead double-beam bridge crane 18. The at least six radial rollers $312^{1-6}$ of the fourth trolley carriage 278 of the fourth trolley 268 includes a series of three anterior radial rollers $312^{1-3}$ which is coplanar with a series of three posterior radial rollers $312^{4-6}$. The set of three anterior radial rollers $312^{1-3}$ are oriented to come in contact with the anterior side flat bearing surface 316 of a rear I-beam track 318 of the rear I-beam bridge 244 and the three posterior radial rollers $312^{4-6}$ are oriented to come in contact with the posterior side flat bearing surface 320 of the rear I-beam track 318 of the rear I-beam bridge 244.

The at least of four side rollers $314^{1-4}$ of the fourth trolley carriage 278 of the fourth trolley 268 includes two anterior side rollers $314^{1-2}$ which are coplanar with two posterior side rollers $312^{3-4}$. The two anterior side rollers $314^{1-2}$ includes a first anterior side roller $314^1$ colinear with a second anterior side roller $314^2$ of the fourth trolley carriage 278 of the fourth trolley 268 wherein the first anterior side roller $314^1$ is positioned at a first anterior cut-out lead portion $330^1$ of the fourth trolley carriage 278 of the fourth trolley 268 and the second anterior side roller $314^2$ is positioned at an opposing second anterior cut-out lead portion $330^2$ of the fourth trolley carriage 278 of the fourth trolley 268. The first anterior side roller $314^1$ and the second anterior side roller $314^2$ of the fourth trolley carriage 278 of the fourth trolley 268 is oriented to come in line contact with the anterior side perpendicular bearing wall $326^1$ of the rear I-beam bridge 244.

The two posterior side rollers $312^{3-4}$, includes a first posterior side roller $312^3$ and a second posterior side roller $312^4$ of the fourth trolley carriage 278 of the fourth trolley 268 wherein the first posterior side roller $312^3$ is positioned at a first posterior cut-out lead portion $332^1$ of the fourth trolley carriage 278 of the fourth trolley 268 and the second posterior side roller $312^4$ is positioned at an opposing second posterior cut-out lead portion $332^2$ of the fourth trolley carriage 278 of the fourth trolley 268, the opposing second posterior cut-out lead portion $332^2$.

The first posterior side roller $312^3$ and the second posterior side roller $312^4$ are each oriented to come in line contact with the posterior side perpendicular bearing wall $326^2$ of the rear I-beam bridge 244 wherein when the two anterior side rollers $312^{1-2}$ and the two posterior side rollers $312^{3-4}$ of the fourth trolley carriage 278 of the fourth trolley 268 concomitantly come in contact against the anterior side perpendicular bearing wall $326^1$ and the posterior side perpendicular bearing wall $326^2$ of the rear I-beam bridge 224, respectively, whereby the fourth trolley carriage 278 of the fourth trolley 268 is movably constrained to enable a steady horizontal movement of the fourth trolley carriage 278 of the third trolley 266 along the rear I-beam bridge 224 moving in either direction towards the third trolley end stop 254 or towards the fourth trolley end stop 258 of the rear I-beam bridge 224.

As depicted in FIGS. 1-2, 4-5A, 6-8, the gel-foam body amalgamation system 10 includes a hood conveyor apparatus 20 configured with structural and utilitarian frames to support the hood 22 as the hood 22 moves in a horizontal direction to each of the vacuum lift-table 12, the gel heating metal lift-table 14, and the gel foam fusion lift-table 16 and in a vertical upward direction and downward direction during the operation of the gel-foam body amalgamation system 10 in the formation of the dual-core foam body amalgamate 600, with reference to FIG. 15E.

The hood conveyor apparatus 20, as depicted in FIGS. 1-2, 4-5A, 6-8, includes an upper conveyor frame 334 and a lower conveyor frame 338 coplanar to each other fixedly joined to an anchorage conveyor frame 336. The anchorage conveyor frame 336 is configured having a rectangular shaped structure being disposed in a transverse plane between the upper conveyor frame 334 and the lower conveyor frame 338 whereby a minor framed open space is circumscribed within the major framed open space to abide for the hood conveyor apparatus 20.

The anchorage conveyor frame 336 includes a front joist 340 and a rear joist 342, a first lateral side joist 344, an opposing second lateral side joist 346, a front cross bar 360, a rear cross bar 362, and four lifting masts 364, 366, 368, 370 vertically oriented wherein the front joist 340 and the rear joist 342 are each fixedly attached to the first lateral side joist 344 and the opposing second lateral side joist 346 by way of four joist hanger brackets 348, 350, 352, 354 whereby four corners of the anchorage conveyor frame 336 are formed.

A first lifting mast 356 of the anchorage conveyor frame 336 includes a superior end $356^1$ and an inferior end $356^2$. The superior end $356^1$ of the first lifting mast 356 is fixedly bolted to a first joist end $340^1$ of the front joist 340 of the anchorage conveyor frame 336 by way of a first joist hanger bracket 358 and the inferior end $356^2$ of the first lifting mast 356 is fixedly bolted to a first end $360^1$ of the front cross bar 360 by way of a first iron face plate 372.

A second lifting mast 374 of the anchorage conveyor frame 336 includes a superior end $374^1$ and an inferior end $374^2$. The superior end of the second lifting mast 374 is fixedly bolted to a second end of the front joist 340 of the anchorage conveyor frame 336 by way of a second joist hanger bracket 376 and the inferior end $374^2$ of the second lifting mast 374 is fixedly bolted to a second end $360^2$ of the front cross bar 360 by way of a second iron face plate 378.

A third lifting mast 380 of the anchorage conveyor frame 336 includes a superior end $380^1$ and an inferior end $380^2$ wherein the superior end $380^1$ of the third lifting mast 380 is fixedly bolted to a first end $342^1$ of the rear joist 342 of the anchorage conveyor frame 336 by way of a third joist hanger bracket 382 and the inferior end $380^2$ of the third lifting mast 380 is fixedly bolted to a first end of the rear cross bar 362 of the anchorage conveyor frame 336 by way of a third iron face plate 384.

A fourth lifting mast 386 of the anchorage conveyor frame 336 includes a superior end $386^1$ and an inferior end $386^2$ wherein the superior end $386^1$ of the fourth lifting mast 386 is fixedly bolted to a second end $342^2$ of the rear joist 342 of the anchorage conveyor frame 336 by way of a fourth joist hanger bracket 388 and the inferior end $386^2$ of the fourth lifting mast 386 is fixedly bolted to a second end $362^2$ of the rear cross bar 362 of the anchorage conveyor frame 336 by way of a fourth iron face plate 390.

The upper conveyor frame 334 of the hood conveyor apparatus 20 includes four overhead metal posts 392, 394, 396, 398 which are vertically oriented, including a first overhead metal post 392, a second overhead metal post 394, a third overhead metal post 396, a fourth overhead metal post 398.

The first overhead metal post 392 of the upper conveyor frame 334 is positioned coaxial to the of first lifting mast 356 of the anchorage conveyor frame 336. A first end $392^1$ of the first overhead metal post 392 is fixedly bolted to the first trolley 262 by way of a first trolley adapter connector 400 and a second end $392^2$ of the first overhead metal post 392 is fixedly bolted to a first end portion $340^1$ of the front joist 340 of the anchorage conveyor frame 336 by way of a first post mount bracket 402.

The second overhead metal post 394 the upper conveyor frame 334 is positioned coaxial to the second lifting mast 374 of the anchorage conveyor frame 336. A first end $394^1$ of the second overhead metal post 394 is fixedly bolted to the second trolley 264 by way of a second trolley adapter connector 404 and a second end $394^2$ of the second overhead metal post 394 is fixedly bolted to a second end portion $340^2$ of the front joist 340 of the anchorage conveyor frame 336 by way of a second post mount bracket 406.

The third overhead metal post 396 the upper conveyor frame 334 is positioned coaxial to the third lifting mast 380 of the anchorage conveyor frame 336. A first end $396^1$ of the third overhead metal 396 post is fixedly bolted to the third trolley 266 by way of a third trolley adapter connector 408 and a second end $396^2$ of the third overhead metal post 396 is fixedly bolted to a first end $342^1$ portion of the rear joist 342 of the anchorage conveyor frame 336 by way of a third post mount bracket 410.

The fourth overhead metal post 398 of the upper conveyor frame 334 is positioned coaxial to the fourth lifting mast 386 of the anchorage conveyor frame 336. A first end of the fourth overhead metal post 398 is fixedly bolted to the fourth trolley 268 by way of a fourth trolley adapter connector 414 and a second end $398^2$ of the fourth overhead metal post 398 is fixedly bolted to a second end portion $342^2$ of the rear joist 342 of the anchorage conveyor frame 336 by way of a fourth post mount bracket 416.

The lower conveyor frame 338 of the hood conveyor apparatus 20 includes four lower support posts 420, 422, 424, 426 being vertically oriented, a first lower support post 420, a second lower support post 422, a third lower support post 424, a fourth lower support post 426.

The first lower support post 420 of the lower conveyor frame 338 is positioned coaxial with the first lifting mast 356. A first end of the first lower support post 420 is fixedly attached to the first end $360^1$ of the front cross bar 360 of the anchorage conveyor frame 336 by way of the first iron face plate 372 and a second end $420^2$ of the first lower support post 420 is fixedly attached to a first corner portion 428$^1$ of a front facing rim wall 428 of the hood 22 by way of a first iron mounting plate 430.

The second lower support post 422 of the lower conveyor frame 338 is positioned coaxial with the second lifting mast 374. A first end 422$^1$ of the second lower support post 422 is fixedly attached to the second end 360$^2$ of the front cross bar 360 of the anchorage conveyor frame 336 by way of the second iron face plate 378 and a second end 420$^2$ of the second lower support post 422 is fixedly attached to a second corner portion 428$^2$ of the front facing rim wall 428 of the hood 22 by way of a second iron mounting plate 432.

The third lower support post 424 of the lower conveyor frame 338 is positioned coaxial with the third lifting mast 380. A first end 424$^1$ of the third lower support post 424 is fixedly attached to the first end 362$^1$ of the rear cross bar 362 of the anchorage conveyor frame 336 by way of the third iron face plate 384 and a second end 424$^2$ of the third lower support post 424 is fixedly attached to a first corner portion 434$^1$ of a rear facing rim wall 434 of the hood 22 by way of a third iron mounting plate 384.

The fourth lower support post 426 of the lower conveyor frame 338 is positioned coaxial with the fourth lifting mast 386. A first end 426$^1$ of the fourth lower support post 426 is fixedly attached to the second end 362$^2$ of the rear cross bar 362 of the anchorage conveyor frame 336 by way of the second iron face plate 378 and a second end 426$^2$ of the fourth lower support post 426 is fixedly attached to the second corner portion 434$^2$ of the rear facing rim wall 434 of the hood 22 by way of a fourth iron mounting plate 436. Each of the first lower support post 420, the second lower support post 422, the third lower support post 424, the fourth lower support post 426 is integrated with a rack and pinion gear system 444$^{1-4}$ including a first rack and pinion gear system 444$^1$, a second rack and pinion gear system 444$^2$, a third rack and pinion gear system 444$^3$, a fourth rack and pinion gear system 444$^4$, respectively; wherein each of the rack and pinion gear systems 444$^{1-4}$ includes, a lift carriage 446$^{1-4}$, a gear rack 448$^{1-4}$ mechanically operative with a mateable pinion 450$^{1-4}$, operatively connected to a first lateral axle 452, and operatively connected to a second lateral axle 454.

Each of the lift carriages 446$^{1-4}$ includes each of the gear rack 448$^{1-4}$ which is vertically oriented and centered between a first linear guide 456$^{1+N}$ and a second linear guide 458$^{1+N}$ of each of the lift carriages 446$^{1-4}$, each of the gear racks 448$^{1-4}$ having an upward end 460$^{1+N}$ and a downward end 462$^{1+N}$ with a plurality of gear rack teeth 464$^{1+N}$ therebetween.

Each of the mateable pinions 450$^{1-4}$ is configured with a plurality of pinion teeth 476 circumferentially aligned around a pinion crown 480$^{1-4}$ to enable an operable rotatable mesh between each of a corresponding plurality of gear rack teeth 464$^{1+N}$ of each of the gear racks 448$^{1-4}$ of each of the first rack and pinion gear system 444$^1$, a second rack and pinion gear system 444$^2$, a third rack and pinion gear system 444$^3$, a fourth rack and pinion gear system 444$^4$, each of the mateable pinions 450$^{1-4}$ include a pinion borehole 478$^{1-4}$ transversely configured therethrough each of the pinion crowns 480$^{1+N}$.

The first lateral axle 452 is positioned a first vertical below and parallel to the first lateral side joist 344 of the anchorage conveyor frame 336 and the second lateral axle 454 is positioned a second vertical distance below and parallel to the opposing second lateral side joist 346 of the anchorage conveyor frame 336 such that the first lateral axle 452 and the second lateral axle 454 are symmetrically aligned parallel to each other.

A first end of the first lateral axle 452 is rotationally coupled to a first pinion borehole 478$^1$ of the first mateable pinion 450$^1$ of a first gear rack 448$^1$ of the first rack and pinion gear system 444$^1$ integrated with the first lower support post 420 and a second end of the first lateral axle 452 is rotationally coupled to a third pinion borehole 478$^3$ of a third gear rack 448$^3$ of the third rack and pinion gear system 444$^3$ integrated with the third lower support post 424, and a first end of the second axle 454 is rotationally coupled to a second pinion borehole 478$^2$ of a second mateable pinion 450$^2$ of a second gear rack 448$^2$ of the second rack and pinion gear system 444$^2$ integrated with the second lower support post 422 and a second end of the second lateral axle 454 is rotationally coupled to a fourth pinion borehole 478$^4$ of a fourth mateable pinion 450$^4$ of a fourth gear rack 448$^4$ of the fourth rack and pinion gear system 444$^4$ integrated with the fourth lower support post 426 such that as the hood 22 is lowered and raised the lateral first axle 452 and the second lateral axle 454 synchronously causes the first mateable pinion 450$^1$ and the third mateable pinion 450$^3$, the second matealbe pinion 450$^2$ and the fourth mateable pinion 450$^4$ to rotate in unison enabling the operable rotatable mesh between each of a first plurality of pinion teeth 476$^1$ of a first mateable pinion 450$^1$ and a first plurality of gear rack teeth 464$^{1(1+N)}$ of the first gear rack 448$^1$ of the first rack and pinion gear system 444$^1$, a second plurality of pinion teeth 476$^2$ of a second mateable pinion 450$^2$ and a second plurality of gear rack teeth 464$^{2(1+N)}$ of a second gear rack 448$^2$ of the second rack and pinion gear system 444$^2$, a third plurality of pinion teeth 476$^3$ of a third mateable pinion 450$^3$ and a third plurality of gear rack teeth 464$^{3(1+N)}$ of a third gear rack 448$^3$ of the third rack and pinion gear system 444$^2$, a fourth plurality of pinion teeth 4764 of a fourth mateable pinion 450$^4$ and a fourth plurality of gear rack teeth 464$^{4(1+N)}$ of a fourth gear rack 448$^4$ of the fourth rack and pinion gear system 444$^4$, in a vertical direction from each of the gear rack's 448$^{1-4}$ downward ends 462 to their upward ends 460 or from each of the gear racks 448$^{1-4}$ upward end 460 their downward end 462.

As illustrated in FIGS. 1-2, 4-5A, 6-8, the anchorage conveyor frame 336 provides structural support for two spring loaded handles 438, 440 which provides a safe means to maneuver the hood 22 as the hood 22 moves in a horizontal direction to each of the vacuum lift-table 12, the gel heating metal lift-table 14, and the gel foam fusion lift-table 16 and in a vertical upward direction and downward direction during the operation of the gel-foam body amalgamation system 10 in the formation of the dual-core foam body amalgamate 600, as depicted in FIGS. 5A, 8 and FIG. 15E.

The first spring loaded handle 438 is pivotally attached to the front cross bar 360 of the anchorage conveyor frame 336 and a second spring loaded handle 440 is pivotally attached to the rear cross bar 362 of the anchorage conveyor frame 336 whereby the first spring loaded handle 438 and the second spring loaded handle 440 is maneuvered to operationally raise and lower the hood 22 in a vertical direction and to urge the hood 22 in a horizontal direction along each of the front I-beam bridge 242 and concomitantly along the rear I-beam bridge 244.

The gel-foam body amalgamation system 10 includes the hood 22, as shown in FIGS. 1-2, 4-5A, and FIGS. 6-8. The hood 22, includes a metal rectangular pyramid structure including four cohesive triangular metal panels 466$^{1-4}$ being integrally welded together forming an apex 468 and a rectangular base configured with a top opening at the apex 468 having a circumferential cross section and a bottom opening integrated within the rectangular base having a rectangular cross section. The bottom opening includes an exterior facing rectangular peripheral rim 470 having four sides, the front facing rim wall 428, the rear facing rim wall 434, a first lateral facing rim wall 488, a second lateral facing rim wall 490.

Figure 11:
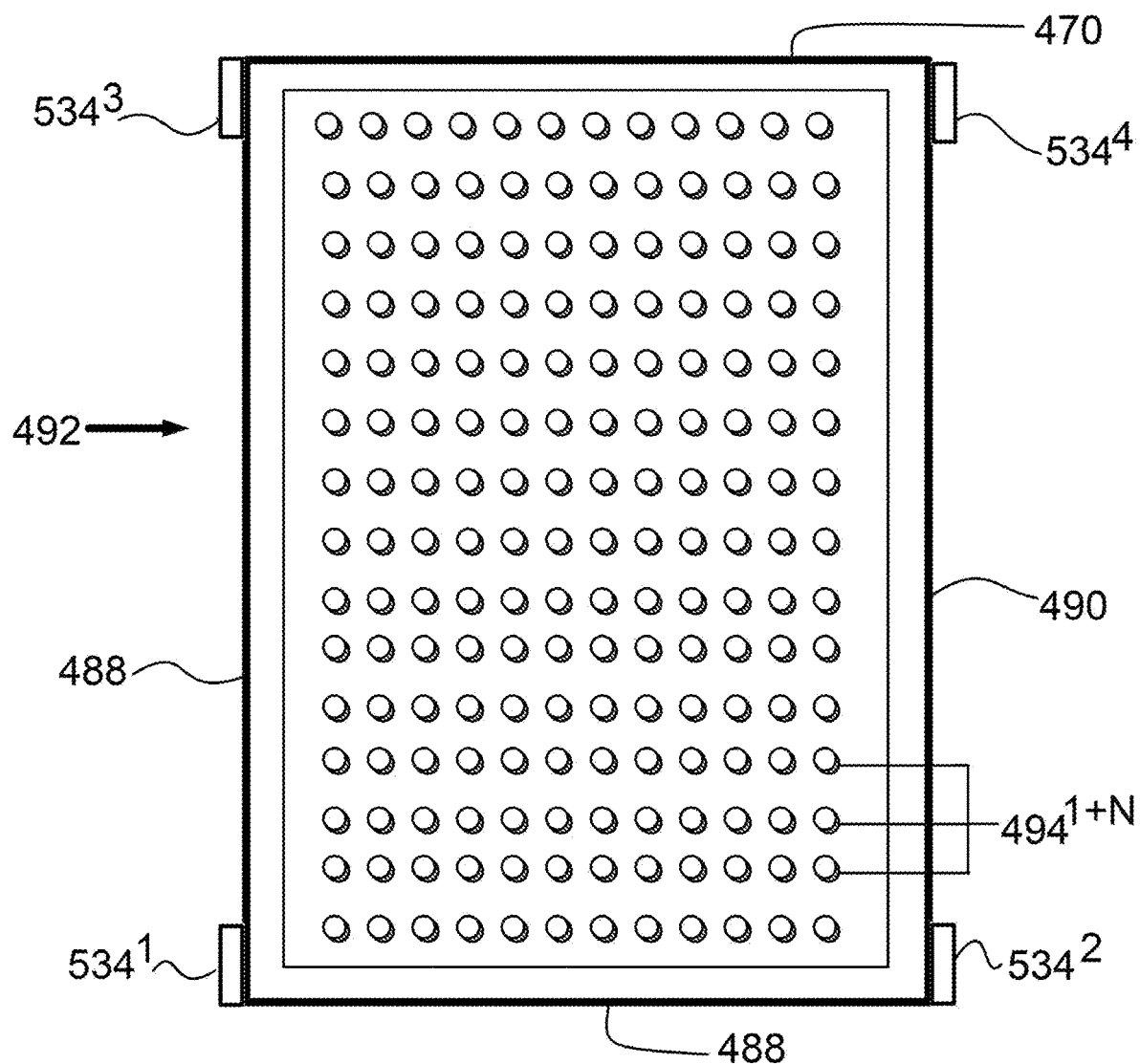
FIG. 11 is a planar perspective view of a perforated lift and place framework of the hood of the gel-foam body amalgamation system, according to an embodiment of the present invention.

The bottom opening of the hood 22, as illustrated in FIG. 11, is integrated with a perforated lift and place framework 492. The perforated lift and place framework 492 is bounded by the exterior facing rectangular peripheral rim 470 dimensioned with a framework surface area that is equal to the first surface area of the rigid silicone table top 38 of the vacuum lift-table 12.

The perforated lift and place framework 492 is configured with a plurality of hood perforations $494^{1+N}$ symmetrically aligned a distance apart from each other in rows $496^{1-N}$ and columns $498^{1-N}$ extending the entirety of the perforated lift and place framework 492. The plurality of hood perforations $494^{1+N}$ are configured to symmetrically correlate to the plurality of table perforations $50^{1+N}$ of the vacuum lift-table 12, as depicted in FIGS. 1-2, 4-5A, 6-8.

As shown in FIGS. 1-2, 4-5A, and FIGS. 6-8, the circumferential top opening at the apex 468 of the hood 22 is fluidly connected to a hood conduit 502 which is fluidly connected to a vacuum generator motor 504 configured with 1500 cubic feet per minute. The vacuum generator motor 504 provides a predetermined force of air flow in fluid communication with each of the plurality of hood perforations $494^{1+N}$ of the perforated lift and place framework 492 configured to generate a predetermined vacuum pull therethrough each of the plurality of hood perforations $494^{1+N}$ of the perforated lift and place framework 492. The vacuum generator motor 504 is operationally connected to an "On"/"Off" operation switch 506, wherein the predetermined vacuum pull is purged therethrough each of the plurality of hood perforations $494^{1+N}$ of the perforated lift and place framework 492 when the vacuum generator motor 504 in an "On" operation, and the predetermined vacuum pull is ceased when the vacuum generator motor 504 is in an "OFF" operation to enable a lift and place operation of the foam core body 24.

The hood conveyor apparatus 20 includes four spring balancers $508^{1+N}$ to maintain a stable position of the hood 22 wherein each of the four spring balancers $508^{1+N}$ is configured with a drum, a steel wire rope $606^{1-4}$ having a travel distance of 1.5 meters, and a pull weight of 15-25 kg capacity range, as shown in FIGS. 1-2, 4-5A, and FIGS. 6-8.

A first spring balancer $508^1$ of the four spring balancers $508^{1+N}$ includes a first end 510 and a second end 512. The first end 510 of the first spring balancer $508^1$ includes a first hook connector $514^1$ which is fixedly attached by way of a first bolted face plate $516^1$ to a first corner $340^1$ of the front joist 340 of the anchorage conveyor frame 336. The second end 512 of the first spring balancer $508^1$ includes a first carabiner snap clip $518^1$ which is fixedly coupled to a corresponding first corner $360^1$ of the front cross bar 360 of the anchorage conveyor frame 336 by way of a first steel hook pad eye plate 5201 fixedly attached to the corresponding first corner $360^1$ of the front cross bar 360.

A second spring balancer $508^2$ of the four spring balancers $508^{1+N}$ includes a first end 522 and a second end 524. The first end 522 of the second spring balancer $508^2$ includes a second hook connector $514^2$ which is fixedly attached by way of a second bolted face plate $516^2$ to a second corner $340^2$ of the front joist 340 of the anchorage conveyor frame 336. The second end 524 of the second spring balancer $508^2$ includes a second carabiner snap clip $518^2$ which is fixedly coupled to a corresponding second corner $360^2$ of the front cross bar 360 of the anchorage conveyor frame 336 by way of a second steel hook pad eye plate $520^2$ fixedly attached to the corresponding second corner $360^2$ of the front cross bar 360.

A third spring balancer $508^3$ of the four spring balancers $508^{1+N}$ includes a first end 526 and a second end 528. The first end 526 a third spring balancer $508^3$ includes a third hook connector $514^3$ which is fixedly attached by way of a third bolted face plate $516^3$ to a first corner $342^1$ of the rear joist 342 of the anchorage conveyor frame 336. The second end 528 of the third spring balancer $508^3$ includes a third carabiner snap clip $518^3$ which is fixedly coupled to a corresponding first corner $362^1$ of the rear cross bar 362 of the anchorage conveyor frame 336 by way of a third steel hook pad eye plate $520^3$ fixedly attached to the corresponding second corner $362^2$ of the rear cross bar 362.

A fourth spring balancer $508^4$ of the four spring balancers $508^{1+N}$ includes a first end 530 and a second end 532. The first end 530 includes a fourth hook connector $514^4$ which is fixedly attached by way of a fourth bolted face plate $516^4$ to a second corner $342^2$ of the rear joist 342 of the anchorage conveyor frame 336. The second end 532 of the fourth spring balancer $508^4$ includes a fourth carabiner snap clip $518^4$ which is fixedly coupled to a corresponding second corner $362^2$ of the rear cross bar 362 of the anchorage conveyor frame 336 by way of a fourth steel hook pad eye plate $520^3$ fixedly attached to the corresponding second corner $362^2$ of the rear cross bar 362 such that the hood 22 can be balanced in a level posited plane parallel in relation to the of the vacuum lift-table 12, the gel heating metal-lift table 14, and the gel foam fusion lift-table 16 and to provide a uniform gel dipping treatment of the foam core body 24.

As depicted in FIGS. 1-2, 4-5A, and 6, and more particularly in FIG. 8, the hood conveyor apparatus 20 includes four gel detection probes $534^1$, $534^2$, $534^3$, $534^4$, a first gel detection probe $534^1$, a second gel detection probe $534^2$, a third gel detection probe $534^3$ and a fourth gel detection probe $534^4$. The first gel detection probe $534^1$ is disposed on a front edge of the first lateral facing rim wall 488 of the exterior facing rectangular peripheral rim 470 of the hood 22 and the second gel detection probe $534^2$ disposed on a front edge of the second lateral facing rim wall 490 of the exterior facing rectangular peripheral rim 470 of the hood 22. The third gel detection probe is disposed on a rear edge of the first lateral facing rim wall 488 of the exterior facing rectangular peripheral rim 470 of the hood 22 and the fourth gel detection probe is disposed on a rear edge of the second lateral facing rim wall 490 of the exterior facing rectangular peripheral rim 470 of the hood 22.

Each of the first gel detection probe $534^1$, the second gel detection probe $534^2$, the third gel detection probe $534^3$, the fourth gel detection probe $534^4$ extend a downward distance from the each of the first lateral facing rim wall 488 of the exterior facing rectangular peripheral rim 470 and the second lateral facing rim wall 490 of the exterior facing rectangular peripheral rim 470, of the exterior facing rectangular peripheral rim 470 of the hood 22, respectively. With this configuration, wherein when the hood 22 is lowered the first gel detection probe $534^1$, the second gel detection probe $534^2$, the third gel detection probe $534^3$, the fourth gel detection probe $534^4$ is configured to come in consubstantial contact against a top surface of the gel 87 contained in the metal gel basin 88 of the gel heating metal lift-table 14 such that the foam core body 24 being held by the hood 22 is dip coated within the gel 87 held in the gel bath 90 to a predetermined gel thickness to create a hydrophobic gel barrier 536 over each of the outer peripheral surfaces of the extended cubes $198^{1+N}$ of the series of plurality of extended cubes $198^{1+N}$ and outlying surfaces of each of the plurality of recessed channels $204^{1+N}$. In an exemplary embodiment, the predetermined gel thickness of at least 0.0625.

When the plurality of extended cubes $50^{1+N}$ of the foam core body 24 and gel 87 are bonded in accordance with the exemplary embodiment, the foam core body 24 improves the performance of the gel 87 and, similarly, the gel 87 improves the performance of the foam core body 24. In particular, the gel 87 coats the plurality of extended cubes $50^{1+N}$ and the recessed channels $204^{1+N}$ and a borderline portion of the top core body portion 186 of the foam core body 24 effectively surrounds the plurality of extended cubes $50^{1+N}$ so that the stability and performance of the gel is improved. The gel 87 is vertically stable and is much less apt to buckle in an outward direction when a load is applied to a surface of the a dual-core foam body amalgamate 600. The gel 87 also helps to effectively reinforce the foam. When the gel 87 is bonded directly to the foam in the manner disclosed herein, the foam, and particularly when a soft foam is utilized, is not liable to bottom out under a heavy load. The gel 87 provides for much greater stability and support.

The operator urges the first spring handle 438 of the hood 22 in a downward direction towards the gel bath 90 and gel dipping the foam core body 24 into a heated gel bath 90 contained in the metal gel basin 88 a distance limited by the touching of the first gel detection probe $534^1$ and the second gel detection probe $534^2$, the third gel detection probe $534^3$, the fourth gel detection probe $534^4$, on the top surface of the gel 87 such that a hydrophobic gel barrier 536 of a predetermined thickness is formed on the outer peripheral surfaces of each of the plurality of extended cubes $198^{1+N}$ and on the outlying surfaces of each of the recessed channels $204^{1+N}$ while retaining the top core body portion $186^1$ of the foam core body 24 to be untouched by the gel bath 90 thereby forming a heated gel-coated foam core body $24^{HG}$, as depicted in FIG. 5A.

As described below, in the method of operation of the gel-foam body amalgamation system 10 the heated gel-coated foam core body $24^{HG}$ is positioned over the gel foam fusion lift-table 16 placing the heated gel-coated foam core body $24^{HG}$ against the top porous layer of the intermediary foam core body 26 having the hydrophobic heated gel coating of each of the plurality of extended cubes $198^{1+N}$ coming in contact with the entirety of the top porous layer of the intermediary foam core body 26. The operator by pressing the hood 22 against the top porous layer of the intermediary foam core body 26 causes the heated gel integrated on a top peripheral exterior surface of each extended cube of the heated gel-coated foam core body $24^{HG}$ to adhere against a borderline of a top porous layer of the intermediary foam core body 26. By way of maintaining the hood against the heated gel-coated foam core body $24^{HG}$ and the intermediary foam core body 26 in a level prone position supported by the rigid non-slip non-perforated table top 164 of the gel foam fusion lift-table 16 for at least three minutes at ambient temperature allowing the heated gel to cure causing the fusion of the heated gel-coated foam core body $24^{HG}$ with the intermediary foam core body 26 forming a dual-core foam body amalgamate 600 having an intermediary borderline gel layer therebetween the heated gel-coated foam core body $24^{HG}$ and the intermediary foam core body 26.

The gel 87 provides a mechanism to disperse heat and therefore a cooling mechanism for a person or animal on a mattress or cushion, and the like, manufactured with the dual-core foam body amalgamate 600. The gel 87 is vertically stable and is much less apt to buckle in an outward direction when a person's weight is applied to a surface of a mattress or cushion and the like manufactured with the dual-core foam body amalgamate 600. The gel 87, also, helps to effectively reinforce the foam. When the gel 87 is bonded directly to the foam core body 24 in the manner disclosed herein, the foam of the foam core body 24, and particularly if soft foam is utilized, is not liable to bottom out under a heavy load. The gel 87 provides for much greater stability and support.

The gel-foam body amalgamation system 10 includes three table covers 32, 34, 36, a vacuum lift-table cover 32, a gel heating metal lift-table cover 34, and a gel foam fusion lift-table cover 36 wherein each of the vacuum-lift table 12 cover and the gel foam fusion lift-table 16 is manufactured with a five layer polyvinyl sheet having a non-slip top surface and a non-slip bottom surface configured to self-seal to each of the entirety of each of the rigid silicone table top 38 of the vacuum lift-table 12 and the rigid non-slip non-perforated table top 164 of the gel foam fusion lift-table 16, and wherein the gel heating metal lift-table cover 34 is manufactured with a polytetrafluoroethylene ("PTFE") coated fiberglass fabric sheet 538 disposed intermediate to a top five layer polyvinyl sheet 5401 and a bottom five layer polyvinyl sheet 5402 configured to self-seal onto the peripheral top metal rim of the metal gel basin 88 of the gel heating metal lift-table 14.

An embodiment of the present invention includes a method of making the dual-core gel foam amalgamate 600, as depicted in FIGS. 5A, 8 and FIG. 15E. with operation of the gel-foam amalgamation system 10. The method is illustrated in the flow diagram of FIGS. 16A-16E.

A method including the Steps 1 700-Step comprising: 2. A method of making a dual-core gel foam amalgamate 600, comprising:

Step 1. 700 providing a gel-foam body amalgamation system 10, comprising:
  a vacuum lift-table 12; a gel heating metal lift-table 14; a gel foam fusion lift-table 16; an overhead double-beam bridge crane 18; a hood conveyor apparatus 20; a hood 22; a foam core body 24; an intermediary foam core body 26; a gel extruder 28; gel 87; gel supply well 30; three table covers 32, 34, 36, including a vacuum lift-table cover 32, a gel heating metal lift-table cover 34, and a gel foam fusion lift-table cover 36;

Step 2. 702 maneuvering the valve 544 to be parallel to the gel supply pipe 122 causing the opening of the valve 544 of the gel supply pipe 122 of the gel supply well 30 causing a flow of gel 87 to enter into the metal gel basin 88 of the gel heating metal lift-table 14;

Step 3. 704 providing the flow of gel 87 to enter the metal gel basin 88 allowing the gel 87 to reach the predetermined volume of gel indicated by the measurement bar 148 etched on the surface of the front interior facing wall of the metal gel basin 88;

Step 4. 706 maneuvering the valve 544 to be perpendicular to the gel supply pipe 122 causing the closing of the valve 544 of the gel supply pipe 122 of the gel supply well 30 causing the flow of gel 87 to cease to enter into the metal gel basin 88 of the gel heating metal lift-table 14;

Step 5. 708 adjusting the temperature controller 131 operatively electrically connected to the at least one planar heater device $132^{1+N}$ within a range to include 350° F.-400° F. thereby heating the gel 87 forming a heated liquid gel $87^L$ of the gel bath 90 in the metal gel basin 88;

Step 6. 710 activating the "ON" operating mode switch 127 of the at least one variable frequency drive pump 124 causing the mixing and circulating of the heated liquid gel $87^L$ of the gel bath 90 contained in the metal gel basin 88;

Step 7. 712 providing the foam core body 24;

Step 8. 714 positioning the foam core body 24 on the rigid silicone table top 38 of the vacuum lift-table 12 oriented with the series of the plurality of extended cubes $198^{1+N}$ in a downward facing direction and the bottom flat surface of the foam core body 24 in an upward facing direction such that a plurality of outer peripheral surfaces of each of the plurality of extended cubes $198^{1+N}$ are contacting the rigid silicone table top 38 of the vacuum lift-table 12 integrated with the plurality of table perforations $50^{1+N}$ and the bottom flat surface of the foam core body 24 is parallel to and facing the perforated lift and place framework 492 of the hood 22 integrated with the plurality of hood perforations $494^{1+N}$;

Step 9. 716 providing an intermediary foam core body 26 to be fused with the foam core body 24;

Step 10. 718 positioning the intermediary foam core body 26 on the rigid non-slip non-perforated table top 164 of the gel foam fusion lift-table 16 oriented with the bottom porous layer coming in contact with the table top surface of the gel foam fusion lift-table while exposing the top porous layer;

Step 11. 720 urging the first spring loaded handle 438 of the hood 22 in a vertical downward direction and positioning the perforated lift and place framework 492 over the entirety of the flat bottom porous surface of the bottom side of the bottom core body portion 188 of the foam core body 24 positioned on the rigid silicone table top 38 of the vacuum lift-table 12;

Step 12. 722 turning the vacuum generator motor 504 in an "ON" operation mode by way of the "ON"/"OFF" operation switch providing a vacuum pulling force therethrough each of the plurality of hood perforations $494^{1+N}$;

Step 13. 724 applying the vacuum pulling force against the entirety of bottom surface of the foam core body 24 such that the entirety foam core body 24 temporarily suctions to the perforated lift and place framework 492 of the hood 22;

Step 14. 726 pulling the first spring handle 438 of the hood 22 in a vertical upward direction such that the hood 22 and the foam core body 24 being temporarily suctioned to the perforated lift and place framework 492 is lifted a distance above and parallel to the rigid silicone table top 38 of the vacuum lift-table 12;

Step 15. 728 urging the first spring handle 438 of the hood 22 in a horizontal direction towards the gel heating metal lift-table 14 enabling moving in unison the first trolley and the second trolley 264 along the front I-beam bridge 242 concurrently with moving the third trolley 266 and the fourth trolley 268 along the rear I-beam bridge 244 and balanced by the four spring balancers $508^{1+N}$ so that the hood 22 moves steadily towards the gel heating metal lift-table 14;

Step 16. 730 positioning the hood 22 and the foam core body 24 being temporarily suctioned to the perforated lift and place framework 492 of the hood 22 a distance above and parallel to the metal gel basin 88 of the gel heating metal lift-table 14 the hood 22 being posited in a stable parallel position over the gel bath 90 supported by the four spring balancers $508^{1+N}$ providing a uniform gel dipping treatment of the foam core body 24;

Step 17. 732 urging the first spring handle 438 of the hood 22 in a downward direction towards the gel bath 90 and gel dipping the foam core body 24 into a heated gel bath 90 contained in the metal gel basin 88 a distance limited by the $534^3$ consubstantial touching of the first gel detection probe $534^1$, the second gel detection probe $534^2$, the third gel detection probe $534^3$ and the fourth gel detection probe $534^4$ on the top surface of the gel 87 such that a hydrophobic gel barrier 536 of a predetermined thickness is formed on the outer peripheral surfaces of each of the plurality of extended cubes $198^{1+N}$ and on the outlying surfaces of each of the recessed channels $204^{1+N}$ while retaining the top core body portion $186^1$ of the foam core body 24 to be untouched by the gel bath 90 thereby forming a heated gel-coated foam core body $24^{HG}$;

Step 18. 734 pulling the first spring loaded handle 438 of the hood 22 in an upward direction away from the gel bath 90 causing lifting of the foam core body 24 temporarily suctioned by the to the perforated lift and place framework 492 up from the gel bath 90;

Step 19. 736 urging the first spring loaded handle 438 of the hood 22 in a horizontal direction towards the gel foam fusion lift-table 16 enabling moving in unison the first trolley and the second trolley 264 along the front I-beam bridge 242 concurrently with moving the third trolley 266 and the fourth trolley 268 along the rear I-beam bridge 244 and balanced by the four spring balancers $508^{1+N}$ so that the heated gel-coated foam core body $24^{HG}$ being held by the hood 22 moving steadily towards the gel foam fusion lift-table 16;

Step 20. 738 urging the handle of the hood 22 in a vertical downward direction and positioning the heated gel-coated foam core body $24^{HG}$ being temporarily suctioned by the perforated lift and place framework 492 of the hood 22 over the intermediary foam core body 26 being positioned on the gel foam fusion lift-table 16;

Step 21. 740 placing the heated gel-coated foam core body $24^{HG}$ against the top porous layer of the intermediary foam core body 26 having the hydrophobic heated gel coating of each of the plurality of extended cubes $198^{1+N}$ coming in contact with the entirety of the top porous layer of the intermediary foam core body 26 wherein the hydrophobic heated gel coating has a thickness of at least 0.0625 inches;

Step 22. 742 pressing the hood 22 against the top porous layer of the intermediary foam core body 26 causing heated gel integrated on a top peripheral exterior surface of each extended cube of the heated gel-coated foam core body $24^{HG}$ to adhering against a borderline of a top porous layer of the intermediary foam core body 26;

Step 23. 744 maintaining the heated gel-coated foam core body $24^{HG}$ and the intermediary foam core body 26 in a level prone position supported by the rigid non-slip non-perforated table top 164 of the gel foam fusion lift-table 16 for at least three minutes at ambient temperature allowing the heated gel to cure causing the fusion of the heated gel-coated foam core body $24^{HG}$ with the intermediary foam core body 26 forming a dual-core foam body amalgamate 600 having an intermediary borderline gel layer therebetween the heated gel-coated foam core body $24^{HG}$ and the intermediary foam core body 26;

Step 24. 746 turning the vacuum generator motor 504 to the "OFF" position causing the vacuum pull force of the vacuum generator motor 504 to cease moving therethrough each of the plurality of the hood perforations 494$^{1+N}$ of the perforated lift and place framework 492 whereby the dual-core gel foam amalgamate 600 is released from the perforated lift and place framework 492 of the hood 22;

Step 25. 748 pulling the first spring loaded handle 438 of the hood 22 in a vertical upward direction and moving the hood 22 upward from the dual-core gel foam amalgamate 600;

Step 26. 750 urging the first spring loaded handle 438 of the hood 22 in a horizontal direction towards the first end stop and positioning the hood 22 over the rigid silicone table top 38 of the vacuum lift-table 12;

Step 27. 752 securing the hood in a stationary position over the rigid silicone table top 38 of the vacuum lift-table 12 by way of a hood locking mechanism, wherein the hood locking mechanism includes a first mateable pinion 450$^1$ of the first rack and pinion gear system 444$^1$ integrated with a locking brake (not shown), wherein a first portion of the locking brake is rotatably connected to a latch connector on the lift carriage 446$^1$ first rack and pinion gear system 444$^1$ and a second portion of the locking brake is rotatably connected to a locking structure connector incorporated with the first mateable pinion 450$^1$, wherein the locking brake is configured to move the locking structure between a locked and unlocked position wherein when the locking brake is in a locked position the hood is maintained in a fixed position and wherein when the locking brake is in an unlocked position the hood 22 can be moved vertically in the upward and downward direction and horizontally along the front I-beam bridge 242 and the rear I-beam bridge 244 of the overhead double-beam bridge crane 18;

Step 28. 754 providing a wheeled supported mobile storage cart including a multi-level horizontal rack wherein each level includes a horizontal rack configured to hold and store a plurality of dual-core gel foam amalgamates 600;

Step 29 756 removing the dual-core gel foam amalgamate 600 from the gel foam fusion lift-table 16 and placing it prone on a first level horizontal rack having the bottom porous layer of the intermediary foam core body 26 in contact with a top surface of the first level horizontal rack and having the porous top side of the top core body portion of the foam core body 24 exposed;

Step 30. 758 turning the gel supply pipe 122 to the "ON" mode of operation causing the flow of gel 87 to enter into the metal gel basin 88 and replenishing a reduced gel volume of gel 87 to reach the predetermined volume of gel indicated by the measurement bar 148 etched on the surface of the front interior facing wall of the metal gel basin 30. repeating steps 1-29 until a predetermined number of dual-core gel foam amalgamates 600$^{1+N}$ are provided;

Step 31. 760 closing the gel supply pipe 122 to the closed position by way of maneuvering the valve 544 of the gel supply pipe to be perpendicular to the gel supply pipe 122 causing the flow of gel 87 to cease entering into the metal gel basin 88;

Step 32. 762 repeating Steps 1-31 until a predetermined number of dual-core gel foam amalgamates are provide;

Step 33. 764 ejecting remnant gel 87$^{RG}$ from the metal gel basin 88 by way of one or more ejection nozzles 542$^{1+N}$ disposed on the rear facing metal wall 98 of the to the cavity 104 of the metal gel basin 88 for ejecting remnant gel 87$^{RG}$ by way of a portable shop vacuum (not shown);

Step 34. 766 securing the vacuum lift-table cover 32 onto the rigid silicone table top 38 of the vacuum lift-table 12;

Step 35. 768 securing the gel heating metal lift-table cover 34 onto the peripheral rectangular top metal rim 94 to the metal gel basin 88 of the gel heating metal lift-table 14;

Step 36. 770 securing the gel foam fusion lift-table cover 36 onto the rigid non-slip non-perforated table top 164 of the gel foam fusion lift-table 16.

Additional substances may be added to the gel to help the gel cure more quickly or change the properties of the gel. For example, a mixture of about 50% talc or baby powder and about 50% baking soda that is added to the gel after the gel is applied to the foam helps the gel cure more quickly and improves the gel 87 and diminishes a sticky characteristic of the gel 87, provides an aromatic, and a smoother touch to the gel 87.

Figure 3:
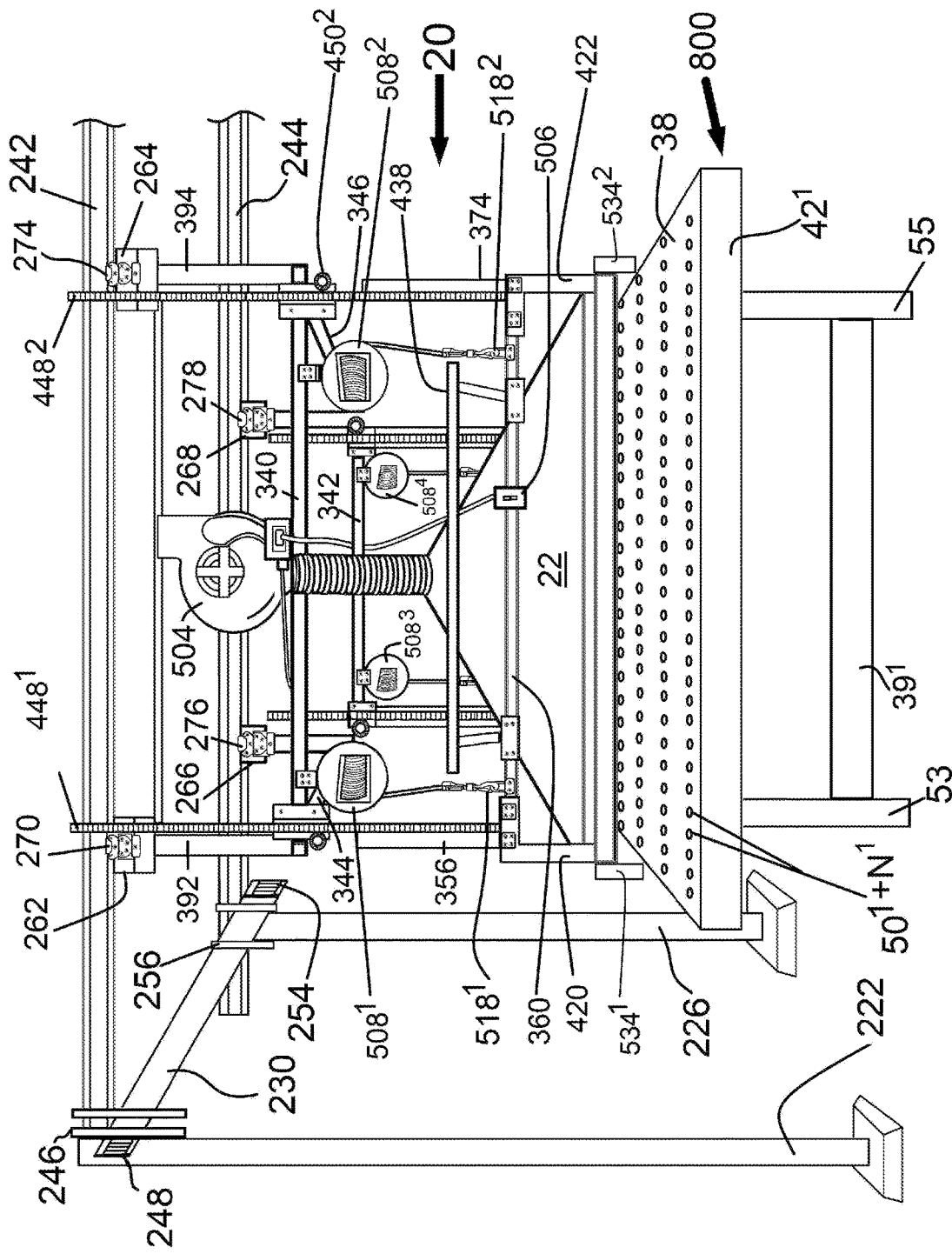
FIG. 3 is a partial front perspective view of a body amalgamation system integrated with the hood conveyor apparatus shown with a vacuum lift table, according to another embodiment of the present invention.
Figure 4:
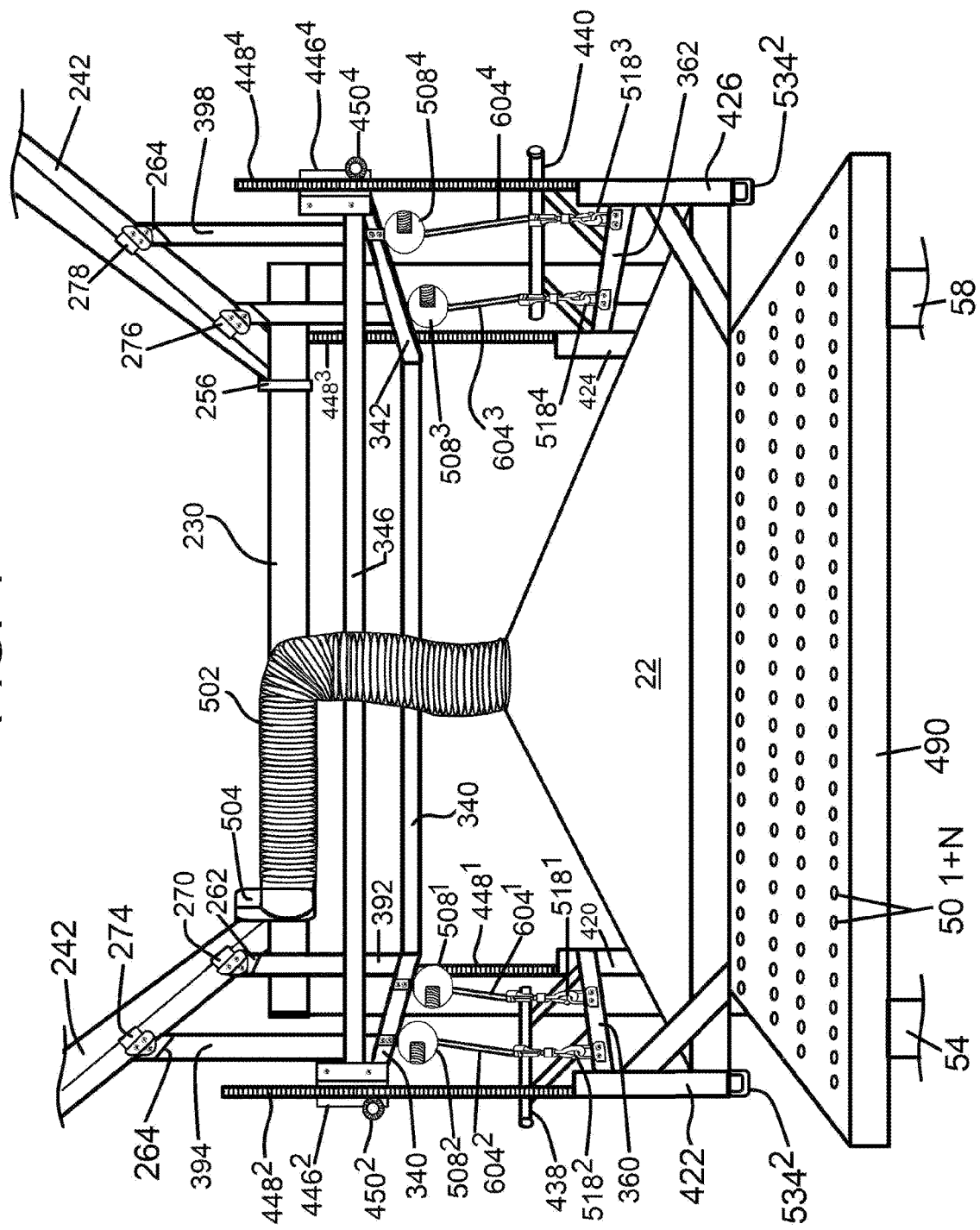
FIG. 4 is a partial side perspective view of the gel-foam body amalgamation system of FIG. 1 integrated with the hood conveyor apparatus shown with a side perspective view of the vacuum lift-table, according to an embodiment of the present invention.
Figure 17:
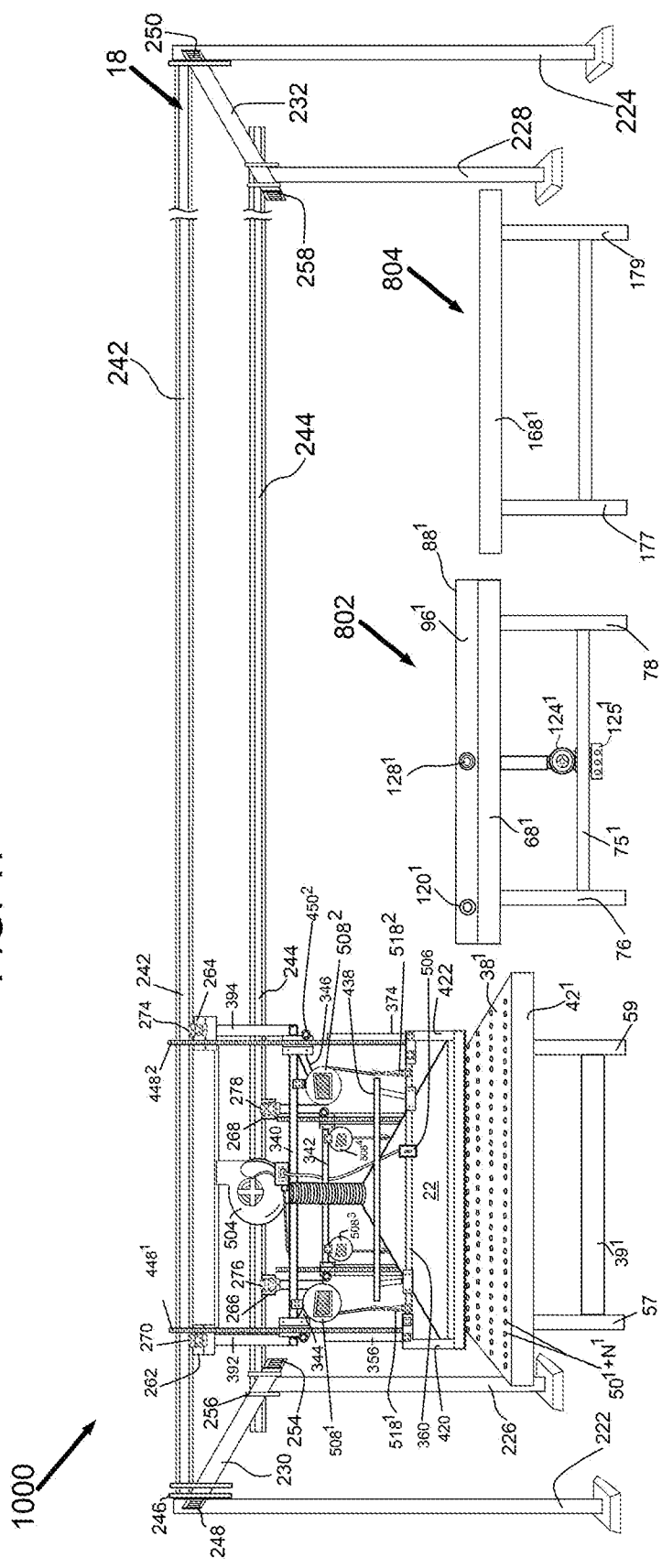
FIG. 17 is a front perspective view of a core body amalgamation system, according to an embodiment of the present invention.

In another embodiment of the present invention, with reference to FIGS. 3 and 17, a core body amalgamation system 1000 comprises a vacuum table 800; a heating metal table 802; a core body fusion table 804; an overhead double-beam bridge crane 18; a hood conveyor apparatus 20; a hood 22.

FIGS. 3, 9-10 and 17 depicts embodiments of the vacuum table 800. The vacuum table 800 comprises a silicone table structure including a rigid silicone table top 38$^1$, a rigid silicone table bottom 40$^1$, a rigid front facing silicone wall 421, a rigid rear facing silicone wall 441, a rigid first silicone side wall 461, an opposing rigid second silicone side wall 481, the rigid silicone table top 38$^1$ is integrated with a plurality of table perforations 50$^{1+N1}$ extending therethrough the rigid silicone table bottom 40$^1$. The rigid silicone table top 38 of the vacuum table 800 is dimensioned with a surface area of at least 84×76 inches. In this manner, the vacuum lift-table can receive a variety of sizes of foam core bodies ranging to equivalent sizes of a King mattress (80×76 inches); a Queen size mattress (80×60 inches); a Double size mattress (75×73 inches); and a Twin size mattress (75×38); and for pillows, cushions, stuffed toys, and a variety of support devices.

With reference to FIGS. 2-4, 9-10, the vacuum table 800 is depicted illustrating the rigid silicone table top 38$^1$ of the vacuum table 800 is integrated with the plurality of table perforations 50$^{1+N1}$ extending therethrough the rigid silicone table bottom 40$^1$, wherein the plurality of table perforations 50$^{1+N1}$ are symmetrically aligned a distance apart from each other in rows and columns extending the entirety of the rigid silicone table top 38$^1$ and therethrough to the rigid silicone bottom 40$^1$.

Figure 9:
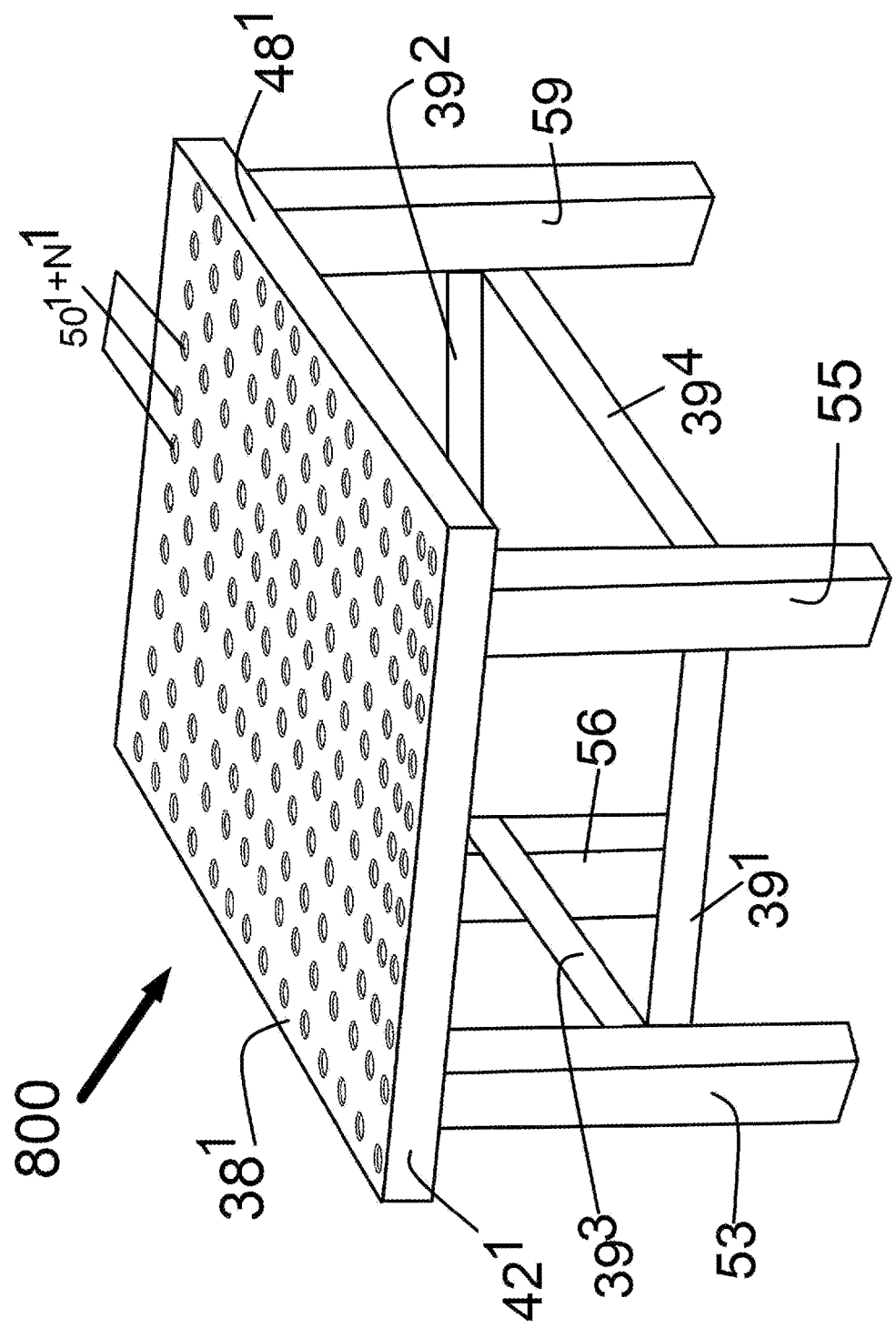
FIG. 9 is a perspective view of the vacuum table of FIG. 3 of the core body amalgamation system according to an embodiment of the present invention.

As shown in FIGS. 3, 9 and 17 the vacuum table 800 is supported by four insulated table support columns 53, 55, 57, 59, disposed beneath the rigid silicone table top 38$^1$ including a first front insulated table support column 53, a second front insulated table support column 55, a first back insulated table support column 57, a second back insulated table support column 59. The vacuum table 800 is reinforced with a front stabilizing bar 39$^1$, a rear stabilizing bar 39$^2$, a first side stabilizing bar 39$^3$ and an opposing second side stabilizing bar 394 to further support the vacuum table 800.

Figure 10:
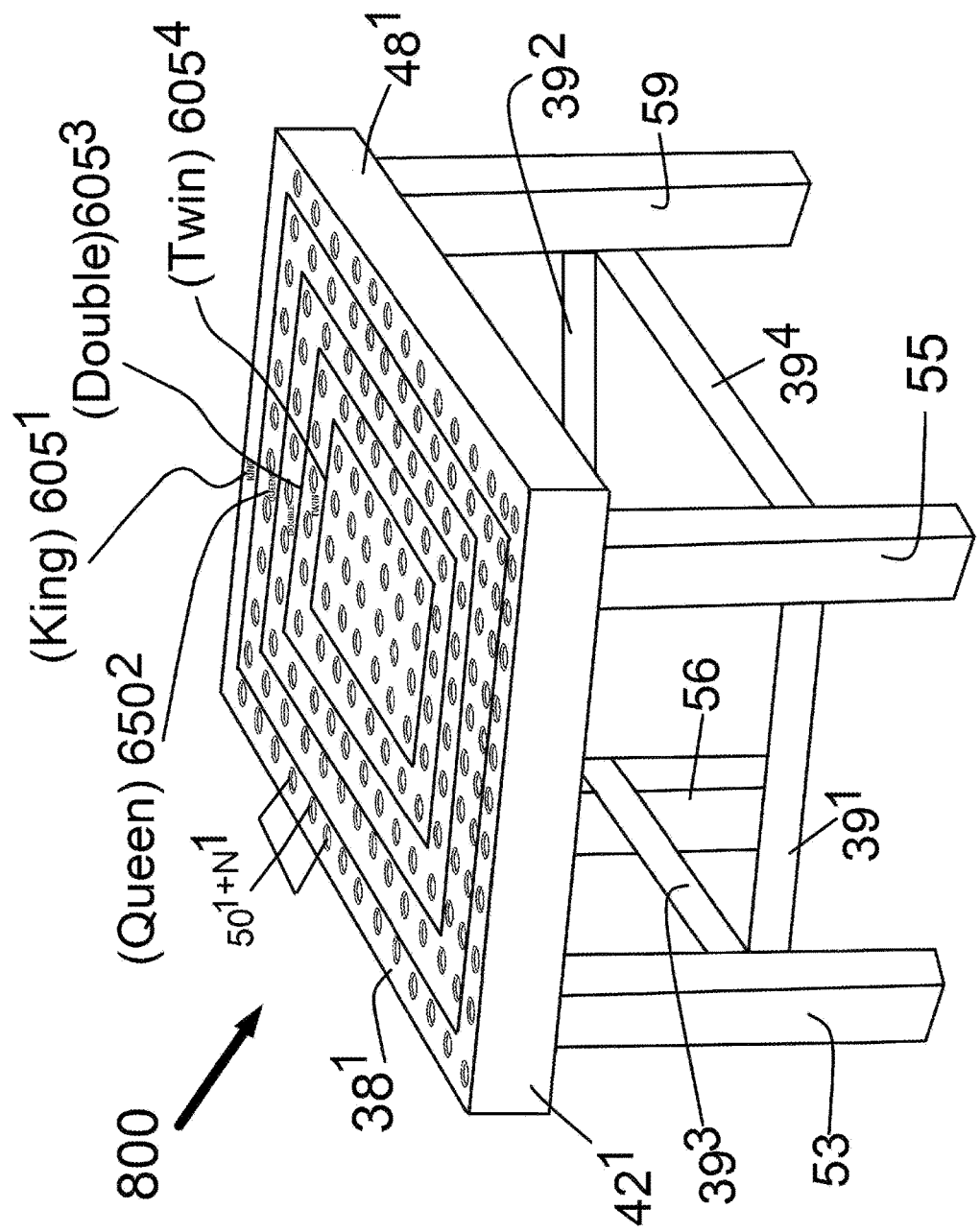
FIG. 10 is a perspective view of a vacuum table of the gel foam body amalgamation system showing etched sizes of mattresses including King, Queen, Double, Twin, according to another embodiment of the present invention.

FIG. 10 is a perspective view of the vacuum table 800 including the rigid silicone table top $38^1$ including a variety of size markers $605^{1-4}$ indicated in colored lines. The variety of size markers $605^{1-4}$ includes King $605^1$, Queen $605^2$, Double $605^3$, and Twin $605^4$ but not limited to. The variety of size markers can include any geometric shape and size to embody a size of a sofa cushion, a chair cushion, a pillow, a cushion, and soft foam structures.

Similarly, in an aspect of the vacuum lift-table 12 of the gel-foam body amalgamation system 10 the rigid silicone table top 38 can include the variety of size markers $605^{1-4}$ indicated in colored lines. The variety of size markers $605^{1-4}$ includes King $605^1$, Queen $605^2$, Double $605^3$, and Twin $605^4$ but not limited to. The variety of size markers can include any geometric shape and size to embody a size of a sofa cushion, a chair cushion, a pillow, a cushion, and soft foam structures.

With reference to FIG. 17, the heating metal table 802 of the core body amalgamation system 1000 includes a metal table structure including a flat metal table top $64^1$, a flat metal table bottom $66^1$, a front facing flat metal wall $68^1$, a rear facing flat metal wall $70^1$, a first lateral flat metal side wall $72^1$, an opposing second flat metal lateral side wall $74^1$.

The heating metal table 802 of the core body amalgamation system 1000 is supported by four insulated metal columns 77, 79, 81, 83 supporting the metal table structure including a first front insulated table metal column 76, a second front insulated table metal column 78, a first back insulated table metal column 80, a second back insulated table metal column 82. The heating metal table 802 is reinforced with a with a front stabilizing bar $75^1$, a rear stabilizing bar $75^2$, a first side stabilizing bar $75^3$ and an opposing second side stabilizing bar $75^4$ to further support the heating metal table 802.

With reference to FIG. 17 the heating metal table 802 of the body core amalgamation system 1000 includes a metal basin $88^1$ to provide a vessel to contain a predetermined volume of a colloidal matter $87^1$ and to provide a vessel in which to heat the colloidal matter $87^1$ to be implemented in the formation of a dual-core body amalgamate 1002. The metal gel basin $88^1$ is permanently attached on an upside of the flat metal table top $64^1$ of the gel heating metal lift-table 14 by way of welding wherein the metal basin $88^1$ is co-planar with the flat metal table top 64 of the heating metal table 802, the metal basin $88^1$ configured with a metal basin 88 surface area equal to the first surface area configured to receive the core body. The colloidal matter $87^1$ can be selected from any one of a colloidal gelatinous matter that is characterized to consist of two phases that are intertwined with one another having a solid particle network and a liquid solvent. The result is soft-solid materials with unique properties, including elasticity and mechanical stability, which make them attractive choices for numerous applications. The metal basin $88^1$ includes a cavity $104^1$ to contain a predetermined volume of colloidal matter $87^1$ therein. The metal basin $88^1$ of the heating metal table 802 is configured with a metal floor $92^1$ bound by four upright perimetric metal walls wherein the top flat surfaces of each of the four upright perimetric metal walls $96^1$, $98^1$, $100^1$, $102^1$ provides a peripheral rectangular top metal rim $94^1$ to the metal basin $88^1$. The four perimetric metal walls $96^1$, $98^1$, $100^1$, $102^1$ include a front facing metal wall $96^1$, a rear facing metal wall $98^1$, and two lateral facing metal walls $100^1$, $102^1$, a first lateral metal side wall $100^1$ and a second lateral metal side wall $102^1$ enclosing the colloidal bath 901.

The cavity $104^1$ of the metal basin 88 is configured with a cavity opening dimensioned to receive the core body 24.

The metal floor $92^1$ is dimensioned with a surface area of at least 84×76 inches. In this manner, the vacuum lift-table can receive a variety of sizes of foam core bodies ranging to equivalent sizes of a King mattress (80×76 inches); a Queen size mattress (80×60 inches); a Double size mattress (75×73 inches); and a Twin size mattress (75×38); and for pillows, cushions, stuffed toys, and a variety of support devices.

The gel heating metal lift-table 14 and the metal gel basin 88 can be manufactured with any one of the metals selected from the group comprising, stainless steel, copper, iron, cast iron and any combination thereof.

With reference to FIG. 17 the metal basin 88 includes a supply pipe inlet port $120^1$. The supply pipe inlet port $120^1$ is disposed at a corner portion of the front facing wall $96^1$ of the metal basin $88^1$. As depicted in FIG. 17, the supply pipe inlet port $120^1$ is capable of receiving a supply pipe 122 fluidly connected to a supply well $30^1$ in cooperation with an extruder 28 to enable a stream of colloidal matter $87^1$ entering the metal basin $88^1$. The supply pipe $122^1$ facilitates passing of the stream of colloidal matter $87^1$ from a front interior facing wall to a rear interior facing wall of the metal gel basin $88^1$ to reach a predetermined volume of colloidal matter $87^1$.

The predetermined volume of colloidal matter $87^1$ is indicated by a measurement bar $148^1$ etched on a surface of the front interior facing wall of the metal basin $88^1$. The operator, also, views the measurement bar 148 to replenish a reduced colloidal matter volume to the predetermined volume of colloidal matter $87^1$ after completion of the operation of making the dual-core body amalgamate 1002.

The control of the flow of the stream of colloidal matter $87^1$ therethrough the supply pipe $122^1$ is controlled by a valve $544^1$, as shown in FIG. 17. The valve $544^1$ is operationally configured on the supply pipe $122^1$ proximate to the supply well $30^1$. The valve $544^1$ is open by maneuvering the valve $544^1$ to be parallel to the gel supply pipe $122^1$ and wherein the valve $544^1$ is closed by maneuvering the valve $544^1$ to be perpendicular to the valve $544^1$. Opening the valve $544^1$ of the supply pipe $122^1$ causes the stream of colloidal matter $87^1$ to flow into the metal basin $88^1$ of the heating metal table $802^1$, and closing the valve $544^1$ causes the stream of gel $87^1$ to cease flowing into the metal gel basin $88^1$ of the heating metal table 802.

The heating metal table 802 includes at least one variable frequency drive pump $124^1$. The at least one variable frequency drive pump $124^1$ is configured to deliver a pressure of 300 horse power. The at least one variable frequency drive panel $125^1$ is disposed proximate to the flat metal table bottom $66^1$ of the heating metal table 802, the at least one variable frequency drive pump $124^1$ including at least one in-line pipe $126^1$ running parallel to the flat metal bottom of the heating metal table 802.

The at least one variable frequency drive pump $124^1$ of the heating metal table 802 includes a front end $126^1$ and a rear end $126^2$ wherein the front end $126^1$ of the at least one-inlet pipe $126^1$ is connected to an at least one in-line pipe inlet port $128^1$ centrally disposed within the front facing metal wall of the metal basin $88^1$, as shown in FIG. 17. The at least one in-line pipe inlet port $128^1$ is fluidly cooperative with the cavity 104 of the metal gel basin 88. The rear end $126^2$ of the at least one-outlet pipe $126^1$ is connected to an at least one in-line pipe outlet port 1301 centrally disposed within the rear facing flat metal wall of the metal gel basin $88^1$ such that a variable frequency pressure is pumped therethrough the at least one in-line pump pipe $126^1$ into the colloidal matter bath 901 by way of the at least one variable frequency drive pump $124^1$ whereby the predetermined volume of colloidal matter $87^1$ is mixed and circulated and recirculated from the front interior facing wall to the rear interior facing wall of the metal basin $88^1$ and therethrough the at least one in-line pipe $126^1$.

The at least one variable frequency drive pump $124^1$ is controlled by a variable speed drive controller $125^1$ of the at least one variable frequency drive pump $124^1$ to regulate the speed of the variable pressure forced into the colloidal matter $87^1$ within the colloidal matter bath 901. The variable speed drive controller $125^1$ of the at least one variable frequency drive pump $124^1$ includes a control panel with an "ON" operating mode switch 1271 and an "OFF" operating mode switch 1291, a pressure switch 1331, a flow switch 1351.

As depicted in FIG. 12, the heating metal table 802 includes at least one planar heater device $132^{1+N}$. The at least one planar heater device $132^{1+N}$ includes two electrodes $134^{1-2}$ being electrically conductive. Each of the two electrodes $134^{1-2}$ is connected to the power source 136 by way of an electrical conduit wherein the electrical conduit is insulated in a non-electric conductive ultrahigh molecular weight polyethylene tube 138. The at least one planar heater device $132^{1+N}$ is mounted externally to an exterior surface the flat metal table bottom 66 of the gel heating metal table 802 by which a controlled temperature is generated to enable by way of thermal conduction of the metal gel basin 88 to heat the gel 87 to a heated liquid gel $87^1$ or to cool the heated liquid gel $87^L$ of the gel bath 90 contained in the metal gel basin 88. The controlled temperature of the is regulated by a temperature controller 131 operatively electrically connected to the at least one planar heater device $132^{1+N}$. The at least one planar heater device $132^{1+N}$ includes an electric conductive metal plate $150^{1+4}$.

With reference to FIGS. 1, 5A and 8, the core body fusion table 804 includes a table structure including a rigid non-slip non-perforated table top $164^1$ and a rigid non-slip non-perforated table bottom $166^1$ joined by four rigid walls including a rigid front facing non-slip wall front facing rigid non-slip wall $168^1$, a rigid rear facing non-slip wall $170^1$, a first rigid non-slip side wall $172^1$ and an opposing second rigid non-slip side wall $174^1$ joined at four corners. The rigid non-slip table top $164^1$ and the rigid non-slip table bottom $166^1$ is non-perforated.

The core body fusion table 804 is supported by four insulated table support columns 177, 179, 181, 183 including a first front insulated table support column 177, a second front insulated table support column 179, a first back insulated table support column 181 and a second back insulated table support column 183.

The operations of the core body amalgamation system 1000 is implemented with a core body 1024 and intermediary core body 1026. As depicted in FIG. 70, the core body 1024 is configured with a thickness, a length, and a width, a top core body portion 1086 and a bottom core body portion 1088 wherein the top core body portion 1086 includes a top side $186^1$ having a flat top surface and the bottom core body portion 1088 having a bottom side $1088^1$ having a flat bottom surface.

The top core body portion 1086 and the bottom body core portion 1088 are joined by two lateral side walls 1090, 1092 a first lateral side wall 1090 and a second opposing lateral side wall 1092 and two longitudinal side walls 1094, 1096 a front longitudinal side wall 194, and a rear longitudinal side wall 196.

The core body 1024 is manipulated to include a plurality of extended protuberates $1098^{1+N}$, as shown in FIG. 17, which are carved within the bottom core body portion 1088 of the core body 1024 by way of a contour saw (not shown). Each of the extended protuberates $1098^{1+N}$ of the series of the plurality of extended protuberates $1098^{1+N}$ are configured in symmetrical alignment a first distance from each other aligned in a plurality of rows $2000^{1+N}$ and a plurality of columns $2002^{1+N}$ interconnected by a plurality recessed channels $2004^{1+N}$ bordered by an adjourned peripheral rim 2006, wherein each of the plurality of extended protuberates $1098^{1+N}$ is configured with a thickness which is less than the thickness of the core body 1024.

The intermediary core body 1026, is configured to be fused with the core body 1024 to form a dual-core body amalgamate 1002. The intermediary core body 1026 is dimensioned with a square footage equal to the square footage of the core body 1024. The intermediary core body 1026 includes a flat top facing wall 2010 and a flat bottom facing wall 2012 joined by four side walls including a flat front wall 2014, a flat rear wall 2016, joined by two flat lateral side walls 2018, 2020, a first porous flat lateral side wall 2018 and an opposing second flat lateral side wall 2020 wherein the flat top facing wall 210 includes a top porous layer and the flat bottom facing wall 2012 includes a bottom porous layer.

The core body 1024 and the intermediary core body 1026 the can be made with a material which is selected from anyone of the group comprising, foam, silicone, vinyl foam, rubber, polyethylene, polyethylene terephthalate, polyvinyl alcohol, polypropylene, polystyrene, polycarbonate, polyamide, and resins based on any one of them. and any combinations thereof.

The gel body amalgamation system 1000 includes the overhead double-beam bridge crane 18, as depicted in FIG. 17, with reference to FIGS. 1-8, which is configured to support the hood conveyor apparatus 20 allowing the hood 22 to steadily travel along a front I-beam bridge 242 and a rear I-beam bridge 244 to each of the vacuum table 800, the gel heating metal lift-table 802, and the core body fusion table 804 during the operation of producing the dual-core body amalgamate 1002.

The overhead double-beam bridge crane 18 is fortified by four upright metal box columns 222, 224, 226, 228, a first upright metal box column 222, a second upright metal box column 224, a third upright metal box column 226, a fourth upright metal box column 228, and a first metal link beam 230, a second metal link beam 232. A front end $230^1$ of the first metal link beam 230 is fixedly attached to a top end $222^1$ of the first upright metal box column 222 by way of a first bolted column end plate 234 and a rear end $230^2$ of the first metal link beam 230 is fixedly attached to a top end $226^1$ of the third upright metal box column 226 by way of a second bolted column end plate 236. A front end $232^1$ of the second metal link beam 232 is fixedly attached to a top end $224^1$ of the second upright metal box column 224 by way of a third bolted column end plate 238 and a rear end $232^2$ of the second metal link beam 232 is fixedly attached to a top end $228^1$ of the fourth upright metal box column 228 by way of a fourth bolted column end plate 240.

With reference to FIGS. 17, the two I-beam bridges 242, 244 of the overhead double-beam bridge crane 18 include the front I-beam bridge 242 and the rear I-beam bridge 244. The front I-beam bridge 242 and the rear I-beam bridge 244 are fixedly attached a predetermined distance apart and parallel to each other oriented oligomeric to the first metal link beam 230 and the second metal link beam 232. A first end 2421 of the front I-beam bridge 242 is fixedly attached by way of a first bolted I-beam end plate 246 to a first trolley end stop 248 disposed at the front end $230^1$ of the first metal link beam 230 and an opposing second end 242² of the front I-beam bridge 242 is fixedly attached to a second trolley end stop 250 disposed at the front end 232¹ of the second metal link beam 232 by way of a second bolted I-beam end plate 252. A first end 244¹ of the rear I-beam bridge 244 is fixedly attached to a third trolley end stop 254 disposed at the rear end 230² of the first metal link beam 230 by way of a third bolted I-beam end plate 256 and an opposing second end 244² of the rear I-beam bridge 244 is fixedly connected to a fourth trolley end stop 258 disposed at the rear end 232² of the second metal link beam 232 by way of a fourth I-beam end plate 260. By way of this construction of the front I-beam bridge 242 and the rear I-beam bridge 244 fixedly attached to the first metal link beam 230 and the second metal link beam 232 a major framed open space is circumscribed to abide the vacuum table 800, the heating metal table 802, the core body fusion table 804 and the hood 22 being supported by the hood conveyor apparatus 20, as depicted in FIG. 17.

To facilitate the movement of the hood conveyor apparatus 20, as depicted in FIG. 17 the two I-beam bridges 242, 244 of the overhead double-beam bridge crane 18 are in working operation with four trolleys 262, 264, 266, 268, a first trolley 262, a second trolley 264, a third trolley 266, a fourth trolley 268, wherein the first trolley 262 is operationally coupled to the front I-beam bridge 242 by way of a first trolley carriage 270 and the second trolley 264 is operationally coupled to the front I-beam bridge 242 by way of a second trolley carriage 274, the third trolley 266 operationally coupled to the rear I-beam bridge 244 by way of a third trolley carriage 276 and the fourth trolley 268 operationally coupled to the rear I-beam bridge 244 by way of a fourth trolley carriage 278.

As depicted in FIG. 17 with reference to FIGS. 1-8, each of the first trolley carriage 270 of the first trolley 262 and the second trolley carriage 274 of the second trolley 264 is configured with a first set of at least six radial rollers 280$^{1-6}$, a first set of at least four side rollers 282$^{1-4}$ and a second set of at least six radial rollers 284$^{1-6}$, a second set of at least four side rollers 286$^{1-4}$ to operationally couple each of the first trolley 262 and the second trolley 264 to the front I-beam bridge 242, respectively, and whereby the first trolley 262 and the second trolley 264 are each moveably operational along a length of the front I-beam bridge 242 by way of each of the first set of at least six radial rollers 280$^{1-6}$ and the first set of at least four side rollers 282$^{1-4}$ of the first trolley carriage 270 of the first trolley 262 and the second set of at least six radial rollers 284$^{1-6}$ and the second set of at least four side rollers 286$^{1-4}$ of the second trolley carriage 274 of the second trolley 264.

The first trolley carriage 270 of the first trolley 262 is in working operation with the front I-beam bridge 242 of the overhead double-beam bridge crane 18. In particular, the first trolley carriage 270, the first set of the at least six radial rollers first set of at least six radial rollers 280$^{1-6}$ of the first trolley carriage 270 of the first trolley 262 includes a series of three anterior radial rollers 280$^{1-3}$ which is coplanar with a series of three posterior radial rollers 280$^{3-6}$ wherein the set of three anterior radial rollers 280$^{1-3}$ of the first trolley carriage 270 of the first trolley 262 are oriented to come in contact with an anterior side flat bearing surface 288 of a front I-beam track 290¹ of the front I-beam bridge 242 and the three posterior radial rollers 280$^{3-6}$ of the first trolley carriage 270 of the first trolley 262 are oriented to come in contact with a posterior side flat bearing surface 292 of a rear I-beam track 290² of the front I-beam bridge 242.

In addition, the first set of the at least four side rollers 282$^{1-4}$, as depicted in FIG. 5B, of the first trolley carriage 270 of the first trolley 262 includes two anterior side rollers 282$^{1-2}$ which are coplanar with two posterior side rollers 282$^{3-4}$. The two anterior side rollers 282$^{1-2}$ includes a first anterior side roller colinear 282¹ with a second anterior side roller 282². The first anterior side roller 282¹ is operationally attached at a first anterior cut-out lead portion 294¹ of the first trolley carriage 270 of the first trolley 262 and the second anterior side roller 282² is operationally attached at an opposing second anterior cut-out lead portion 294² of the first trolley carriage 270 of the first trolley 262.

Continuing with the first trolley 262, the opposing second anterior cut-out lead portion 294² of the first trolley carriage 270 of the first trolley 262 is configured at a first lateral distance from the first anterior cut-out lead portion 294¹ of the first trolley carriage 270. The first anterior side roller 282¹ and the second anterior roller 282² is oriented to come in line contact with an anterior side perpendicular bearing wall 296 of the front I-beam bridge 242. The two posterior side rollers 282$^{3-4}$ includes a first posterior side roller 282³ and a second posterior side roller 282⁴. The first posterior side roller 282³ is operationally attached at a first posterior cut-out lead portion 298¹ of the first trolley carriage 270 and the second posterior side roller 282⁴ is operationally attached at an opposing second posterior cut-out lead portion 298² of the first trolley carriage 270, the opposing second posterior cut-out lead portion 298² is configured at a second lateral distance from the first posterior cut-out lead portion 298 of the first trolley carriage 270 of the first trolley 262. The first posterior side roller 282³ and the second posterior roller 284² is oriented to come in line contact with an anterior side perpendicular bearing wall 296 of the front I-beam bridge 242.

The first lateral distance between the first anterior cut-out lead portion 294¹ and the second anterior cut-out lead portion 294² is equal to the second lateral distance between the first posterior cut-out lead portion 298¹ and the second posterior cut-out lead portion 298² of the first trolley carriage 270 to enable an equalizing balance of the two anterior side rollers 282$^{1-2}$ and the two anterior side rollers and the two posterior side rollers 282$^{3-4}$ against the anterior side perpendicular bearing wall 296 and a posterior side perpendicular bearing wall 302 of the front I-beam bridge 242 of the overhead double-beam bridge crane 18.

The first posterior side roller 282³ and the second posterior side roller 282⁴ of the first trolley carriage 270 of the first trolley 262 are each oriented to come in line contact with the posterior side perpendicular bearing wall 302 of the front I-beam bridge 242, wherein when the two anterior side rollers 282$^{1-2}$ and the two posterior side rollers 282$^{3-4}$ of the first trolley carriage 270 of the first trolley 262 concomitantly come in contact against the anterior side perpendicular bearing wall 296 and the posterior side perpendicular bearing wall 302 of the front I-beam bridge 242, respectively, the first trolley carriage 270 of the first trolley 262 is movably constrained to enable a steady horizontal movement of the first trolley carriage 270 of the first trolley 262 along the front I-beam bridge 242 moving in either direction towards the first trolley end stop 248 or towards the second trolley end stop 250.

The second trolley carriage 274 of the second trolley 264 are in working operation with the front I-beam bridge 242 of the overhead double-beam bridge crane 18. The second set of at least six radial rollers 284$^{1-6}$ of the second trolley carriage 274 of the second trolley 264 includes a series of three anterior radial rollers 284$^{1-3}$ of the second trolley carriage 274 of the second trolley 264 which is coplanar with a second series of the three posterior radial rollers $280^{3-6}$ of the second trolley carriage 274 of the second trolley 264 wherein the series of three anterior radial rollers $284^{1-3}$ of the second trolley carriage 274 of the second trolley 264 are oriented to come in contact with the anterior side flat bearing surface 288 of the front I-beam track 290 of the front I-beam bridge 242 and the three posterior radial rollers $280^{3-6}$ of the second trolley carriage 274 of the second trolley 264 are oriented to come in contact with the posterior side flat bearing surface 292 of the rear I-beam track $290^2$ of the front I-beam bridge 242 of the overhead double-beam bridge crane 18.

The second trolley carriage 274 of the second trolley 274 includes the second set of the at least four side rollers $286^{1-4}$ that is working operation with the front I-beam bridge 242 of the overhead double-beam bridge crane 18. The second set of the at least four side rollers $286^{3-6}$ of the second trolley carriage 274 of the second trolley 264 includes two anterior side rollers $286^{1-2}$ of the second trolley carriage 274 of the second trolley 264 which are coplanar with two posterior side rollers $286^{3-4}$ of the second trolley carriage 274 of the second trolley 264.

The two anterior side rollers $286^{1-2}$ of the second trolley carriage 274 of the second trolley 264 includes a first anterior side roller $286^1$ of the second trolley carriage 274 of the second trolley 264 colinear with a second anterior side roller $286^2$ of the second trolley carriage 274 of the second trolley 264. The first anterior side roller $286^1$ of the second trolley carriage 274 of the second trolley 264 is operationally attached at a first anterior cut-out lead portion $304^1$ of the second trolley carriage 274 of the second trolley 264 and the second anterior side roller $286^2$ of the second trolley carriage 274 is operationally attached at an opposing second anterior cut-out lead portion $304^2$ of the second trolley carriage 274 of the second trolley 264. The opposing second cut-out lead portion $304^2$ of the second trolley carriage 274 being configured at a lateral distance from the first anterior cut-out lead portion $304^1$ of the second trolley carriage 274 of the second trolley 264. The first anterior side roller $286^1$ and the second anterior side roller $286^2$ of the second trolley carriage 274 of the second trolley 264 is oriented to come in line contact with the anterior side perpendicular bearing wall 296 of the front I-beam bridge 242.

In addition, the two posterior side rollers $286^{3-4}$ of the second trolley carriage 274 of the second trolley 264 includes a first posterior side roller $286^3$ and a second posterior side roller $286^4$. The first posterior side roller $286^3$ of the second trolley carriage 274 of the second trolley 264 is operationally attached at a first posterior cut-out lead portion $306^1$ of the second trolley carriage 274 of the second trolley 264 and the second posterior side roller $286^4$ is operationally attached at an opposing second posterior cut-out lead portion $306^2$ of the second trolley carriage 274 of the second trolley 264. The first posterior side roller $286^3$ and the second posterior side roller $286^4$ of the second trolley carriage 274 of the second trolley 264 are each oriented to come in line contact with the posterior side perpendicular bearing wall 302 of the front I-beam bridge 242, wherein when the two anterior side rollers $286^{3-4}$ of the second trolley carriage 274 of the second trolley 264 and the two posterior side rollers $286^{3-4}$ of the second trolley carriage 274 of the second trolley 264 concomitantly come in contact against the anterior side perpendicular bearing wall 296 and the posterior side perpendicular bearing wall 302 of the front I-beam bridge 242, respectively, the second trolley carriage 274 of the second trolley 264 is movably constrained to enable a steady horizontal movement of the second trolley carriage 274 of the second trolley 264 along the front I-beam bridge 242 moving in either direction towards the first trolley end stop 248 or towards the second trolley end stop 250.

Similarly, the third trolley 266 includes the third trolley carriage 276 and the fourth trolley 268 includes the fourth trolley carriage 278 in working operation with the rear I-beam bridge 244 of the overhead double-beam bridge crane 18. The third trolley carriage 276 of the third trolley 266 and the fourth trolley carriage 278 of the fourth trolley 268 is configured with a third set of at least six radial rollers $308^{1-6}$, a third set of at least four side rollers $310^{1-4}$ and a fourth set of at least six radial rollers $312^{1-6}$, a fourth set of at least four side rollers $314^{1-4}$, to operationally couple each of the third trolley 266 and the fourth trolley 268 to the rear I-beam bridge 244, respectively. In this manner, the third trolley 266 and the fourth trolley 268 are each moveably operational along a length of the rear I-beam bridge 244 by way of the six radial rollers $308^{1-6}$ and the four side rollers $314^{1-4}$, fixedly attached to the third trolley carriage 276 and the fourth trolley carriage 278, respectively.

The third trolley carriage 276 of the third trolley 266 includes the third set of the at least six radial rollers $308^{1-6}$ and includes a series of three anterior radial rollers $308^{1-3}$ which is coplanar with a series of three posterior radial rollers $308^{3-6}$. The three anterior radial rollers $308^{1-3}$ of the third trolley carriage 276 are oriented to come in contact with an anterior side flat bearing surface 316 of a rear I-beam track 318 of the rear I-beam bridge 244 and the three posterior radial rollers $308^{3-6}$ are oriented to come in contact with a posterior side flat bearing surface 320 of the rear I-beam track 318 of the rear I-beam bridge 244.

The third set of the at least four side rollers $310^{1-4}$ of the third trolley carriage 276 of the third trolley 266 includes two anterior side rollers $310^{1-2}$ which are coplanar with two posterior side rollers $310^{3-4}$. The two anterior side rollers $310^{1-2}$ includes a first anterior side roller $310^1$ colinear with a second anterior side roller $310^2$ wherein the first anterior side roller $310^1$ is positioned at a first anterior cut-out lead portion $324^1$ of the third trolley carriage 276 of the third trolley 266. The second anterior side roller $310^2$ is positioned at an opposing second cut-out lead portion $324^2$ of the third trolley carriage 276 of the third trolley 266.

The first anterior side roller $310^1$ and the second anterior side roller $310^2$ of the third trolley carriage 276 of the third trolley 266 is oriented to come in line contact with an anterior side perpendicular bearing wall $326^1$ of the rear I-beam bridge 244. The second set of two posterior side rollers two posterior side rollers $310^{3-4}$ includes a first posterior side roller $310^3$ and a second posterior side roller $310^4$ of the third trolley carriage 276 of the third trolley 266. The first posterior side roller two posterior side rollers $310^3$ is positioned at a first posterior cut-out lead portion $328^1$ of the third trolley carriage 276 of the third trolley 266 and the second posterior side roller $310^4$ is positioned at an opposing second posterior cut-out lead portion $328^2$ of the third trolley carriage 276 of the third trolley 266. The first posterior side roller $310^3$ and the second posterior side roller $310^4$ are each oriented to come in line contact with a posterior side perpendicular bearing wall $326^1$ of the rear I-beam bridge 224, wherein when the two anterior side rollers $326^{1-2}$ and the two posterior side rollers $326^{3-4}$ of the third trolley carriage 276 of the third trolley 266 concomitantly come in contact against the anterior side perpendicular bearing wall $326^1$ and the posterior side perpendicular bearing wall $326^2$ of the rear I-beam bridge 244, respectively, the third trolley carriage 276 of the third trolley 266 is movably constrained to enable a steady horizontal movement of the third trolley carriage 276 of the third trolley 266 along the rear I-beam bridge 224 moving in either direction towards the third trolley end stop 254 or towards the fourth trolley end stop 258.

The fourth trolley carriage 278 of the fourth trolley 268 includes at least six radial rollers $312^{1-6}$ and the least of four side rollers $314^{1-4}$ in working operation with the rear I-beam bridge 224 of the overhead double-beam bridge crane 18. The at least six radial rollers $312^{1-6}$ of the fourth trolley carriage 278 of the fourth trolley 268 includes a series of three anterior radial rollers $312^{1-3}$ which is coplanar with a series of three posterior radial rollers $312^{4-6}$. The set of three anterior radial rollers $312^{1-3}$ are oriented to come in contact with the anterior side flat bearing surface 316 of a rear I-beam track 318 of the rear I-beam bridge 244 and the three posterior radial rollers $312^{4-6}$ are oriented to come in contact with the posterior side flat bearing surface 320 of the rear I-beam track 318 of the rear I-beam bridge 244.

The at least of four side rollers $314^{1-4}$ of the fourth trolley carriage 278 of the fourth trolley 268 includes two anterior side rollers $314^{1-2}$ which are coplanar with two posterior side rollers $312^{3-4}$. The two anterior side rollers $314^{1-2}$ includes a first anterior side roller $314^1$ colinear with a second anterior side roller $314^2$ of the fourth trolley carriage 278 of the fourth trolley 268 wherein the first anterior side roller $314^1$ is positioned at a first anterior cut-out lead portion $330^1$ of the fourth trolley carriage 278 of the fourth trolley 268 and the second anterior side roller $314^2$ is positioned at an opposing second anterior cut-out lead portion $330^2$ of the fourth trolley carriage 278 of the fourth trolley 268. The first anterior side roller $314^1$ and the second anterior side roller $314^2$ of the fourth trolley carriage 278 of the fourth trolley 268 is oriented to come in line contact with the anterior side perpendicular bearing wall $326^1$ of the rear I-beam bridge 244.

The two posterior side rollers $312^{3-4}$, includes a first posterior side roller $312^3$ and a second posterior side roller $312^4$ of the fourth trolley carriage 278 of the fourth trolley 268 wherein the first posterior side roller $312^3$ is positioned at a first posterior cut-out lead portion $332^1$ of the fourth trolley carriage 278 of the fourth trolley 268 and the second posterior side roller $312^4$ is positioned at an opposing second posterior cut-out lead portion $332^2$ of the fourth trolley carriage 278 of the fourth trolley 268, the opposing second posterior cut-out lead portion $332^2$.

The first posterior side roller $312^3$ and the second posterior side roller $312^4$ are each oriented to come in line contact with the posterior side perpendicular bearing wall $326^2$ of the rear I-beam bridge 244 wherein when the two anterior side rollers $312^{1-1}$ and the two posterior side rollers $312^{3-4}$ of the fourth trolley carriage 278 of the fourth trolley 268 concomitantly come in contact against the anterior side perpendicular bearing wall $326^1$ and the posterior side perpendicular bearing wall $326^2$ of the rear I-beam bridge 224, respectively, whereby the fourth trolley carriage 278 of the fourth trolley 268 is movably constrained to enable a steady horizontal movement of the fourth trolley carriage 278 of the third trolley 266 along the rear I-beam bridge 224 moving in either direction towards the third trolley end stop 254 or towards the fourth trolley end stop 258 of the rear I-beam bridge 224.

The core body amalgamation system 1000 includes a hood conveyor apparatus 20 configured with structural and utilitarian frames to support the hood 22 as the hood 22 moves in a horizontal direction to each of the vacuum table 800, the heating metal table 802, and the core body fusion table 804 and in a vertical upward direction and downward direction during the operation of the gel foam body amalgamation system 10 in the formation of the dual-core foam body amalgamate 600, as depicted in FIG. 15E.

The hood conveyor apparatus 20, as depicted in FIG. 17, with reference to FIGS. 1-5A, and 6-8 includes an upper conveyor frame 334 and a lower conveyor frame 338 coplanar to each other fixedly joined to an anchorage conveyor frame 336. The anchorage conveyor frame 336 is configured having a rectangular shaped structure being disposed in a transverse plane between the upper conveyor frame 334 and the lower conveyor frame 338 whereby a minor framed open space is circumscribed within the major framed open space to abide for the hood conveyor apparatus 20.

The anchorage conveyor frame 336 includes a front joist 340 and a rear joist 342, a
first lateral side joist 344, an opposing second lateral side joist 346, a front cross bar 360, a rear cross bar 362, and four lifting masts 364, 366, 368, 370 vertically oriented wherein the front joist 340 and the rear joist 342 are each fixedly attached to the first lateral side joist 344 and the opposing second lateral side joist 346 by way of four joist hanger brackets 348, 350, 352, 354 whereby four corners of the anchorage conveyor frame 336 are formed.

A first lifting mast 356 of the anchorage conveyor frame 336 includes a superior end $356^1$ and an inferior end $356^2$. The superior end $356^1$ of the first lifting mast 356 is fixedly bolted to a first joist end $340^1$ of the front joist 340 of the anchorage conveyor frame 336 by way of a first joist hanger bracket 358 and the inferior end $356^2$ of the first lifting mast 356 is fixedly bolted to a first end $360^1$ of the front cross bar 360 by way of a first iron face plate 372.

A second lifting mast 374 of the anchorage conveyor frame 336 includes a superior end $374^1$ and an inferior end $374^2$. The superior end of the second lifting mast 374 is fixedly bolted to a second end of the front joist 340 of the anchorage conveyor frame 336 by way of a second joist hanger bracket 376 and the inferior end $374^2$ of the second lifting mast 374 is fixedly bolted to a second end $360^2$ of the front cross bar 360 by way of a second iron face plate 378.

A third lifting mast 380 of the anchorage conveyor frame 336 includes a superior end $380^1$ and an inferior end $380^2$ wherein the superior end $380^1$ of the third lifting mast 380 is fixedly bolted to a first end $342^1$ of the rear joist 342 of the anchorage conveyor frame 336 by way of a third joist hanger bracket 382 and the inferior end $380^2$ of the third lifting mast 380 is fixedly bolted to a first end of the rear cross bar 362 of the anchorage conveyor frame 336 by way of a third iron face plate 384.

A fourth lifting mast 386 of the anchorage conveyor frame 336 includes a superior end $386^1$ and an inferior end $386^2$ wherein the superior end $386^1$ of the fourth lifting mast 386 is fixedly bolted to a second end $342^2$ of the rear joist 342 of the anchorage conveyor frame 336 by way of a fourth joist hanger bracket 388 and the inferior end $386^2$ of the fourth lifting mast 386 is fixedly bolted to a second end $362^2$ of the rear cross bar 362 of the anchorage conveyor frame 336 by way of a fourth iron face plate 390.

The upper conveyor frame 334 of the hood conveyor apparatus 20 includes four overhead metal posts 392, 394, 396, 398 which are vertically oriented, including a first overhead metal post 392, a second overhead metal post 394, a third overhead metal post 396, a fourth overhead metal post 398.

The first overhead metal post 392 of the upper conveyor frame 334 is positioned coaxial to the of first lifting mast 356 of the anchorage conveyor frame 336. A first end $392^1$ of the first overhead metal post 392 is fixedly bolted to the first trolley 262 by way of a first trolley adapter connector 400 and a second end $392^2$ of the first overhead metal post 392 is fixedly bolted to a first end portion $340^1$ of the front joist 340 of the anchorage conveyor frame 336 by way of a first post mount bracket 402.

The second overhead metal post 394 the upper conveyor frame 334 is positioned coaxial to the second lifting mast 374 of the anchorage conveyor frame 336. A first end $394^1$ of the second overhead metal post 394 is fixedly bolted to the second trolley 264 by way of a second trolley adapter connector 404 and a second end $394^2$ of the second overhead metal post 394 is fixedly bolted to a second end portion $340^2$ of the front joist 340 of the anchorage conveyor frame 336 by way of a second post mount bracket 406.

The third overhead metal post 396 the upper conveyor frame 334 is positioned coaxial to the third lifting mast 380 of the anchorage conveyor frame 336. A first end $396^1$ of the third overhead metal post 396 is fixedly bolted to the third trolley 266 by way of a third trolley adapter connector 408 and a second end $396^2$ of the third overhead metal post 396 is fixedly bolted to a first end $342^1$ portion of the rear joist 342 of the anchorage conveyor frame 336 by way of a third post mount bracket 410.

The fourth overhead metal post 398 of the upper conveyor frame 334 is positioned coaxial to the fourth lifting mast 386 of the anchorage conveyor frame 336. A first end of the fourth overhead metal post 398 is fixedly bolted to the fourth trolley 268 by way of a fourth trolley adapter connector 414 and a second end $398^2$ of the fourth overhead metal post 398 is fixedly bolted to a second end portion $342^2$ of the rear joist 342 of the anchorage conveyor frame 336 by way of a fourth post mount bracket 416.

The lower conveyor frame 338 of the hood conveyor apparatus 20 includes four lower support posts 420, 422, 424, 426 being vertically oriented, a first lower support post 420, a second lower support post 422, a third lower support post 424, a fourth lower support post 426.

The first lower support post 420 of the lower conveyor frame 338 is positioned coaxial with the first lifting mast 356. A first end of the first lower support post 420 is fixedly attached to the first end $360^1$ of the front cross bar 360 of the anchorage conveyor frame 336 by way of the first iron face plate 372 and a second end $420^2$ of the first lower support post 420 is fixedly attached to a first corner portion $428^1$ of a front facing rim wall 428 of the hood 22 by way of a first iron mounting plate 430.

The second lower support post 422 of the lower conveyor frame 338 is positioned coaxial with the second lifting mast 374. A first end $422^1$ of the second lower support post 422 is fixedly attached to the second end $360^2$ of the front cross bar 360 of the anchorage conveyor frame 336 by way of the second iron face plate 378 and a second end $420^2$ of the second lower support post 422 is fixedly attached to a second corner portion $428^2$ of the front facing rim wall 428 of the hood 22 by way of a second iron mounting plate 432.

The third lower support post 424 of the lower conveyor frame 338 is positioned coaxial with the third lifting mast 380. A first end $424^1$ of the third lower support post 424 is fixedly attached to the first end $362^1$ of the rear cross bar 362 of the anchorage conveyor frame 336 by way of the third iron face plate 384 and a second end $424^2$ of the third lower support post 424 is fixedly attached to a first corner portion $434^1$ of a rear facing rim wall 434 of the hood 22 by way of a third iron mounting plate 384.

The fourth lower support post 426 of the lower conveyor frame 338 is positioned coaxial with the fourth lifting mast 386. A first end $426^1$ of the fourth lower support post 426 is fixedly attached to the second end $362^2$ of the rear cross bar 362 of the anchorage conveyor frame 336 by way of the second iron face plate 378 and a second end $426^2$ of the fourth lower support post 426 is fixedly attached to the second corner portion $434^2$ of the rear facing rim wall 434 of the hood 22 by way of a fourth iron mounting plate 436. Each of the first lower support post 420, the second lower support post 422, the third lower support post 424, the fourth lower support post 426 is integrated with a rack and pinion gear system $444^{1-4}$ including a first rack and pinion gear system $444^1$, a second rack and pinion gear system $444^2$, a third rack and pinion gear system $444^3$, a fourth rack and pinion gear system $444^4$, respectively; wherein each of the rack and pinion gear systems $444^{1-4}$ includes, a lift carriage $446^{1-4}$, a gear rack $448^{1-4}$ mechanically operative with a mateable pinion $450^{1-4}$, operatively connected to a first lateral axle 452, a second lateral axle 454.

Each of the lift carriages $446^{1-4}$ includes each of the gear rack $448^{1-4}$ which is vertically oriented and centered between a first linear guide $456^{1+N}$ and a second linear guide $458^{1+N}$ of each of the lift carriages $446^{1-4}$, each of the gear racks $448^{1-4}$ having an upward end $460^{1+N}$ and a downward end $462^{1+N}$ with a plurality of gear rack teeth $464^{1+N}$ therebetween.

Each of the mateable pinions $450^{1-4}$ is configured with a plurality of pinion teeth 476 circumferentially aligned around a pinion crown $480^{1-4}$ to enable an operable rotatable mesh between each of a corresponding plurality of gear rack teeth $464^{1+N}$ of each of the gear racks $448^{1-4}$ of each of the first rack and pinion gear system $444^1$, a second rack and pinion gear system $444^2$, a third rack and pinion gear system $444^3$, a fourth rack and pinion gear system $444^4$, each of the mateable pinions $450^{1-4}$ include a pinion borehole $478^{1-4}$ transversely configured therethrough each of the pinion crowns $480^{1+N}$.

The first lateral axle 452 is positioned a first vertical below and parallel to the first lateral side joist 344 of the anchorage conveyor frame 336 and the second lateral axle 454 is positioned a second vertical distance below and parallel to the opposing second lateral side joist 346 of the anchorage conveyor frame 336 wherein the second distance is equal to the first distance such that the first lateral axle 452 and the second lateral axle 454 are symmetrically aligned parallel to each other.

A first end of the first lateral axle 452 is rotationally coupled to a first pinion borehole $478^1$ of the first mateable pinion $450^1$ of a first gear rack $448^1$ of the first rack and pinion gear system $444^1$ integrated with the first lower support post 420 and a second end of the first lateral axle 452 is rotationally coupled to a third pinion borehole $478^3$ of a third gear rack $448^3$ of the third rack and pinion gear system $444^3$ integrated with the third lower support post 424, and a first end of the second axle 454 is rotationally coupled to a second pinion borehole $478^2$ of a second mateable pinion $450^2$ of a second gear rack $448^2$ of the second rack and pinion gear system $444^2$ integrated with the second lower support post 422 and a second end of the second lateral axle 454 is rotationally coupled to a fourth pinion borehole $478^4$ of a fourth mateable pinion $450^4$ of a fourth gear rack $448^4$ of the fourth rack and pinion gear system $444^4$ integrated with the fourth lower support post 426 such that as the hood 22 is lowered and raised the lateral first axle 452 and the second lateral axle 454 synchronously causes the first mateable pinion $450^1$ and the third mateable pinion $450^3$, the second matealbe pinion $450^2$ and the fourth mateable pinion $450^4$ to rotate in unison enabling the operable rotatable mesh between each of a first plurality of pinion teeth $476^1$ of a first mateable pinion $450^1$ and a first plurality of gear rack teeth $464^{1(1+N)}$ of the first gear rack $448^1$ of the first rack and pinion gear system $444^1$, a second plurality of pinion teeth $476^2$ of a second mateable pinion $450^2$ and a second plurality of gear rack teeth $464^{2(1+N)}$ of a second gear rack $448^2$ of the second rack and pinion gear system $444^2$, a third plurality of pinion teeth $476^3$ of a third mateable pinion $450^3$ and a third plurality of gear rack teeth $464^{3(1+N)}$ of a third gear rack $448^3$ of the third rack and pinion gear system $444^2$, a fourth plurality of pinion teeth 4764 of a fourth mateable pinion $450^4$ and a fourth plurality of gear rack teeth $464^{4(1+N)}$ of a fourth gear rack $448^4$ of the fourth rack and pinion gear system $444^4$, in a vertical direction from each of the gear rack's $448^{1-4}$ downward ends 462 to their upward ends 460 or from each of the gear racks $448^{1-4}$ upward end 460 their downward end 462.

The anchorage conveyor frame 336 provides structural support for two spring loaded handles 438, 440 which provides a safe means to maneuver the hood 22 as the hood 22 moves in a horizontal direction to each of the vacuum table 800, the heating metal table 802, and the core body fusion table 804 and in a vertical upward direction and downward direction during the operation of the gel foam body amalgamation system 10 in the formation of the dual-core body amalgamate 1002.

The first spring loaded handle 438 is pivotally attached to the front cross bar 360 of the anchorage conveyor frame 336 and a second spring loaded handle 440 is pivotally attached to the rear cross bar 362 of the anchorage conveyor frame 336 whereby the first spring loaded handle 438 and the second spring loaded handle 440 is maneuvered to operationally raise and lower the hood 22 in a vertical direction and to urge the hood 22 in a horizontal direction along each of the front I-beam bridge 242 and concomitantly along the rear I-beam bridge 244.

The gel foam body amalgamation system 10 includes the hood 22, as shown in FIGS. 1-5A, and FIGS. 6-8. The hood 22, includes a metal rectangular pyramid structure including four cohesive triangular metal panels $466^{1-4}$ being integrally welded together forming an apex 468 and a rectangular base configured with a top opening at the apex 468 having a circumferential cross section and a bottom opening integrated within the rectangular base having a rectangular cross section. The bottom opening includes an exterior facing rectangular peripheral rim 470 having four sides, the front facing rim wall 428, the rear facing rim wall 434, a first lateral facing rim wall 488, a second lateral facing rim wall 490.

The bottom opening of the hood 22 is integrated with a perforated lift and place framework 492, as shown in FIG. 11. The perforated lift and place framework 492 is bounded by the exterior facing rectangular peripheral rim 470 dimensioned with a framework surface area that is equal to the first surface area of the rigid silicone table top $38^1$ of the vacuum table 800.

The perforated lift and place framework 492 is configured with a plurality of hood perforations $494^{1+N}$ symmetrically aligned a distance apart from each other in rows $496^{1-N}$ and columns $498^{1-N}$ extending the entirety of the perforated lift and place framework 492.

The circumferential top opening at the apex 468 of the hood 22 is fluidly connected to a hood conduit 502 which is fluidly connected to a vacuum generator motor 504 configured with 1500 cubic feet per minute. The vacuum generator motor 504 provides a predetermined force of air flow in fluid communication with each of the plurality of hood perforations $494^{1+N}$ of the perforated lift and place framework 492 configured to generate a predetermined vacuum pull therethrough each of the plurality of hood perforations $494^{1+N}$ of the perforated lift and place framework 492. The vacuum generator motor 504 is operationally connected to an "On"/"Off" operation switch 506, wherein the predetermined vacuum pull is purged therethrough each of the plurality of hood perforations $494^{1+N}$ of the perforated lift and place framework 492 when the vacuum generator motor 504 in an "On" operation, and the predetermined vacuum pull is ceased when the vacuum generator motor 504 is in an "OFF" operation to enable a lift and place operation of the foam core body 24.

As depicted in FIG. 17, with reference to FIGS. 1-8, the hood conveyor apparatus 20 includes four spring balancers $508^{1+N}$ to maintain a stable position of the hood 22 wherein each of the four spring balancers $508^{1+N}$ is configured with a drum, a steel wire rope $606^{1-4}$ having a travel distance of 1.5 meters, and a pull weight of 15-25 kg capacity range.

A first spring balancer $508^1$ of the four spring balancers $508^{1+N}$ includes a first end 510 and a second end 512. The first end 510 of the first spring balancer $508^1$ includes a first hook connector $514^1$ which is fixedly attached by way of a first bolted face plate $516^1$ to a first corner $340^1$ of the front joist 340 of the anchorage conveyor frame 336. The second end 512 of the first spring balancer $508^1$ includes a first carabiner snap clip $518^1$ which is fixedly coupled to a corresponding first corner $360^1$ of the front cross bar 360 of the anchorage conveyor frame 336 by way of a first steel hook pad eye plate 5201 fixedly attached to the corresponding first corner $360^1$ of the front cross bar 360.

A second spring balancer $508^2$ of the four spring balancers $508^{1+N}$ includes a first end 522 and a second end 524. The first end 522 of the second spring balancer $508^2$ includes a second hook connector $514^2$ which is fixedly attached by way of a second bolted face plate $516^2$ to a second corner $340^2$ of the front joist 340 of the anchorage conveyor frame 336. The second end 524 of the second spring balancer $508^2$ includes a second carabiner snap clip $518^2$ which is fixedly coupled to a corresponding second corner $360^2$ of the front cross bar 360 of the anchorage conveyor frame 336 by way of a second steel hook pad eye plate $520^2$ fixedly attached to the corresponding second corner $360^2$ of the front cross bar 360.

A third spring balancer $508^3$ of the four spring balancers $508^{1+N}$ includes a first end 526 and a second end 528. The first end 526 a third spring balancer $508^3$ includes a third hook connector $514^3$ which is fixedly attached by way of a third bolted face plate $516^3$ to a first corner $342^1$ of the rear joist 342 of the anchorage conveyor frame 336. The second end 528 of the third spring balancer $508^3$ includes a third carabiner snap clip $518^3$ which is fixedly coupled to a corresponding first corner $362^1$ of the rear cross bar 362 of the anchorage conveyor frame 336 by way of a third steel hook pad eye plate $520^3$ fixedly attached to the corresponding second corner $362^2$ of the rear cross bar 362.

A fourth spring balancer $508^4$ of the four spring balancers $508^{1+N}$ includes a first end 530 and a second end 532. The first end 530 includes a fourth hook connector $514^4$ which is fixedly attached by way of a fourth bolted face plate $516^4$ to a second corner $342^2$ of the rear joist 342 of the anchorage conveyor frame 336. The second end 532 of the fourth spring balancer $508^4$ includes a fourth carabiner snap clip $518^4$ which is fixedly coupled to a corresponding second corner $362^2$ of the rear cross bar 362 of the anchorage conveyor frame 336 by way of a fourth steel hook pad eye plate $520^3$ fixedly attached to the corresponding second corner $362^2$ of the rear cross bar 362 such that the hood 22 can be balanced in a level posited plane parallel in relation to the of the vacuum table 800, the heating metal table 802, and the core body fusion table 804 and to provide a uniform colloidal matter dipping treatment of the core body 1024.

The hood conveyor apparatus 20 includes two colloidal matter detection probes $534^{1C}$-$534^{2C}$ a first colloidal detection probe $534^{1C}$ and a second colloidal matter detection probe $534^{2C}$. The first colloidal detection probe $534^{1C}$ is disposed on the first lateral facing rim wall 488 of the exterior facing rectangular peripheral rim 470 of the hood 22 and the second colloidal matter detection probe $534^{2C}$ is disposed on the second lateral facing rim wall 490 of the exterior facing rectangular peripheral rim 470 of the hood 22. Each of the first colloidal matter detection probe $534^{1C}$ and the second colloidal matter detection probe $534^{2C}$ extend a downward distance from the each of the first lateral facing rim wall 488 of the exterior facing rectangular peripheral rim 470 and the second lateral facing rim wall 490 of the exterior facing rectangular peripheral rim 470, respectively. With this configuration, wherein when the hood 22 is lowered the first colloidal detection probe $534^{1C}$ and the second colloidal detection probe $534^{2C}$ is configured to come in contact against a top surface of the colloidal matter $87^1$ contained in the metal gel basin 88 of the gel heating metal lift-table 14 such that the foam core body 24 being held by the hood 22 is dip coated within the colloidal matter $87^1$ held in the metal basin metal basin $88^1$ to a predetermined gel thickness to create a hydrophobic colloidal matter barrier $536^{CB}$ over each of the outer peripheral surfaces of the plurality of extended protuberant $1098^{1+N}$ and outlying surfaces of each of the plurality of recessed channels $2004^{1+N}$.

In another embodiment the gel-foam body amalgamation system 10 and a core body amalgamation system 1000 can be integrated with an automation system. The gel-foam body amalgamation system can include a motorized drive means to concomitantly control the horizontal movement of the first trolley 262 and the second trolley 264 along the front I-beam bridge 242 and the third trolley 266 and the fourth trolley 268 along the rear I-beam bridge 244 thereby moving the hood conveyor apparatus 20 carrying the hood 22. In addition, a supplemental motorized drive means would direct the vertical upward and downward movement of each of the four rack and pinion gear systems $444^{1-4}$.

The gel-foam body amalgamation system 10 can be equipped with an automated motorized drive configured within each of the front I-beam bridge and the rear I-beam bridge of the overhead double-beam bridge crane 18 being configured with motion sensors and switches.

Each of the trolley carriages of the four trolleys 262, 264, 266, 268, can be configured with motion sensors which engage complementary resistance features with switches built into each of the front I-beam bridge and the rear I-beam bridge. Each of the trolley carriages can be configured with motion sensors built into each of the radial rollers and side rollers of each of the trolley carriages of the four trolleys 262, 264, 266, 268. In one aspect of the embodiment, this can be accomplished by known means in the art of an automated motorized drive integrated into the anterior track and the posterior track of the front I-beam bridge 242 and the rear-I beam bridge 244 whereby the contact with the set of three anterior radial rollers and the posterior radial rollers are integrated with motion sensors which are oriented to come in contact with switches built into each of the anterior side flat bearing surface 316 and the posterior side flat bearing surface of the rear I-beam track 318 of the front I-beam bridge and the rear I-beam bridge 244. Similarly, each of the anterior side rollers and the posterior side rollers are built with motion sensors which are oriented to come in contact with switches built into the posterior side flat bearing surface 320 of the rear I-beam track 318 of the rear I-beam bridge 244. The concerted movement of each of the four trolleys 262, 264, 266, 268 can be controlled by a single actuator.

Similarly, each of the four rack and pinion gear systems $444^{1-4}$ of the gel-foam body amalgamation system 10 can be configured with the automated motorized gear device built with motion sensors and switches. Sensors can be built into four mateable pinions $444^{1-4}$ which are in communication with switches built into each of the four gear racks gear racks $448^{1-4}$ each of the four gears racks $448^{1-4}$. Each of the motion sensors of the four mateable pinions $444^{1-4}$ of the and pinion gear systems $444^{1-4}$ indicating a level of the vertical upward and downward movement of the four rack and pinion systems $444^{1-4}$ as the four rack and pinion gear systems $444^{1-4}$ lower and lift the hood during the operation of the gel-foam body amalgamation system 10. In this aspect of the embodiment the four rack and pinion gear systems $444^{1-4}$ can be controlled by the single actuator.

In another aspect of the embodiment, a conveyor belt can be integrated among the vacuum-lift table 12, the gel heating metal lift-table 14 and the gel foam fusion lift-table 16, the vacuum table 800; the heating metal table 802; and the core body fusion table 804.

In another embodiment of the gel-foam body amalgamation system 10 and the core body amalgamation system 1000 can be integrated with a smart system and a smart device, a surveillance device. Temperature sensor, motion sensor for horizontal movement and vertical movement of each of the four trolleys, vertical motion sensors for each of the four rack and pinon gear systems, gel detection probe sensors for each of the four motion sensor for presence of object or person near the gel-foam body amalgamation system 10 and the core body amalgamation system 1000, and an identification verification module for the operator of the gel-foam body amalgamation system 10.

In another embodiment of the present invention, a kit 900, is disclosed comprising: a gel-foam body amalgamation system 10, comprising:

the gel foam amalgamation system 10 comprises a vacuum lift-table 12; a gel heating metal lift-table 14; a gel foam fusion lift-table 16; an overhead double-beam bridge crane 18; a variety of metal bolted connectors 908; a variety of bolted face plates 910; a variety of bolted column end plates 912; a variety of bolted I-beam end plates 914; a variety of joist hanger brackets 916; a variety of iron face plates 918; a variety of post mount brackets 912; a hood conveyor apparatus 20; a hood 22; a foam core body 24; an intermediary foam core body 26; a gel extruder 28; gel 87; gel supply well 30; three table covers 32, 34, 36, including a vacuum lift-table cover 32; a gel heating metal lift-table cover 34; and a gel foam fusion lift-table cover 36; a gel subscription for gel recurring delivery 902; a foam core body subscription for recurring foam core body delivery service 920; an intermediary foam core body subscription for recurring intermediary foam core body delivery service 922; a gel-foam body amalgamation system instruction manual 904; Occupational Safety and Health Association ("OSHA") Guidelines Standard Number 1910.269—Electric power generation, transmission, and distribution for a planar heater device 906, available at: 1910.269—Electric power generation, transmission, and distribution. Occupational Safety and Health Administration (osha.gov).

All of the features disclosed, claimed, and incorporated by reference herein, and all of the steps of any method or process so disclosed, may be combined in any combination, except combinations where at least some of such features and/or steps are mutually exclusive. Each feature disclosed in this specification may be omitted or replaced by alternative features serving the same, equivalent or similar purpose, unless expressly stated otherwise. Certain features may sometimes be used to advantage without a corresponding use of other features. Thus, unless expressly stated otherwise, each feature disclosed is an example only of a generic series of equivalent or similar features. Inventive aspects of this disclosure are not restricted to the details of the foregoing embodiments, but rather extend to any novel embodiment, or any novel combination of embodiments, of the features presented in this disclosure, and to any novel embodiment, or any novel combination of embodiments, of the steps of any method or process so disclosed.

Although specific examples have been illustrated and described herein, it will be appreciated by those of ordinary skill in the art that any arrangement calculated to achieve the same purpose could be substituted for the specific examples disclosed. This disclosure is intended to cover adaptations or variations of the present subject matter. Applicants intend to embrace all such alternatives, modifications, equivalents, and variations that are within the spirit and scope of the exemplary embodiments. Therefore, it is intended that the invention be defined by the attached claims and their legal equivalents, as well as the illustrative aspects. The above-described embodiments are merely descriptive of its principles and are not to be considered limiting. Further modifications of the invention herein disclosed will occur to those skilled in the respective arts and all such modifications are deemed to be within the scope of the inventive aspects.

What is claimed is:

1. A gel-foam body amalgamation system, comprising:
   a vacuum lift-table;
   a gel heating metal lift table;
   a gel foam fusion lift table;
   an overhead double-beam bridge crane;
   a hood conveyor apparatus;
   a hood;
   a foam core body;
   an intermediary foam core body;
   a vacuum lift table cover;
   a gel heating metal lift-table cover; and
   a gel foam fusion lift-table cover;
   gel;
   the vacuum lift table, comprising:
   a silicone table structure including a rigid silicone table top, a rigid silicone table bottom, a rigid front facing silicone wall, a rigid rear facing silicone wall, a rigid first silicone side wall, an opposing rigid second silicone side wall, the rigid silicone table top is integrated with a plurality of table perforations extending therethrough the rigid silicone table bottom, wherein the plurality of table perforations symmetrically aligned a distance apart from each other in rows and columns extending the entirety of the rigid silicone table top and therethrough to the rigid silicone bottom;
   four insulated table support columns supporting the rigid silicone table top of the vacuum lift-table, a first front insulated table support column, a second front insulated table support column, a first back insulated table support column, a second back insulated table support column wherein the four insulated table support columns are integrated with a vacuum table hydraulic lift device whereby the vacuum lift-table is lowered and raised being actuated by a lift-table controller wherein an operator can select a customized operator height position of the vacuum lift table;
   the gel heating metal lift table, comprising:
   a metal table structure including a flat metal table top, a flat metal table bottom, a front facing flat metal wall, a rear facing flat metal wall, a first lateral flat metal side wall, an opposing second flat metal lateral side wall, four insulated metal columns supporting the metal table structure, a first front insulated table metal column, a second front insulated table metal column, a first back insulated table metal column, a second back insulated table metal column integrated with a gel heating metal table hydraulic lift device whereby the gel heating metal lift-table is lowered and raised being actuated by a gel heating metal lift-table controller wherein the operator can select the customized operator height position of the gel heating metal lift-table;
   a metal gel basin permanently attached on an upside of the flat metal table top of the gel heating metal lift-table by way of welding wherein the metal gel basin is co-planar with the metal flat table top of the gel heating metal lift table;
   wherein the metal gel basin includes a cavity to contain a predetermined volume of gel incorporated in a gel bath, wherein the metal gel basin is configured with a metal floor bound by four upright perimetric metal walls providing a peripheral top metal rim to the metal gel basin, the four perimetric metal walls including a front facing metal wall, a rear facing metal wall, and two lateral facing metal walls, a first lateral metal side wall and a second lateral metal side wall enclosing the gel in the gel bath wherein the cavity is configured with a cavity opening dimensioned to receive the foam core body;
   wherein the metal gel basin includes a thermally conductive layered core having a copper plate, wherein the copper plate includes a superior side and an inferior side wherein each of the superior side and the inferior side is adhered to at least two layers of MXene such that a copper plate MXene layered core is formed wherein the copper plate MXene layered core is integrally metallurgically bonded intermediate with a first stainless steel plate layer and a second stainless steel plate layer by way of a bonding application to form a multilayered steel copper MXene composite wherein the thermal conductivity is increased by the multilayered steel copper MXene composite;
   wherein the at least two layers of MXene comprises $T_{i3}C_2 T_x$ sheet wherein Ti s a titanium atom, C is a Carbon atom and T is terminal functional atom selected from the group comprising an oxygen atom "O", a hydroxy group "OH", an a flourine atom "F";
   a gel supply pipe inlet port is disposed at a corner portion of the front facing metal wall of the metal gel basin in cooperation with an opening in the metal gel basin capable of receiving a gel supply pipe fluidly connected to a gel supply well in cooperation with a gel extruder to enable a stream of gel to enter the metal gel basin wherein the gel supply pipe facilitates passing of the stream of gel from a front interior facing wall to a rear interior facing wall of the metal gel basin to reach the predetermined volume of gel indicated by a measurement bar etched on a surface of the front interior facing wall and to replenish a reduced gel volume to the predetermined volume of gel wherein control of the flow of the stream of gel therethrough the gel supply pipe is controlled by a valve operationally configured on the gel supply pipe proximate to the gel supply well;

at least one variable frequency drive pump configured to deliver a pressure of 300 horse power, disposed proximate to the flat metal table bottom of the gel heating metal lift-table, the at least one variable frequency drive pump includes at least one in-line pipe running parallel to the flat metal bottom of the gel heating metal lift table, the at least one in-line pipe having a front end and a rear end wherein the front end of the at least one-inlet pipe is fluidly connected to an at least one in-line pipe inlet port centrally disposed within the front facing wall of the metal gel basin wherein the at least one in-line pipe inlet port is fluidly cooperative with the cavity of the metal gel basin and the rear end of the at least one in-line pipe is connected to an at least one in-line pipe outlet port centrally disposed within the rear facing metal wall of the metal gel basin such that a variable frequency pressure is pumped therethrough the at least one in-line pump pipe into the gel bath whereby the predetermined volume of gel is mixed and circulated and recirculated from the front interior facing wall to the rear interior facing wall of the metal gel basin and therethrough the at least one in-line pipe, wherein the at least one variable frequency drive pump is controlled by a variable speed drive controller;

wherein the variable speed drive controller of the at least one variable frequency drive pump includes a control panel with an "ON" operating mode switch and an "OFF" operating mode switch, a pressure switch, a flow switch;

at least one planar heater device including two electrodes being electrically conductive is connected to a power source by way of an electrical conduit wherein the electrical conduit is insulated in a non-electric conductive ultrahigh molecular weight polyethylene tube wherein the at least one planar heater device is mounted externally to an exterior surface of the flat metal table bottom of the gel heating metal lift table by which a controlled temperature is generated to enable by way of thermal conduction of the multilayered steel copper MXene composite of the metal gel basin to heat the gel to a heated liquid gel or to cool the heated liquid gel within the gel bath contained in the metal gel basin whereby the controlled temperature is regulated by a temperature controller operatively electrically connected to the at least one planar heater device;

wherein the at least one planar heater device includes an electric conductive metal plate including a coating wherein the at least one planar heater device is encased in a sheathing;

wherein the coating is a MXene film including a MXene film $T_{i3}C_2$ $T_x$ wherein Ti s a titanium atom, C is a Carbon atom and T is terminal functional atom selected from the group comprising an oxygen atom "O", hydroxy group "OH", and a fluorine atom "F";

wherein the sheathing is made from any one of the materials selected from the group comprising: polyethylene, terephthalate, polyvinyl alcohol, polypropylene, polystyrene, polycarbonate, polyethylene, polyamide, resins and combinations thereof;

the gel foam fusion lift table, comprising:

a table structure including a nonperforated rigid non-slip table top and a nonperforated rigid non-slip table bottom joined by four rigid non-slip walls including a rigid front facing non-slip wall, a rigid rear facing non slip wall, a first rigid non slip side wall and an opposing second rigid non-slip side wall joined at four corners, the table structure of the gel foam fusion table is supported by four insulated table support columns including a first front insulated table support column, a second front insulated table support column, a first back insulated table support column, and a second back insulated table support column wherein the four insulated table support columns are integrated with a gel foam fusion table hydraulic lift device whereby the gel foam fusion lift-table is lowered and raised being actuated by a gel foam fusion lift-table controller wherein the operator can select the customized operator height position of the gel foam fusion lift-table;

the foam core body having a first thickness, a first length, and a first width, a core body square footage, a top core body portion and a bottom core body portion wherein the top core body portion includes a porous top side and the bottom core body portion includes a porous bottom side joined by two lateral porous side walk, a first lateral porous side wall and a second opposing lateral porous side wall and two longitudinal porous side walk, a front longitudinal porous side wall, and a rear longitudinal porous side wall wherein the top core body portion includes a first square footage and the bottom core body portion includes a second square footage wherein the second square footage is equal to the first square footage of the top core portion of the foam core body;

wherein a series of a plurality of extended cubes are carved within the bottom core body portion of the foam core body by way of a contour saw, wherein each of the extended cubes of the series of the plurality of extended cubes are configured in symmetrical alignment a first distance from each other aligned in a plurality of rows and a plurality of columns interconnected by a plurality recessed channels bordered by an adjourned peripheral rim, wherein each of the plurality of extended cubes is configured with a cube thickness which is less than the first thickness of the foam core body;

the intermediary foam core body to be fused with the foam core body to form a dual-core foam body amalgamate, the intermediary foam core body dimensioned with a second length, a second width, a second thickness, an intermediary foam core body square footage, wherein the second length, the second width, the second thickness, the intermediary foam core body square footage is equal to the first thickness, the first length, the first width, and the core body square footage of the foam core body;

the intermediary foam core body includes a flat top facing wall and a flat bottom facing wall including a flat front wall, a flat rear wall, joined by two flat lateral side walk, a first flat lateral side wall and an opposing second flat lateral side wall, wherein the flat top facing wall includes a top porous layer and the flat bottom facing wall includes a bottom porous layer;

the overhead double-beam bridge crane, comprising:

four upright metal box columns, a first upright metal box column, a second upright metal box column, a third upright metal box column, a fourth upright metal box column, a first metal link beam, a second metal link beam, wherein a front end of the first metal link beam is fixedly attached to a top end of the first upright metal box column by way of a first bolted column end plate and a rear end of the first metal link beam is fixedly attached to a top end of the third upright metal box column by way of a second bolted column end plate, wherein the front end of the second metal link beam is fixedly attached to a top end of the second upright metal box column by way of a third bolted column end plate and a rear end of the second metal link beam is fixedly attached to a top end of the fourth upright metal box column by way of a fourth bolted column end plate;

two I-beam bridges including a front I-beam bridge and a rear I-beam bridge positioned a predetermined distance apart and parallel to each other fixedly attached oriented oligomeric to the first metal link beam and the second metal link beam;

a first end of the front I-beam bridge is fixedly attached by way of a first bolted I-beam end plate to a first trolley end stop disposed at the front end of the first metal link beam and an opposing second end of the front I-beam bridge is fixedly attached to a second trolley end stop disposed at a front end of the second metal link beam by way of a second bolted I-beam end plate, a first end of the rear I-beam bridge is fixedly attached to a third trolley end stop disposed at a rear end of the first metal link beam by way of a third bolted I-beam end plate and an opposing second end of the rear I-beam bridge is fixedly connected to a fourth trolley end stop disposed at the rear end of the second metal link beam by way of a fourth I-beam end plate whereby a major framed open space is circumscribed to abide the vacuum lift-table, the gel heating metal lift-table, the gel foam fusion lift-table and the hood being supported by the hood conveyor frame;

four trolleys, a first trolley, a second trolley, a third trolley, a fourth trolley, wherein the first trolley is operationally coupled to the front I-beam bridge by way of a first trolley carriage and the second trolley is operationally coupled to the front I-beam bridge by way of a second trolley carriage, the third trolley operationally coupled to the rear I-beam bridge by way of a third trolley carriage and the fourth trolley operationally coupled to the rear I-beam bridge by way of a fourth trolley carriage;

wherein the first trolley carriage of the first trolley is configured with a first set of at least six radial rollers and a first set of at least four side rollers, the second trolley carriage is configured with a second set of at least six radial rollers and a second set of at least four side rollers to operationally couple each of the first trolley and the second trolley to the front I-beam bridge, respectively, and whereby the first trolley and the second trolley are each moveably operational along a length of the front I-beam bridge by way of each of the six radial rollers and each of the four side rollers operationally coupled to the first trolley carriage and the second trolley carriage, respectively;

wherein the first set of at least six radial rollers of the first trolley carriage of the first trolley includes a series of three anterior radial rollers which is coplanar with a series of three posterior radial rollers wherein the set of three anterior radial rollers of the first trolley carriage of the first trolley are oriented to come in contact with an anterior side flat bearing surface of a front I-beam track of the front I-beam bridge and the three posterior radial rollers of the first trolley carriage of the first trolley are oriented to come in contact with a posterior side flat bearing surface of a rear I-beam track of the front I-beam bridge;

wherein the first set of the at least four side rollers of the first trolley carriage of the first trolley includes two anterior side rollers which are coplanar with two posterior side rollers, wherein the two anterior side rollers includes a first anterior side roller colinear with a second anterior side roller wherein the first anterior side roller is operationally attached at a first anterior cut-out lead portion of the first trolley carriage and the second anterior side roller is operationally attached at an opposing second anterior cut-out lead portion of the first trolley carriage of the first trolley, the opposing second anterior cut-out lead portion of the first trolley carriage being configured at a first lateral distance from the first anterior cut-out lead portion of the first trolley carriage, wherein the first anterior side roller and the second anterior side roller is oriented to come in line contact with an anterior side perpendicular bearing wall of the front I-beam bridge;

wherein the two posterior side rollers includes a first posterior side roller and a second posterior side roller wherein the first posterior side roller is operationally attached at a first posterior cut-out lead portion of the first trolley carriage and the second posterior side roller is operationally attached at an opposing second posterior cut out lead portion of the first trolley carriage, the opposing second posterior cut-out lead portion being configured at a second lateral distance from the first posterior cut-out lead portion of the first trolley carriage of the first trolley, the second lateral distance is equal to the first lateral distance, wherein the first posterior side roller and the second posterior side roller are each oriented to come in line contact with a posterior side perpendicular bearing wall of the front I-beam bridge, wherein when the two anterior side rollers and the two posterior side rollers of the first trolley carriage of the first trolley concomitantly come in contact against the anterior side perpendicular bearing wall and the posterior side perpendicular bearing wall of the front I-beam bridge, respectively, the first trolley carriage of the first trolley is movably constrained to enable a steady horizontal movement of the first trolley carriage of the first trolley along the front I-beam bridge moving in either direction towards the first trolley end stop or towards the second trolley end stop;

wherein the second set of the at least six radial rollers of the second trolley carriage of the second trolley includes a series of three anterior radial rollers of the second trolley carriage of the second trolley which is coplanar with a second series of three posterior radial rollers of the second trolley carriage of the second trolley wherein the series of three anterior radial rollers of the second trolley carriage of the second trolley are oriented to come in contact with the anterior side flat bearing surface of the front I-beam track of the front I-beam bridge and the three posterior radial rollers of the second trolley carriage of the second trolley are oriented to come in contact with the posterior side flat bearing surface of the rear I-beam track of the front I-beam bridge;

wherein the second set of the at least four side rollers of the second trolley carriage of the second trolley includes two anterior side rollers of the second trolley carriage of the second trolley which are coplanar with two posterior side rollers of the second trolley carriage of the second trolley, wherein the two anterior side rollers of the second trolley carriage of the second trolley includes a first anterior side roller of the second trolley carriage of the second trolley colinear with a second anterior side roller of the second trolley carriage of the second trolley wherein the first anterior side roller of the second trolley carriage of the second trolley is operationally attached at a first anterior cut out lead portion of the second trolley carriage of the second trolley and the second anterior side roller of the second trolley carriage is operationally attached at an opposing second anterior cut-out lead portion of the second trolley carriage of the second trolley, the opposing second anterior cut-out lead portion of the second trolley carriage being configured at a third lateral distance from the first anterior cut out lead portion of the second trolley carriage of the second trolley, the third lateral distance equal to the first lateral distance, wherein the first anterior side roller and the second anterior side roller of the second trolley carriage of the second trolley is oriented to come in line contact with the anterior side perpendicular bearing wall of the front I-beam bridge, wherein the two posterior side rollers of the second trolley carriage of the second trolley includes a first posterior side roller and a second posterior side roller wherein the first posterior side roller of the second trolley carriage of the second trolley is operationally attached at a first posterior cut-out lead portion of the second trolley carriage of the second trolley and the second posterior side roper is operationally attached at an opposing second posterior cut-out lead portion of the second trolley carriage of the second trolley, the opposing second posterior cut-out lead portion being configured a fourth lateral distance from the first posterior cut-out lead portion of the second trolley carriage of the second trolley, the fourth lateral distance equal to the third lateral distance, wherein the first posterior side roller and the second posterior side roller of the second trolley carriage of the second trolley are each oriented to come in line contact with the posterior side perpendicular bearing wall of the front I-beam bridge, wherein when the two anterior side rollers of the second trolley carriage of the second trolley and the two posterior side rollers of the second trolley carriage of the second trolley concomitantly come in contact against the anterior side wall and the posterior side wall of the front I-beam bridge, respectively, the second trolley carriage of the second trolley is movably constrained to enable a steady horizontal movement of the second trolley carriage of the second trolley along the front I-beam bridge moving in either direction towards the third trolley end stop or toward the fourth trolley end stop;

wherein each of the third trolley carriage of the third trolley and the fourth trolley carriage of the fourth trolley is configured with a third set of at least six radial rollers, a third set of at least four side rollers and a fourth set of at least six radial rollers, a fourth set of at least four side rollers, to operationally couple each of the third trolley and the fourth trolley to the rear I-beam bridge, respectively, and whereby the third trolley and the fourth trolley are each moveably operational along a length of the rear I-beam bridge by way of the six radial rollers and the four side rollers fixedly attached to the third trolley carriage and the fourth trolley carriage, respectively;

wherein the third set of the at least six radial rollers of the third trolley carriage of the third trolley includes a series of three anterior radial rollers which is coplanar with a series of three posterior radial rollers wherein the three anterior radial rollers of the third trolley carriage are oriented to come in contact with an anterior side flat bearing surface of a rear I-beam track of the rear I-beam bridge and the three posterior radial rollers are oriented to come in contact with a posterior side flat bearing surface of the rear I-beam track of the rear I-beam bridge;

wherein the third set of the at least four side rollers of the third trolley carriage of the third trolley includes two anterior side rollers which are coplanar with two posterior side rollers, wherein the two anterior side rollers includes a first anterior side roller colinear with a second anterior side roller wherein the first anterior side roller is positioned at a first anterior cut-out lead portion of the third trolley carriage of the third trolley and the second anterior side roller is positioned at an opposing second anterior cut-out lead portion of the third trolley carriage of the third trolley, the opposing second anterior cut-out lead portion being configured a fifth lateral distance from the first anterior cut-out lead portion, the fifth lateral distance equal to the first lateral distance, wherein the first side anterior roller and the second anterior side roller of the third trolley carriage of the third trolley is oriented to come in line contact with an anterior side perpendicular bearing wall of the rear I-beam bridge, wherein the second set of two posterior side rollers includes a first posterior side roller and a second posterior side roller of the third trolley carriage of the third trolley wherein the first posterior side roller is positioned at a first posterior cut-out lead portion of the third trolley carriage of the third trolley and the second posterior side roller is positioned at an opposing second posterior cut-out lead portion of the third trolley carriage of the third trolley, the opposing second posterior cut-out lead portion being configured a sixth lateral distance from the first posterior cut-out lead portion of the third trolley carriage of the third trolley, the sixth lateral distance equal to the fifth lateral distance, wherein the first posterior side roller and the second posterior side roller are each oriented to come in line contact with a posterior side perpendicular bearing wall of the rear I-beam bridge, wherein when the two anterior side rollers and the two posterior side rollers of the third trolley carriage of the third trolley concomitantly come in contact against the anterior side perpendicular bearing wall and the posterior side perpendicular bearing wall of the rear I-beam bridge, respectively, the third trolley carriage of the third trolley is movably constrained to enable a steady horizontal movement of the third trolley carriage of the third trolley along the rear I-beam bridge moving in either direction towards the third trolley end stop or towards the fourth trolley end stop;

wherein the at least six radial rollers of the fourth trolley carriage of the fourth trolley includes a series of three anterior radial rollers which is coplanar with a series of three posterior radial rollers wherein the set of three anterior radial rollers are oriented to come in contact with the anterior side flat bearing surface of the rear I-beam track of the rear I-beam bridge and the three posterior radial rollers are oriented to come in contact with the posterior side flat bearing surface of the rear I-beam track of the rear I-beam bridge;

wherein the at least of four side rollers of the fourth trolley carriage of the fourth trolley includes two anterior side rollers which are coplanar with two posterior side rollers, wherein the two anterior side rollers includes a first anterior side roller colinear with a second anterior side roller of the fourth trolley carriage of the fourth trolley wherein the first anterior side roller is positioned at a first anterior cut-out lead portion of the fourth trolley carriage of the fourth trolley and the second anterior side roller is positioned at an opposing second anterior cut-out lead portion of the fourth trolley carriage of the fourth trolley, the opposing second anterior cut-out lead portion being configured a seventh lateral distance from the first anterior cut-out lead portion, the seventh lateral distance equal to the sixth lateral distance, wherein the first side anterior roller and the second anterior side roller of the fourth trolley carriage of the fourth trolley is oriented to come in line contact with the anterior side perpendicular bearing wall of the rear I-beam bridge, wherein the two posterior side rollers includes a first posterior side roller and a second posterior side roller of the fourth trolley carriage of the fourth trolley wherein the first posterior side roller is positioned at a first posterior cut-out lead portion of the fourth trolley carriage of the fourth trolley and the second posterior side roller is positioned at an opposing second posterior cut-out lead portion of the fourth trolley carriage of the fourth trolley, the opposing second posterior cut-out lead portion being configured an eighth lateral distance from the first posterior cut-out lead portion side roller at an opposing second posterior lead portion of the fourth trolley carriage of the fourth trolley, the eighth lateral distance equal to the seventh lateral distance, wherein the first posterior side roller and the second posterior side roller are each oriented to come in line contact with a posterior side perpendicular bearing wall of the rear I-beam bridge, wherein when the two anterior side rollers and the two posterior side rollers of the fourth trolley carriage of the fourth trolley concomitantly come in contact against the anterior side perpendicular bearing wall and the posterior side perpendicular bearing wall of the rear I-beam bridge, respectively, whereby the fourth trolley carriage of the fourth trolley is moveably constrained to enable a steady horizontal movement of the fourth trolley carriage of the fourth trolley along the rear I-beam bridge moving in either direction towards the third trolley end stop or towards the fourth trolley end stop;

the hood conveyor frame to support the hood, comprising:

an upper conveyor frame and a lower conveyor frame coplanar to each other fixedly joined to an anchorage conveyor frame wherein the anchorage conveyor frame is configured having a rectangular shaped structure being disposed in a transverse plane between the upper conveyor frame and the lower conveyor frame whereby a minor framed open space is circumscribed within the major framed open space to abide for the hood conveyor apparatus;

wherein the anchorage conveyor frame includes a front joist and a rear joist, a first lateral side joist, an opposing second lateral side joist, a front cross bar, a rear cross bar, and four lifting masts vertically oriented wherein the front joist and the rear joist are each fixedly attached to the first lateral side joist and the opposing second lateral side joist by way of four joist hanger brackets whereby four corners of the anchorage conveyor frame are formed;

a first lifting mast includes a superior end and an inferior end wherein the superior end of the first lifting mast is fixedly bolted to a first joist end of the front joist of the anchorage conveyor frame by way of a first joist hanger bracket and the inferior end of the first lifting mast is fixedly bolted to a first end of the front cross bar by way of a first iron face plate;

a second lifting mast includes a superior end and an inferior end wherein the superior end of the second lifting mast is fixedly bolted to a second end of the front joist of the anchorage conveyor frame by way of a second joist hanger bracket and the inferior end of the second lifting mast is fixedly bolted to a second end of the front cross bar by way of a second iron face plate;

a third lifting mast includes a superior end and an inferior end wherein the superior end of the third lifting mast is fixedly bolted to a first end of the rear joist of the anchorage conveyor frame by way of a third joist hanger bracket and the inferior end of the third lifting mast is fixedly bolted to a first end of the rear cross bar of the anchorage conveyor frame by way of a third iron face plate;

a fourth lifting mast includes a superior end and an inferior end wherein the superior end of the fourth lifting mast is fixedly bolted to a second end of the rear joist of the anchorage conveyor frame by way of a fourth joist hanger bracket and the inferior end of the fourth lifting mast is fixedly bolted to a second end of the rear cross bar of the anchorage conveyor frame by way of a fourth iron face plate;

the upper conveyor frame includes four overhead metal posts which are vertically oriented, including a first overhead metal post, a second overhead metal post, a third overhead metal post, a fourth overhead metal post;

wherein the first overhead metal post is positioned coaxial to the first lifting mast of the anchorage conveyor frame, wherein a first end of the first overhead metal post is fixedly bolted to the first trolley by way of a first trolley adapter connector and a second end of the first overhead metal post is fixedly bolted to a first end portion of the front joist of the anchorage conveyor frame by way of a first post mount bracket;

wherein the second overhead metal post is positioned coaxial to the second lifting mast of the anchorage conveyor frame, wherein a first end of the second overhead metal post is fixedly bolted to the second trolley by way of a second trolley adapter connector and second end of the second overhead metal post is fixedly bolted to a second end portion of the front joist of the anchorage conveyor frame by way of a second post mount bracket;

wherein the third overhead metal post is positioned coaxial to the third lifting mast of the anchorage conveyor frame, wherein a first end of the third overhead metal post is fixedly bolted to the third trolley by way of a third trolley adapter connector and a second end of the third overhead metal post is fixedly bolted to a first end portion of the rear joist of the anchorage conveyor frame by way of a third post mount bracket;

wherein the fourth overhead metal post is positioned coaxial to the fourth lifting mast of the anchorage conveyor frame, wherein a first end of the fourth overhead metal post is fixedly bolted to the fourth trolley by way of a fourth trolley adapter connector and a second end of the fourth overhead metal post is fixedly bolted to a second end portion of the rear joist of the anchorage conveyor frame by way of a fourth post mount bracket;

the lower conveyor frame including four lower support posts, being vertically oriented;
  a first lower support post, a second lower support post, a third lower support post, a fourth lower support post;
wherein the first lower support post is positioned coaxial with the first lifting mast wherein a first end of the first lower support post is fixedly attached to the first end of the front cross bar of the anchorage conveyor frame by way of the first iron face plate and a second end of the first lower support post is fixedly attached to a first corner portion of a front facing rim wall of the hood by way of a first iron mounting plate;
wherein the second lower support post is positioned coaxial with the second lifting mast wherein a first end of the second lower support post is fixedly attached to the second end of the front cross bar of the anchorage conveyor frame by way of the second iron face plate and a second end of the first lower support post is fixedly attached to a second corner portion of the front facing rim wall of the hood by way of a second iron mounting plate;
wherein the third lower support post is positioned coaxial with the third lifting mast wherein a first end of the third lower support post is fixedly attached to the first end of the rear cross bar of the anchorage conveyor frame by way of the third iron face plate and a second end of the third lower support post is fixedly attached to a first corner portion of a rear facing rim wall of the hood by way of a third iron mounting plate;
wherein the fourth lower support post is positioned coaxial with the fourth lifting mast wherein a first end of the fourth lower support post is fixedly attached to the second end of the rear cross bar of the anchorage conveyor frame by way of the second iron face plate and a second end of the fourth lower support post is fixedly attached to the second corner portion of the rear facing rim wall of the hood by way of a fourth iron mounting plate;
a first spring loaded handle is pivotally attached to the front cross bar of the anchorage conveyor frame and a second spring loaded handle is pivotally attached to the rear cross bar of the anchorage conveyor whereby the first spring loaded handle and the second spring loaded handle is maneuvered to operationally raise and lower the hood in a vertical direction and to urge the hood in a horizontal direction along each of the front I-beam bridge and the rear I-beam bridge;
wherein each of the first lower support post, the second lower support post, the third lower support post, the fourth lower support post is integrated with a rack and pinion gear system including a first rack and pinion gear system, a second rack and pinion gear system, a third rack and pinion gear system, a fourth rack and pinion gear system, respectively;
wherein each of the rack and pinion gear systems include, a lift carriage, a gear rack mechanically operative with a mateable pinion, mechanically operatively connected to a first lateral axle and a second lateral axle;

wherein each of the lift carriages includes a gear rack which is vertically oriented and centered between a first linear guide and a second linear guide of the lift carriage, each of the gear rack having an upward end and a downward end with a plurality of gear rack teeth therebetween;
wherein each of the mateable pinions is configured with a plurality of pinion teeth circumferentially aligned around a pinion crown to enable an operable rotatable mesh between each of a corresponding plurality of gear rack teeth of each of the gear racks of each of the first rack and pinion gear system, a second rack and pinion gear system, a third rack and pinion gear system, a fourth rack and pinion gear system, each of the mateable pinions include a pinion borehole transversely configured therethrough each of the pinon crowns;
wherein the first lateral axle is positioned a first vertical below and parallel to the first lateral side joist of the anchorage conveyor frame and the second lateral axle is positioned a second vertical distance below and parallel to the opposing second lateral side joist of the anchorage conveyor frame wherein the second distance is equal to the first distance;
wherein a first end of the first lateral axle is rotationally coupled to a first pinion borehole of a first mateable pinion of a first gear rack of the first rack and pinion gear system integrated with the first lower support post and a second end of the first lateral axle is rotationally coupled to a third pinion borehole of a third gear rack of the third rack and pinion gear system integrated with the third lower support post, and a first end of the second lateral axle is rotationally coupled to a second pinion borehole of a second mateable pinion of a second gear rack of the second rack and pinion gear system integrated with the second lower support post and a second end of the second lateral axle is rotationally coupled to a fourth pinion borehole of a fourth mateable pinion of a fourth gear rack of the fourth rack and pinion gear system integrated with the fourth lower support post such that as the hood is lowered and raised the first lateral axle and the second lateral axle synchronously causes the first mateable pinion and the third mateable pinion, the second matealbe pinion and the fourth mateable pinion to rotate in unison enabling the operable rotatable mesh between each of a first plurality of pinion teeth of a first mateable pinion and a first plurality of gear rack teeth of the first gear rack of the first rack and gear system, a second plurality of pinion teeth of a second mateable pinion and a second plurality of gear rack teeth of a second gear rack of the second rack and pinion gear system, a third plurality of pinion teeth of a third mateable pinion and a third plurality of gear rack teeth of a third gear rack of the third rack and pinion gear system, a fourth plurality of pinion teeth of a fourth mateable pinion and a fourth plurality of gear rack teeth of a fourth gear rack of the fourth rack and pinion gear system, in a vertical direction from each of the gear racks downward ends to their upward ends or from each of the gears racks upward end to their downward end;
the hood, comprising:
a metal rectangular pyramid structure including four cohesive triangular metal panels being integrally welded together forming an apex and a rectangular base configured with a top opening at the apex having a circumferential cross section and a bottom opening integrated within the rectangular base having a rectangular cross section wherein the bottom opening having an exterior facing peripheral rim having four sides, the front facing rim wall, the rear facing rim wall, a first lateral facing rim wall, a second lateral facing rim wall;

a perforated lift and place framework is integrated within the bottom opening of the hood bounded by the exterior facing peripheral rim dimensioned with a framework surface area of at least 84 inches×76 inches;

wherein the perforated lift and place framework is configured with a plurality of hood perforations symmetrically aligned a distance apart from each other in rows and columns extending the entirety of the perforated lift and place framework;

wherein the circumferential top opening of the hood is fluidly connected to a hood conduit which is fluidly connected to a vacuum generator motor configured with 1500 cubic feet per minute wherein the vacuum generator motor provides a predetermined force of air flow in fluid communication with each of the plurality of hood perforations of the perforated lift and place framework configured to generate a predetermined vacuum pull therethrough each of the plurality of hood perforations of the perforated lift and place framework, the vacuum generator motor is operationally connected to an "ON"/"OFF" operation switch, wherein the predetermined vacuum pull is purged therethrough each of the plurality of hood perforations of the perforated lift and place framework when the vacuum motor in an "ON" operation mode, and the predetermined vacuum pull is ceased when the vacuum motor is in an "OFF" operation mode to enable a lift and place operation of the foam core body;

four spring balancers to maintain a stable position of the hood wherein each of the four spring balancers is configured with a drum, a steel wire rope having a travel distance of 1.5 meters, and a pull weight of 15-25 kg capacity range;

wherein a first spring balancer includes a first end and a second end wherein the first end includes a first hook connector which is fixedly attached by way of a first bolted face plate to a first corner of the front joist of the anchorage conveyor frame and the second end of the first spring balancer includes a first carabiner snap clip which is fixedly coupled to a corresponding first corner of the front cross bar of the anchorage conveyor frame by way of a first steel hook pad eye plate fixedly attached to the corresponding first corner of the front cross bar;

wherein a second spring balancer includes a first end and a second end wherein the first end includes a second hook connector which is fixedly attached by way of a second bolted face plate to a second corner of the front joist of the anchorage conveyor frame and the second end of the second spring balancer includes a second carabiner snap clip which is fixedly coupled to a corresponding second corner of the front cross bar of the anchorage conveyor frame by way of a second steel hook pad eye plate fixedly attached to the corresponding second corner of the front cross bar;

wherein a third spring balancer includes a first end and a second end wherein the first end includes a third hook connector which is fixedly attached by way of a third bolted face plate to a first corner of the rear joist of the anchorage conveyor frame and the second end of the third spring balancer includes a third carabiner snap clip which is fixedly coupled to a corresponding first corner f the rear cross bar of the anchorage conveyor frame by way of a third steel hook pad eye plate fixedly attached to the corresponding second corner of the rear cross bar;

wherein a fourth spring balancer includes a first end and a second end wherein the first end includes a fourth hook connector which is fixedly attached by way of a fourth bolted face plate to a second corner of the rear joist of the anchorage conveyor frame and the second end of the third spring balancer includes a fourth carabiner snap clip which is fixedly coupled to a corresponding second corner of the rear cross bar of the anchorage conveyor frame by way of a fourth steel hook pad eye plate fixedly attached to the corresponding second corner of the rear cross bar such that the hood can be balanced in a level posited plane parallel in relation to each of top surfaces of the vacuum lift table, the gel heating metal lift-table, and the gel foam fusion lift-table and to provide a uniform gel dipping treatment of the foam core body;

four gel detection probes, a first gel detection probe, a second gel detection probe, a third gel detection probe, and a fourth gel detection probe, the first gel detection probe disposed on a front edge of the first lateral facing rim wall of the exterior facing rectangular peripheral rim of the hood, the second gel detection probe disposed on the second lateral facing rim wall of the exterior facing rectangular peripheral rim of the hood, the third gel detection probe disposed on a rear end of the first lateral facing rim wall of the exterior facing rectangular peripheral rim of the hood, and the fourth gel detection probe disposed on a rear end of the second lateral facing rim wall of the exterior facing rectangular peripheral rim of the hood wherein when the hood is lowered the first gel detection probe, the second gel detection probe, the third gel detection probe, and the fourth gel detection probe is configured to come in concomitantly contact against a top surface of the gel contained in the metal gel basin of the gel heating metal lift-table such that the foam core body being held by the hood is dip coated within the gel held in the gel bath to a predetermined gel thickness to create a hydrophobic gel barrier over each of the outer peripheral surfaces of the extended cubes of the series of plurality of extended cubes and outlying surfaces of each of the plurality of recessed channels; and the vacuum lift table cover, the gel heating metal lift-table cover, and the gel foam fusion lift table cover wherein each of the vacuum-lift table cover and the gel foam fusion lift-table is manufactured with a five layer polyvinyl sheet having a non-slip top surface and a non-slip bottom surface configured to self-seal to each of the entirety of each of the top table surfaces of the vacuum lift-table and the gel foam fusion lift-table, and wherein the gel heating metal lift-table cover is manufactured with a polytetrafluoroethylene coated fiberglass fabric sheet disposed intermediate to a top five layer polyvinyl sheet and a bottom five layer polyvinyl sheet configured to self-seal onto the peripheral top metal rim of the metal gel basin of the gel heating metal lift-table.

2. The gel foam body amalgamation system of claim 1, wherein each of the four insulated table support columns of the vacuum lift-table, the four insulated metal columns of the gel heating metal lift-table, and the four insulated table support columns of the gel foam fusion lift-table are insulated with any of the materials selected from the group comprising, rubber, silicone, thermoplastic, thermoset polyester composite.

3. The gel-foam body amalgamation system of claim 1, wherein the gel heating metal lift-table and the metal gel basin is manufactured with any one of the metals selected from the group comprising, stainless steel, copper, iron, cast iron, or any combination thereof.

4. The gel-foam body amalgamation system of claim 1, wherein the hood perforations are configured in a shape selected from any one of geometric shapes including, circles, squares, triangles, diamond, cone.

5. The gel-foam body amalgamation system of claim 1, wherein the rigid silicone table top of the vacuum lift-table further includes a variety of size markers indicated in colored lines, wherein the variety of size markers includes King, Queen, Double, and Twin.

6. The gel-foam body amalgamation system of claim 1, wherein the variety of size markers can include any geometric shape and size to embody a size of a sofa cushion, a chair cushion, a pillow, a cushion.

7. A core body amalgamation system, comprising:
a vacuum table;
a heating metal table;
a core body fusion table;
an overhead double-beam bridge crane;
a hood conveyor apparatus;
a hood;
the vacuum table, comprising:
  a silicone table structure including a rigid silicone table top, a rigid silicone table bottom, a rigid front facing silicone wall, a rigid rear facing silicone wall, a rigid first silicone side wall, an opposing rigid second silicone side wall, the rigid silicone table top is integrated with a plurality of table perforations extending therethrough the rigid silicone table bottom, wherein the plurality of table perforations symmetrically aligned a distance apart from each other in rows and columns extending the entirety of the rigid silicone table top and therethrough to the rigid silicone bottom;
  four insulated table support columns supporting the rigid silicone table top, a first front insulated table support column, a second front insulated table support column, a first back insulated table support column, a second back insulated table support column;
the heating metal table, comprising:
  a metal table structure including a flat metal table top, a flat metal table bottom, a front facing flat metal wall, a rear facing flat metal wall, a first lateral flat metal side wall, an opposing second flat metal lateral side wall, four insulated metal columns supporting the metal table structure, a first front insulated table metal column, a second front insulated table metal column, a first back insulated table metal column, a second back insulated table metal column;
a metal basin is permanently attached on an upside of the flat metal table top of the heating metal table by way of welding wherein the metal basin is co-planar with the metal flat table top of the heating metal table;
the metal basin includes a cavity wherein the metal basin is configured with a metal floor bound by four upright perimetric metal walls providing a peripheral top metal rim to the metal basin, the four perimetric metal walls including a front facing metal wall, a rear facing metal wall, and two lateral facing metal walls, a first lateral metal side wall and a second lateral metal side wall;
a supply pipe inlet port is disposed at a corner portion of the front facing metal wall of the metal basin in cooperation with an opening in the metal basin capable of receiving a supply pipe fluidly connected to a supply well in cooperation with an extruder to enable a stream of a colloidal matter to enter the metal basin wherein control of the flow of the stream of the colloidal matter therethrough the gel supply pipe is controlled by a valve operationally configured on the supply pipe proximate to the supply well;
at least one variable frequency drive pump configured to deliver a pressure of horse power disposed proximate to the flat metal table bottom of the heating metal table;
  the at least one variable frequency drive pump includes
    at least one in-line pipe running parallel to the flat metal bottom of the heating metal table, the at least one in-line pipe having a front end and a rear end wherein the front end of the at least one-inlet pipe is fluidly connected to an at least one in-line pipe inlet port centrally disposed within the front facing wall of the metal basin wherein the at least one in-line pipe inlet port is fluidly cooperative with the cavity of the metal basin and the rear end of the at least one in-line pipe is connected to an at least one in-line pipe outlet port centrally disposed within the rear facing metal wall of the metal basin such that a variable frequency pressure is pumped therethrough the at least one in-line pump pipe into the metal basin whereby the colloidal matter is mixed and circulated and recirculated wherein the at least one variable frequency drive pump is controlled by a variable speed drive controller;
wherein the variable speed drive controller of the at least one variable frequency drive pump includes a control panel with an "ON" operating mode switch and an "OFF" operating mode switch, a pressure switch, a flow switch;
at least one planar heater device including two electrodes being electrically conductive is connected to a power source by way of an electrical conduit wherein the electrical conduit is insulated in a non-electric conductive ultrahigh molecular weight polyethylene tube wherein the at least one planar heater device is mounted externally to an exterior surface of the flat metal table bottom of the heating metal table by which a controlled temperature is generated to heat the colloidal matter to a heated liquid state or to cool the heated liquid colloidal matter whereby the controlled temperature is regulated by a temperature controller operatively electrically connected to the at least one planar heater device;
the core body fusion table, comprising:
a table structure including a nonperforated rigid non-slip table top and a nonperforated rigid non-slip table bottom joined by four rigid non-slip walls including a rigid front facing non-slip wall, a rigid rear facing non slip wall, a first rigid non slip side wall and an opposing second rigid non-slip side wall joined at four corners, the table structure is supported by four insulated table support columns including a first front insulated table support column, a second front insulated table support column, a first back insulated table support column, and a second back insulated table support column;
the overhead double-beam bridge crane, comprising:
four upright metal box columns, a first upright metal box column, a second upright metal box column, a third upright metal box column, a fourth upright metal box column, a first metal link beam, a second metal link beam, wherein a front end of the first metal link beam is fixedly attached to a top end of the first upright metal box column by way of a first bolted column end plate and a rear end of the first metal link beam is fixedly attached to a top end of the third upright metal box column by way of a second bolted column end plate, wherein the front end of the second metal link beam is fixedly attached to a top end of the second upright metal box column by way of a third bolted column end plate and a rear end of the second metal link beam is fixedly attached to a top end of the fourth upright metal box column by way of a fourth bolted column end plate;

two I-beam bridges including a front I-beam bridge and a rear I-beam bridge positioned a predetermined distance apart and parallel to each other fixedly attached oriented oligomeric to the first metal link beam and the second metal link beam;

a first end of the front I-beam bridge is fixedly attached by way of a first bolted I-beam end plate to a first trolley end stop disposed at the front end of the first metal link beam and an opposing second end of the front I-beam bridge is fixedly attached to a second trolley end stop disposed at a front end of the second metal link beam by way of a second bolted I-beam end plate, a first end of the rear I-beam bridge is fixedly attached to a third trolley end stop disposed at a rear end of the first metal link beam by way of a third bolted I-beam end plate and an opposing second end of the rear I-beam bridge is fixedly connected to a fourth trolley end stop disposed at the rear end of the second metal link beam by way of a fourth I-beam end plate whereby a major framed open space is circumscribed to abide the vacuum table, the heating metal table, the core body fusion table and the hood being supported by the hood conveyor frame;

four trolleys, a first trolley, a second trolley, a third trolley, a fourth trolley, wherein the first trolley is operationally coupled to the front I-beam bridge by way of a first trolley carriage and the second trolley is operationally coupled to the front I-beam bridge by way of a second trolley carriage, the third trolley operationally coupled to the rear I-beam bridge by way of a third trolley carriage and the fourth trolley operationally coupled to the rear I-beam bridge by way of a fourth trolley carriage;

wherein the first trolley carriage of the first trolley is configured with a first set of at least six radial rollers and a first set of at least four side rollers, the second trolley carriage is configured with a second set of at least six radial rollers and a second set of at least four side rollers to operationally couple each of the first trolley and the second trolley to the front I-beam bridge, respectively, and whereby the first trolley and the second trolley are each moveably operational along a length of the front I-beam bridge by way of each of the six radial rollers and each of the four side rollers operationally coupled to the first trolley carriage and the second trolley carriage, respectively;

wherein the first set of at least six radial rollers of the first trolley carriage of the first trolley includes a series of three anterior radial rollers which is coplanar with a series of three posterior radial rollers wherein the set of three anterior radial rollers of the first trolley carriage of the first trolley are oriented to come in contact with an anterior side flat bearing surface of a front I-beam track of the front I-beam bridge and the three posterior radial rollers of the first trolley carriage of the first trolley are oriented to come in contact with a posterior side flat bearing surface of a rear I-beam track of the front I-beam bridge;

wherein each of the third trolley carriage of the third trolley and the fourth trolley carriage of the fourth trolley is configured with a third set of at least six radial rollers, a third set of at least four side rollers and a fourth set of at least six radial rollers, a fourth set of at least four side rollers, to operationally couple each of the third trolley and the fourth trolley to the rear I-beam bridge, respectively, and whereby the third trolley and the fourth trolley are each moveably operational along a length of the rear I-beam bridge by way of the six radial rollers and the four side rollers fixedly attached to the third trolley carriage and the fourth trolley carriage, respectively;

the hood conveyor frame to support the hood, comprising:
an upper conveyor frame and a lower conveyor frame coplanar to each other fixedly joined to an anchorage conveyor frame wherein the anchorage conveyor frame is configured having a rectangular shaped structure being disposed in a transverse plane between the upper conveyor frame and the lower conveyor frame whereby a minor framed open space is circumscribed within the major framed open space to abide for the hood conveyor apparatus;

wherein the anchorage conveyor frame includes a front joist and a rear joist, a first lateral side joist, an opposing second lateral side joist, a front cross bar, a rear cross bar, and four lifting masts vertically oriented wherein the front joist and the rear joist are each fixedly attached to the first lateral side joist and the opposing second lateral side joist by way of four joist hanger brackets whereby four corners of the anchorage conveyor frame are formed;

a first lifting mast includes a superior end and an inferior end wherein the superior end of the first lifting mast is fixedly bolted to a first joist end of the front joist of the anchorage conveyor frame by way of a first joist hanger bracket and the inferior end of the first lifting mast is fixedly bolted to a first end of the front cross bar by way of a first iron face plate;

a second lifting mast includes a superior end and an inferior end wherein the superior end of the second lifting mast is fixedly bolted to a second end of the front joist of the anchorage conveyor frame by way of a second joist hanger bracket and the inferior end of the second lifting mast is fixedly bolted to a second end of the front cross bar by way of a second iron face plate;

a third lifting mast includes a superior end and an inferior end wherein the superior end of the third lifting mast is fixedly bolted to a first end of the rear joist of the anchorage conveyor frame by way of a third joist hanger bracket and the inferior end of the third lifting mast is fixedly bolted to a first end of the rear cross bar of the anchorage conveyor frame by way of a third iron face plate;

a fourth lifting mast includes a superior end and an inferior end wherein the superior end of the fourth lifting mast is fixedly bolted to a second end of the rear joist of the anchorage conveyor frame by way of a fourth joist hanger bracket and the inferior end of the fourth lifting mast is fixedly bolted to a second end of the rear cross bar of the anchorage conveyor frame by way of a fourth iron face plate;

the upper conveyor frame includes four overhead metal posts which are vertically oriented, including a first overhead metal post, a second overhead metal post, a third overhead metal post, a fourth overhead metal post;

wherein the first overhead metal post is positioned coaxial to the first lifting mast of the anchorage conveyor frame, wherein a first end of the first overhead metal post is fixedly bolted to the first trolley by way of a first trolley adapter connector and a second end of the first overhead metal post is fixedly bolted to a first end portion of the front joist of the anchorage conveyor frame by way of a first post mount bracket;

wherein the second overhead metal post is positioned coaxial to the second lifting mast of the anchorage conveyor frame, wherein a first end of the second overhead metal post is fixedly bolted to the second trolley by way of a second trolley adapter connector and a second end of the second overhead metal post is fixedly bolted to a second end portion of the front joist of the anchorage conveyor frame by way of a second post mount bracket;

wherein the third overhead metal post is positioned coaxial to the third lifting mast of the anchorage conveyor frame, wherein a first end of the third overhead metal post is fixedly bolted to the third trolley by way of a third trolley adapter connector and a second end of the third overhead metal post is fixedly bolted to a first end portion of the rear joist of the anchorage conveyor frame by way of a third post mount bracket;

wherein the fourth overhead metal post is positioned coaxial to the fourth lifting mast of the anchorage conveyor frame, wherein a first end of the fourth overhead metal post is fixedly bolted to the fourth trolley by way of a fourth trolley adapter connector and a second end of the fourth overhead metal post is fixedly bolted to a second end portion of the rear joist of the anchorage conveyor frame by way of a fourth post mount bracket;

the lower conveyor frame including four lower support posts, being vertically oriented;

a first lower support post, a second lower support post, a third lower support post, a fourth lower support post;

wherein the first lower support post is positioned coaxial with the first lifting mast wherein a first end of the first lower support post is fixedly attached to the first end of the front cross bar of the anchorage conveyor frame by way of the first iron face plate and a second end of the first lower support post is fixedly attached to a first corner portion of a front facing rim wall of the hood by way of a first iron mounting plate;

wherein the second lower support post is positioned coaxial with the second lifting mast wherein a first end of the second lower support post is fixedly attached to the second end of the front cross bar of the anchorage conveyor frame by way of the second iron face plate and a second end of the first lower support post is fixedly attached to a second corner portion of the front facing rim wall of the hood by way of a second iron mounting plate;

wherein the third lower support post is positioned coaxial with the third lifting mast wherein a first end of the third lower support post is fixedly attached to the first end of the rear cross bar of the anchorage conveyor frame by way of the third iron face plate and a second end of the third lower support post is fixedly attached to a first corner portion of a rear facing rim wall of the hood by way of a third iron mounting plate;

wherein the fourth lower support post is positioned coaxial with the fourth lifting mast wherein a first end of the fourth lower support post is fixedly attached to the second end of the rear cross bar of the anchorage conveyor frame by way of the second iron face plate and a second end of the fourth lower support post is fixedly attached to the second corner portion of the rear facing rim wall of the hood by way of a fourth iron mounting plate;

wherein each of the first lower support post, the second lower support post, the third lower support post, the fourth lower support post is integrated with a rack and pinion gear system including a first rack and pinion gear system, a second rack and pinion gear system, a third rack and pinion gear system, a fourth rack and pinion gear system, respectively, wherein each of the rack and pinion gear systems include, a lift carriage, a gear rack mechanically operative with a mateable pinion, mechanically operatively connected to a first lateral axle, a second lateral axle;

wherein each of the lift carriages includes a gear rack which is vertically oriented and centered between a first linear guide and a second linear guide of the lift carriage, each of the gear rack having an upward end and a downward end with a plurality of gear rack teeth therebetween;

wherein each of the mateable pinions is configured with a plurality of pinion teeth c circumferentially aligned around a pinion crown to enable an operable rotatable mesh between each of a corresponding plurality of gear rack teeth of each of the gear racks of each of the first rack and pinion gear system, a second rack and pinion gear system, a third rack and pinion gear system, a fourth rack and pinion gear system, each of the mateable pinions include a pinion borehole transversely configured therethrough each of the pin on crowns;

wherein the first lateral axle is positioned a first vertical below and parallel to the first lateral side joist of the anchorage conveyor frame and the second lateral axle is positioned a second vertical distance below and parallel to the opposing second lateral side joist of the anchorage conveyor frame wherein the second distance is equal to the first vertical distance;

wherein a first end of the first lateral axle is rotationally coupled to a first pinion borehole of a first mateable pinion of a first gear rack of the first rack and pinion gear system integrated with the first lower support post and a second end of the first lateral axle is rotationally coupled to a third pinion borehole of a third gear rack of the third rack and pinion gear system integrated with the third lower support post, and a first end of the second lateral axle is rotationally coupled to a second pinion borehole of a second mateable pinion of a second gear rack of the second rack and pinion gear system integrated with the second lower support post and a second end of the second lateral axle is rotationally coupled to a fourth pinion borehole of a fourth mateable pinion of a fourth gear rack of the fourth rack and pinion gear system integrated with the fourth lower support post such that as the hood is lowered and raised the first lateral axle and the second lateral axle synchronously causes the first mateable pinion and the third mateable pinion, the second matealbe pinion and the fourth mateable pinion to rotate in unison enabling the operable rotatable mesh between each of a first plurality of pinion teeth of a first mateable pinion and a first plurality of gear rack teeth of the first gear rack of the first rack and gear system, a second plurality of pinion teeth of a second mateable pinion and a second plurality of gear rack teeth of a second gear rack of the second rack and pinion gear system, a third plurality of pinion teeth of a third mateable pinion and a third plurality of gear rack teeth of a third gear rack of the third rack and pinion gear system, a fourth plurality of pinion teeth of a fourth mateable pinion and a fourth plurality of gear rack teeth of a fourth gear rack of the fourth rack and pinion gear system, in a vertical direction from each of the gear racks downward ends to their upward ends or from each of the gears racks upward end to their downward end;

a first spring loaded handle is pivotally attached to the front cross bar of the anchorage conveyor frame and a second spring loaded handle is pivotally attached to the rear cross bar of the anchorage conveyor whereby the first spring loaded handle and the second spring loaded handle is maneuvered to operationally raise and lower the hood in a vertical direction and to urge the hood in a horizontal direction along each of the front I-beam bridge and the rear I-beam bridge;

the hood, comprising:

a metal rectangular pyramid structure including four cohesive triangular metal panels being integrally welded together forming an apex and a rectangular base configured with a top opening at the apex having a circumferential cross section and a bottom opening integrated within the rectangular base having a rectangular cross section wherein the bottom opening having an exterior facing peripheral rim having four sides, the front facing rim wall, the rear facing rim wall, a first lateral facing rim wall, a second lateral facing rim wall;

a perforated lift and place framework is integrated within the bottom opening of the hood bounded by the exterior facing peripheral rim dimensioned with a framework surface area;

wherein the perforated lift and place framework is configured with a plurality of hood perforations symmetrically aligned a distance apart from each other in rows and columns extending the entirety of the perforated lift and place framework;

wherein the circumferential top opening of the hood is fluidly connected to a hood conduit which is fluidly connected to a vacuum generator motor configured with 1500 cubic feet per minute wherein the vacuum generator motor provides a predetermined force of air flow in fluid communication with each of the plurality of hood perforations of the perforated lift and place framework configured to generate a predetermined vacuum pull therethrough each of the plurality of hood perforations of the perforated lift and place framework, the vacuum generator motor is operationally connected to an "ON"/"OFF" operation switch, wherein the predetermined vacuum pull is purged therethrough each of the plurality of hood perforations of the perforated lift and place framework when the vacuum motor in an "ON" operation mode, and the predetermined vacuum pull is ceased when the vacuum motor is in an "OFF" operation mode to enable a lift and place operation of the core body;

four spring balancers to maintain a stable position of the hood wherein each of the four spring balancers is configured with a drum, and a steel wire rope;

wherein a first spring balancer includes a first end and a second end wherein the first end includes a first hook connector which is fixedly attached by way of a first bolted face plate to a first corner of the front joist of the anchorage conveyor frame and the second end of the first spring balancer includes a first carabiner snap clip which is fixedly coupled to a corresponding first corner of the front cross bar of the anchorage conveyor frame by way of a first steel hook pad eye plate fixedly attached to the corresponding first corner of the front cross bar;

wherein a second spring balancer includes a first end and a second end wherein the first end includes a second hook connector which is fixedly attached by way of a second bolted face plate to a second corner of the front joist of the anchorage conveyor frame and the second end of the second spring balancer includes a second carabiner snap clip which is fixedly coupled to a corresponding second corner of the front cross bar of the anchorage conveyor frame by way of a second steel hook pad eye plate fixedly attached to the corresponding second corner of the front cross bar;

wherein a third spring balancer includes a first end and a second end wherein the first end includes a third hook connector which is fixedly attached by way of a third bolted face plate to a first corner of the rear joist of the anchorage conveyor frame and the second end of the third spring balancer includes a third carabiner snap clip which is fixedly coupled to a corresponding first corner of the rear cross bar of the anchorage conveyor frame by way of a third steel hook pad eye plate fixedly attached to the corresponding second corner of the rear cross bar;

wherein a fourth spring balancer includes a first end and a second end wherein the first end includes a fourth hook connector which is fixedly attached by way of a fourth bolted face plate to a second corner of the rear joist of the anchorage conveyor frame and the second end of the third spring balancer includes a fourth carabiner snap clip which is fixedly coupled to a corresponding second corner of the rear cross bar of the anchorage conveyor frame by way of a fourth steel hook pad eye plate fixedly attached to the corresponding second corner of the rear cross bar such that the hood can be balanced in a level posited plane parallel in relation to each of top surfaces of the vacuum table, the heating metal table, and the core body fusion table and to provide a uniform gel dipping treatment of the core body; and two colloidal matter detection probes, a first colloidal matter detection probe and a second colloidal matter detection probe the first colloidal matter detection probe disposed on the first lateral facing rim wall of the exterior facing rectangular peripheral rim of the hood and the second colloidal matter detection probe disposed on the second lateral facing rim wall of the exterior facing rectangular peripheral rim of the hood wherein when the hood is lowered the first colloidal matter detection probe and the second colloidal matter detection probe is configured to come in contact against a top surface of the colloidal matter contained in the metal basin of the heating metal table.

8. The core body amalgamation system of claim 7, implemented with a core body and an intermediary core body;

wherein the core body includes a first thickness, a length, and a width, a first square footage, a top core body portion and a bottom core body portion wherein the top core body portion includes a top side having a top flat surface having a top surface area and the bottom core body portion having a bottom side having a flat bottom surface having a bottom surface area, the top core body portion and the bottom core body portion joined by two lateral side walk, a first lateral side wall and a second opposing lateral side wall and two longitudinal side walk, a front longitudinal side wall, and a rear longitudinal side wall wherein the top core body portion includes a square footage equal to the square footage of the bottom core body portion;

wherein a series of a plurality of extended protuberates are carved within the bottom core body portion of the core body by way of a contour saw, wherein each of the extended protuberant of the series of the plurality of extended protuberant are configured in symmetrical alignment a first distance from each other aligned in a plurality of rows and a plurality of columns interconnected by a plurality recessed channels bordered by an adjourned peripheral rim, wherein each of the plurality of extended protuberant is configured with a thickness which is less than the first thickness of the core body;

wherein the intermediary core body is to be fused with the core body to form a dual-core body amalgamate, the intermediary core body dimensioned with a second length, a second width, a second thickness, an intermediary foam core body square footage, wherein the second length, the second width, the second thickness, the intermediary foam core body square footage is equal to the first thickness, the first length, the first width, and the core body square footage of the core body; and wherein the intermediary core body includes a flat top facing wall and a flat bottom facing wall including a flat front wall, a flat rear wall, joined by two flat lateral side walls, a f first flat lateral side wall and an opposing second flat lateral side wall, wherein the flat top facing wall includes a top porous layer and the flat bottom facing wall includes a bottom porous layer.

9. The core body amalgamation system of claim 7, wherein the core body and the intermediary core body can be manufactured from a material selected from anyone of the group comprising, foam, silicone, vinyl foam, rubber, polyethylene, polyethylene terephthalate, polyvinyl alcohol, polypropylene, polystyrene, polycarbonate, polyamide, and resins and any combinations thereof.

10. The core body amalgamation system of claim 7, wherein the colloidal matter is selected from any one of the colloidal matter comprising any one of a gelatinous matter that is characterized to consist of two phases that are intertwined with one another having a solid particle network and a liquid solvent.

11. A gel-foam body amalgamation kit, comprising:
a gel-foam body amalgamation system, comprising:
a vacuum lift-table;
a gel heating metal lift-table;
a gel foam fusion lift table;
an overhead double-beam bridge crane;
a variety of bolted column end plates;
a variety of bolted I-beam end plates;
a variety of joist hanger brackets; a variety of iron face plates;
a variety of post mount brackets;
a hood conveyor apparatus;
a hood;
a foam core body; and
intermediary foam core body;
a vacuum lift table cover;
a gel heating metal lift table cover;
a gel foam fusion lift table cover; and
a gel subscription for recurring delivery;
a foam core body subscription for recurring foam core body delivery service;
an intermediary foam core body subscription for recurring intermediary foam core body delivery service;
a gel-foam body amalgamation system instruction manual including a quick reference code to access a manufactures instructions, warranty, contact information; and
OSHA guidelines for a planar heater device.

* * * * *